(12) United States Patent
Noh et al.

(10) Patent No.: US 12,244,523 B2
(45) Date of Patent: Mar. 4, 2025

(54) METHOD AND APPARATUS FOR BEAM MANAGEMENT IN COMMUNICATION SYSTEM

(71) Applicant: ELECTRONICS AND TELECOMMUNICATIONS RESEARCH INSTITUTE, Daejeon (KR)

(72) Inventors: Hoon Dong Noh, Daejeon (KR); Moon Sik Lee, Daejeon (KR); Jae Woo Park, Daejeon (KR); Jae Seung Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 359 days.

(21) Appl. No.: 17/736,671

(22) Filed: May 4, 2022

(65) Prior Publication Data

US 2022/0376851 A1    Nov. 24, 2022

(30) Foreign Application Priority Data

May 4, 2021    (KR) .......................... 10-2021-0058197
May 4, 2022    (KR) .......................... 10-2022-0055654

(51) Int. Cl.
*H04W 72/044*    (2023.01)
*H04L 5/00*    (2006.01)
*H04W 16/28*    (2009.01)

(52) U.S. Cl.
CPC .......... *H04L 5/0023* (2013.01); *H04L 5/0073* (2013.01)

(58) Field of Classification Search
CPC ..... H04L 5/0023; H04L 5/0073; H04W 16/28; H04W 72/20
See application file for complete search history.

(56) References Cited

U.S. PATENT DOCUMENTS

| | | | |
|---|---|---|---|
| 2019/0253220 A1 | 8/2019 | Kim | |
| 2019/0356364 A1* | 11/2019 | Maamari | H04L 5/0062 |
| 2020/0091608 A1 | 3/2020 | Alpman et al. | |
| 2021/0144719 A1 | 5/2021 | Choi et al. | |
| 2021/0185749 A1* | 6/2021 | Abedini | H04W 72/1263 |
| 2021/0211341 A1* | 7/2021 | Luo | H04B 7/155 |
| 2021/0274506 A1* | 9/2021 | Raghavan | H04W 72/541 |

(Continued)

FOREIGN PATENT DOCUMENTS

| | | |
|---|---|---|
| WO | 2019194661 A1 | 10/2019 |
| WO | 2020032594 A1 | 2/2020 |

(Continued)

OTHER PUBLICATIONS

3GPP TSG-RAN WG4#92BIS, R4-1912309 Title:IAB MT RF co-existence requirements in FR2 (Year: 2019).*

*Primary Examiner* — Faruk Hamza
*Assistant Examiner* — Abusayeed M Haque
(74) *Attorney, Agent, or Firm* — Rabin & Berdo, P.C.

(57) ABSTRACT

An operation method of a first device may comprise: identifying a first MT CC operating in a multiplexing mode among one or more MT CCs formed by an IAB-MT constituting the first device; determining first beam preference information for the first MT CC; transmitting, to a second device which is an upper node of the first device, the first beam preference information; and performing beam-based communications with the second device based on the first beam preference information.

17 Claims, 25 Drawing Sheets

(56) References Cited

U.S. PATENT DOCUMENTS

2021/0378010 A1* 12/2021 Luo ..................... H04W 16/14
2022/0150961 A1* 5/2022 Zhang ............... H04W 74/0833

FOREIGN PATENT DOCUMENTS

| WO | 2020171478 A1 | 8/2020 | | |
| WO | 2021086147 A1 | 5/2021 | | |
| WO | WO-2021242423 A1 * | 12/2021 | ............ | H04W 16/14 |

\* cited by examiner

FIG. 10

| CORESET pool ID | serving cell ID | | | | | | BWP ID | | Oct 1 |
|---|---|---|---|---|---|---|---|---|---|
| $T_7$ | $T_6$ | $T_5$ | $T_4$ | $T_3$ | $T_2$ | $T_1$ | $T_0$ | | Oct 2 |
| $T_{15}$ | $T_{14}$ | $T_{13}$ | $T_{12}$ | $T_{11}$ | $T_{10}$ | $T_9$ | $T_8$ | | Oct 3 |
| ... | | | | | | | | | |
| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ | | Oct N | user plane protocol stack for CA user plane protocol stack for DC

FIG. 19

| | | |
|---|---|---|
| R | serving cell ID | Oct 1 |
| $C_0$ | BWP ID | Oct 2 |
| R | TCI state $ID_{0,1}$ | |
| | TCI state $ID_{0,2}$ | Oct 3 (optional) |
| ... | | |
| $C_N$ | TCI state $ID_{N,1}$ | Oct M-1 |
| R | TCI state $ID_{N,2}$ | Oct M (optional) |

FIG. 20

| | | | | |
|---|---|---|---|---|
| R | R | cell ID of SRS resource | BWP ID of SRS resource | Oct 1 |
| R | C | SRS resource ID$_0$ | | Oct 2 |
| F$_0$ | | resource serving cell ID$_0$ | resource BWP ID$_0$ | Oct 3 |
| | | resource ID$_0$ | | Oct 4 |
| ... | | | | |
| R | R | SRS resource ID$_{N-1}$ | | Oct 3N-1 |
| F$_{N-1}$ | | resource serving cell ID$_{N-1}$ | resource BWP ID$_{N-1}$ | Oct 3N |
| | | resource ID$_{N-1}$ | | Oct 3N+1 |

METHOD AND APPARATUS FOR BEAM MANAGEMENT IN COMMUNICATION SYSTEM

CROSS-REFERENCE TO RELATED APPLICATIONS

This application claims priority to Korean Patent Applications No. 10-2021-0058197 filed on May 4, 2021 and No. 10-2022-0055654 filed on May 4, 2022 with the Korean Intellectual Property Office (KIPO), the entire contents of which are hereby incorporated by reference.

BACKGROUND

1. Technical Field

The present disclosure relates to a technique for beam management in a wireless communication system, and more particularly, to a beam management technique for coverage extension and capacity increasement.

2. Related Art

With the development of information and communication technology, various wireless communication technologies are being developed. Representative wireless communication technologies include long-term evolution (LTE) and new radio (NR) defined as the $3^{rd}$ generation partnership project (3GPP) standards. The LTE may be one of the $4^{th}$ generation (4G) wireless communication technologies, and the NR may be one of the $5^{th}$ generation (5G) wireless communication technologies.

In the communication technologies for the 5G or later generation, a higher data rate, larger communication capacity, lower latency, wider coverage, and the like may be required than in the communication technologies of the previous generations. In order to achieve such the requirements, an integrated access and backhaul (IAB) network technology is being studied. An IAB node constituting the IAB network may be composed of two elements: a distributed unit (i.e., IAB-DU) and a mobile terminal (i.e., IAB-MT). In addition, an IAB node may configure a dual connectivity (DC) with a parent node or a child node.

An IAB-DU and an IAB-MT within one IAB node may operate in a half-duplex mode, a full-duplex mode, or the like depending on various factors such as antenna separation degree and interference control degree. Here, preferred beams or available beams may be different for each operation mode, and thus techniques for beam management (BM) or beam control for an IAB node supporting a plurality of operation modes such as the half-duplex mode and the full-duplex mode may be required.

Matters described as the prior arts are prepared to promote understanding of the background of the present disclosure, and may include matters that are not already known to those of ordinary skill in the technology domain to which exemplary embodiments of the present disclosure belong.

SUMMARY

In order to solve the above-identified problems, exemplary embodiments of the present disclosure are directed to providing a method and an apparatus for beam management, which enable IAB nodes constituting an IAB network in a wireless communication system to efficiently perform beam management.

According to an exemplary embodiment of the present disclosure for achieving the above-described objective, an operation method of a first device may comprise: identifying a first mobile terminal (MT) component carrier (CC) operating in a multiplexing mode among one or more MT CCs formed by an integrated access and backhaul (IAB)-MT constituting the first device; determining first beam preference information for the first MT CC; transmitting, to a second device which is an upper node of the first device, the first beam preference information; and performing beam-based communications with the second device based on the first beam preference information.

The first beam preference information may include information on one or more beams suitable for the first MT CC to use in the multiplexing mode among beams of the first MT CC and/or information on one or more beams not suitable for the first MT CC to use in the multiplexing mode among the beams of the first MT CC.

The first beam preference information may include information on one or more beams suitable for the first MT CC to use in the multiplexing mode among beams of the first MT CC and one or more beams suitable for communications with the first MT CC among beams of the second device, or include information on one or more beams not suitable for the first MT CC to use in the multiplexing mode among the beams of the first MT CC and one or more beams not suitable for communications with the first MT CC among the beams of the second device.

The first beam preference information may be indicated based on at least one of transmission configuration indication (TCI) state identifier(s) (ID(s)), spatial relation ID(s), quasi co-location (QCL) ID(s), reference signal (RS) ID(s), or a combination thereof corresponding to one or more beams suitable for the first MT CC to use in the multiplexing mode or one or more beams not suitable for the first MT CC to use in the multiplexing mode.

The multiplexing mode may correspond to a simultaneous distributed unit (DU)/MT operation mode in the IAB network, and the first beam preference information may be determined based on at least one of a degree of interference between one or more DU cells formed by an IAB-DU constituting the first device and the first MT CC, a relation between a frequency band of each of the one or more DU cells and a frequency band of the first MT CC, relative positions of the one or more DU cells and the first MT CC, or a combination thereof.

The multiplexing mode may correspond to a simultaneous DU/MT operation mode in the IAB network, and when a transmission mode of an IAB-DU constituting the first device corresponds to the simultaneous DU/MT operation mode, the first beam preference information may be determined based on at least one of a degree of interference between one or more DU cells formed by the IAB-DU and the first MT CC, a relation between a frequency band of each of the one or more DU cells and a frequency band of the first MT CC, relative positions of the one or more DU cells and the first MT CC, or a combination thereof.

The performing of the beam-based communications may comprise: receiving, from the second device, first beam configuration information determined based on the first beam preference information; and identifying hard (H)/soft (S)/not available (NA) configuration information determined by the second device for beams of the first MT CC based on the first beam configuration information.

According to another exemplary embodiment of the present disclosure for achieving the above-described objective, an operation method of a first device may comprise: receiving, from a second device which is a lower node of the first device, first beam preference information for a first mobile terminal (MT) component carrier (CC) among one or more MT CCs formed by an integrated access and backhaul (IAB)-MT constituting the second device; and performing beam-based communications with the second device based on the first beam preference information, wherein the first MT CC is an MT CC operating in a multiplexing mode.

The first beam preference information may include information on one or more beams suitable for the first MT CC to use in the multiplexing mode among beams of the first MT CC and/or information on one or more beams not suitable for the first MT CC to use in the multiplexing mode among the beams of the first MT CC.

The first beam preference information may include information on one or more beams suitable for the first MT CC to use in the multiplexing mode among beams of the first MT CC and one or more beams suitable for communications with the first MT CC among beams of the first device, or may include information on one or more beams not suitable for the first MT CC to use in the multiplexing mode among the beams of the first MT CC and one or more beams not suitable for communications with the first MT CC among the beams of the first device.

The multiplexing mode may correspond to a simultaneous distributed unit (DU)/MT operation mode in the IAB network, and the first beam preference information may be determined based on at least one of a degree of interference between one or more DU cells formed by an IAB-DU constituting the second device and the first MT CC, a relation between a frequency band of each of the one or more DU cells and a frequency band of the first MT CC, relative positions of the one or more DU cells and the first MT CC, or a combination thereof.

The multiplexing mode may correspond to a simultaneous DU/MT operation mode in the IAB network, and when a transmission mode of an IAB-DU constituting the first device corresponds to the simultaneous DU/MT operation mode, the first beam preference information may be determined based on at least one of a degree of interference between one or more DU cells formed by the IAB-DU and the first MT CC, a relation between a frequency band of each of the one or more DU cells and a frequency band of the first MT CC, relative positions of the one or more DU cells and the first MT CC, or a combination thereof.

The performing of the beam-based communications may comprise: determining hard (H)/soft (S)/not available (NA) configuration information for beams of the first MT CC based on the first beam preference information; and transmitting, to the second device, the H/S/NA configuration information determined for the beams of the first MT CC.

According to yet another exemplary embodiment of the present disclosure for achieving the above-described objective, a first device may comprise: a processor; a memory electronically communicating with the processor; and instructions stored in the memory, wherein when executed by the processor, the instructions cause the first device to: identify a first distributed unit (DU) cell operating in a multiplexing mode among one or more DU cells formed by an integrated access and backhaul (IAB)-DU constituting the first device; determine first beam preference information for the first DU cell; transmit, to a second device which is an upper node of the first device, the first beam preference information; receive, from the second device, first beam configuration information determined based on the first beam preference information; and perform communications through the first DU cell based on the first beam preference information and the first beam configuration information.

The first beam preference information may include information on one or more beams suitable for the first DU cell to use in the multiplexing mode among beams of the first DU cell and/or information on one or more beams not suitable for the first DU cell to use in the multiplexing mode among the beams of the first DU cell.

The first beam preference information may be indicated based on at least one of transmission configuration indication (TCI) state identifier(s) (ID(s)), spatial relation ID(s), quasi co-location (QCL) ID(s), reference signal (RS) ID(s), or a combination thereof corresponding to one or more beams suitable for the first DU cell to use in the multiplexing mode or one or more beams not suitable for the first DU cell to use in the multiplexing mode.

The multiplexing mode may correspond to a simultaneous DU/mobile terminal (MT) operation mode in the IAB network, and the first beam preference information may be determined based on at least one of a degree of interference between one or more MT component carriers (CCs) formed by an IAB-MT constituting the first device and the first DU cell, a relation between a frequency band of each of the one or more MT CCs and a frequency band of the first DU cell, relative positions of the one or more MT CCs and the first DU cell, or a combination thereof.

The multiplexing mode may correspond to a simultaneous DU/MT operation mode in the IAB network, and when a transmission mode of an IAB-MT constituting the first device corresponds to the simultaneous DU/MT operation mode, the first beam preference information may be determined based on at least one of a degree of interference between one or more MT CCs formed by the IAB-MT and the first DU cell, a relation between a frequency band of each of the one or more MT CCs and a frequency band of the first DU cell, relative positions of the one or more MT CCs and the first DU cell, or a combination thereof.

In the performing of communications through the first DU cell, the instructions may further cause the first device to identify hard (H)/soft (S)/not available (NA) configuration information configured by the second device for beams of the first DU cell.

According to the exemplary embodiments of the method and apparatus for beam management in a communication system, based on a band in which frequencies overlap and a band in which frequencies do not overlap between an IAB-DU and an IAB-MT corresponding to each other within an IAB node of the communication system, a preferred beam set and/or a non-preferred beam set can be selected. Accordingly, the beam management can be efficiently performed, and communication capacity can be expanded. According to the exemplary embodiments of the method and apparatus for beam management in the communication system, depending on whether a TDM or non-TDM is applied between the IAB-DU and the IAB-MT corresponding to each other within the IAB node of the communication system, whether beam directions are spatially overlapped between the IAB-DU and the IAB-MT, or the like, resource configuration and allocation can be performed so that interference between the IAB-DU and the IAB-MT is minimized. Accordingly, the beam management can be efficiently performed, and the communication capacity can be expanded.

BRIEF DESCRIPTION OF DRAWINGS

FIG. 10 is a conceptual diagram illustrating an exemplary embodiment of a TCI state activation/deactivation MAC CE in a communication system.

FIG. 19 is a conceptual diagram illustrating an exemplary embodiment of a TCI state activation/deactivation MAC CE structure in a communication system supporting an IAB network.

FIG. 20 is a conceptual diagram illustrating an exemplary embodiment of a serving cell set based sounding reference signal (SRS) spatial relation indication MAC CE structure in a communication system.

DETAILED DESCRIPTION OF THE EMBODIMENTS

Figure 1:
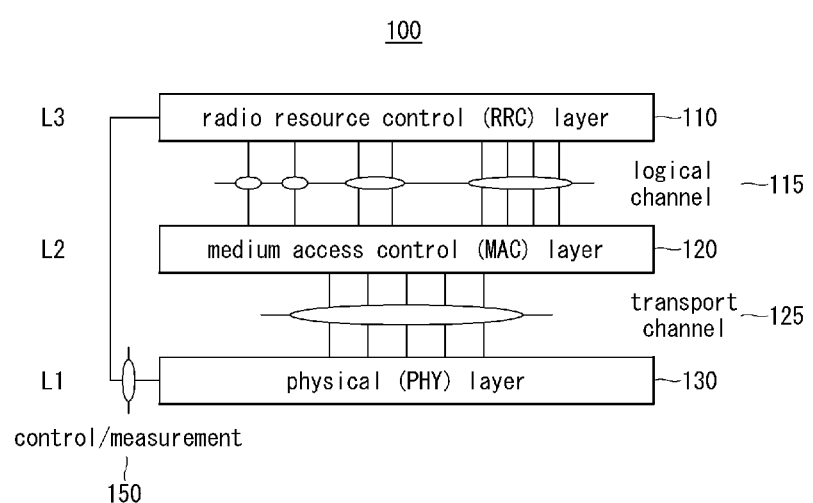
FIG. 1 is a conceptual diagram illustrating an exemplary embodiment of a radio interface protocol structure in a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a radio interface protocol structure in a communication system.

Referring to FIG. 1, an exemplary embodiment of a radio interface protocol structure 100 of a communication system may be configured to include a radio resource control (RRC) layer 110, a medium access control (MAC) layer 120, a physical (PHY) layer 130, and the like. An exemplary embodiment of the radio interface protocol structure 100 shown in FIG. 1 may correspond to various exemplary embodiments of interfaces such as an interface between a terminal and a base station, an interface between an IAB-node distributed unit (IAB-DU) and an IAB-node mobile terminal (IAB-MT) of an integrated access backhaul (IAB) network, an interface between an IAB-DU and a lower node, an interface between an IAB-MT and an upper node, an interface between a plurality of terminals, and the like.

In the vicinity of the PHY layer 130, the RRC layer 110, and the MAC layer 120, and the like may be disposed above the PHY layer 130. For example, the MAC layer 120 may be disposed above the PHY layer 130. The RRC layer 110 may be disposed above the MAC layer 120.

The MAC layer 120 may be connected to a higher layer (e.g., RRC layer 110) through logical channels 115. The PHY layer 130 may be connected to the higher MAC layer 120 through transport channels 125. The PHY layer 130 may transmit and receive control information or measurement information 150 to and from the RRC layer 110.

The PHY layer 130 may be referred to as a 'layer 1' or 'L1'. The MAC layer 120 may be referred to as a 'layer 2' or 'L2'. The RRC layer 110 may be referred to as a 'layer 3' or 'L3'. The RRC layer 110 and the MAC layer 120 may be collectively referred to as the 'higher layer'.

In the present disclosure, 'L1 signaling' refers to signaling such as downlink control information (DCI) transmitted on a physical downlink control channel (PDCCH), uplink control information (UCI) transmitted on a physical uplink control channel (PUCCH), and sidelink control information (SCI) transmitted on a physical sidelink control channel (PSCCH), which are channels of the PHY layer 130. Similarly, in the present disclosure, 'higher layer signaling' may include L2 signaling transmitted through a MAC control element (CE), L3 signaling transmitted through RRC signaling, and the like. Although omitted in FIG. 1 for convenience of description, information that can be included in an interface between base stations, or an interface (e.g., F1, next generation (NG) interfaces, etc.) between base station components such as a distributed unit (DU) and a central unit (CU) may also be collectively referred to as higher layer signaling as well as the L2 signaling or L3 signaling.

In a communication system to which the 5G communication technology, etc. is applied, one or more of numerologies of Table 1 may be used in accordance with various purposes, such as inter-carrier interference (ICI) reduction according to frequency band characteristics, latency reduction according to service characteristics, and the like.

TABLE 1

| μ | Δf = $2^μ$ · 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Table 1 is merely an example for the convenience of description, and exemplary embodiments of the numerologies used in the communication system may not be limited thereto. Each numerology μ may correspond to information of a subcarrier spacing (SCS) Δf and a cyclic prefix (CP). The terminal may identify a numerology μ and a CP value applied to a downlink bandwidth part (BWP) or an uplink BWP based on higher layer parameters such as subcarrierSpacing, cyclicPrefix, and/or the like.

Figure 2:
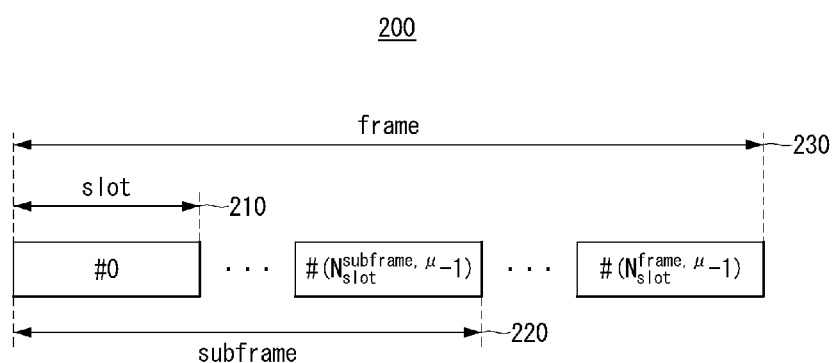
FIG. 2 is a conceptual diagram illustrating an exemplary embodiment of time resources in which radio signals are transmitted in a communication system.

FIG. 2 is a conceptual diagram illustrating an exemplary embodiment of time resources in which radio signals are transmitted in a communication system.

Referring to FIG. 2, time resources in which radio signals are transmitted in a communication system 200 may be represented with a frame 220 comprising one or more ($N_{slot}^{frame,μ}$/$N_{slot}^{subframe,μ}$) subframes, a subframe 220 comprising one or more ($N_{slot}^{subframe,μ}$) slots, and a slot 210 comprising 14 ($N_{symb}^{slot}$) OFDM symbols. In this case, according to a configured numerology, as the values of $N_{symb}^{slot}$, $N_{slot}^{subframe,μ}$, and $N_{slot}^{frame,μ}$, values according to Table 2 below may be used in case of a normal CP, and values according to Table 3 below may be used in case of an extended CP. The OFDM symbols included within one slot may be classified into 'downlink', 'flexible', or 'uplink' by higher layer signaling or a combination of higher layer signaling and L1 signaling.

TABLE 2

| μ | $N_{symb}^{slot}$ | $N_{slot}^{frame, μ}$ | $N_{slot}^{subframe, μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame, μ}$ | $N_{slot}^{subframe, μ}$ |
|---|---|---|---|
| 2 | 12 | 40 | 4 |

In the 5G NR communication system, the frame 230 may have a length of 10 ms, and the subframe 220 may have a length of 1 ms. Each frame 230 may be divided into two half-frames having the same length, and the first half-frame (i.e., half-frame 0) may be composed of subframes #0 to #4, and the second half-frame (i.e., half-frame 1) may be composed of subframes #5 to #9. One carrier may include a set of frames for uplink (i.e., uplink frames) and a set of frames for downlink (i.e., downlink frames).

Figure 3:
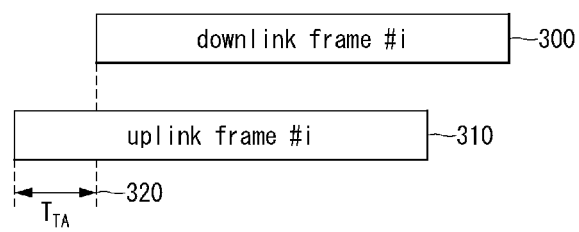
FIG. 3 is a conceptual diagram illustrating a time difference between a reception timing of an i-th downlink frame and a transmission timing of an i-th uplink frame in an exemplary embodiment of a communication system.

FIG. 3 is a conceptual diagram illustrating a time difference between a reception timing of an i-th downlink frame and a transmission timing of an i-th uplink frame in an exemplary embodiment of a communication system.

Referring to FIG. 3, a time difference between a reception timing of an i-th downlink frame 300 and a transmission timing of an i-th uplink frame 310 may be a $T_{TA}$ 320. Accordingly, the terminal may start transmission of the uplink frame #i 310 at a time earlier by $T_{TA}$ compared to the reception timing of the downlink frame #i 300. $T_{TA}$ may be referred to as a timing advance or timing adjustment TA. The base station may instruct the terminal to change a value of $T_{TA}$ through higher layer signaling or L1 signaling, and may configure the terminal to apply $T_{TA}$ in a manner defined as $T_{TA}=(N_{TA}+N_{TA,offset})T_c$. In the case of 5G NR, $T_c$ may be defined as $$T_c = \frac{1}{(\Delta f_{max} \cdot N_f)},$$

$\Delta f_{max}$ may be defined as $\Delta f_{max}$=480 kHz, $N_f$ may be defined as $N_f$=4096, $N_{TA,offset}$ may be a value set by L3 signaling, and $N_{TA}$ may be a value determined by Equation 1 below by a value $T_A$ indicated by L2 signaling.

$$N_{TA} = \begin{cases} T_A \cdot 16 \cdot \frac{64}{2^μ} & \text{(for random access response)} \\ N_{TA\_old} + ((T_A - 31) \cdot 16 \cdot 64/2^μ) & \text{(for other cases)} \end{cases} \quad \text{[Equation 1]}$$

Here, the description on $N_{TA,offset}$ and $N_{TA}$ may be an example for a specific situation, and various other options may exist, but in order not to obscure the gist of the description, all possible cases may not be listed in the present disclosure.

Figure 4:
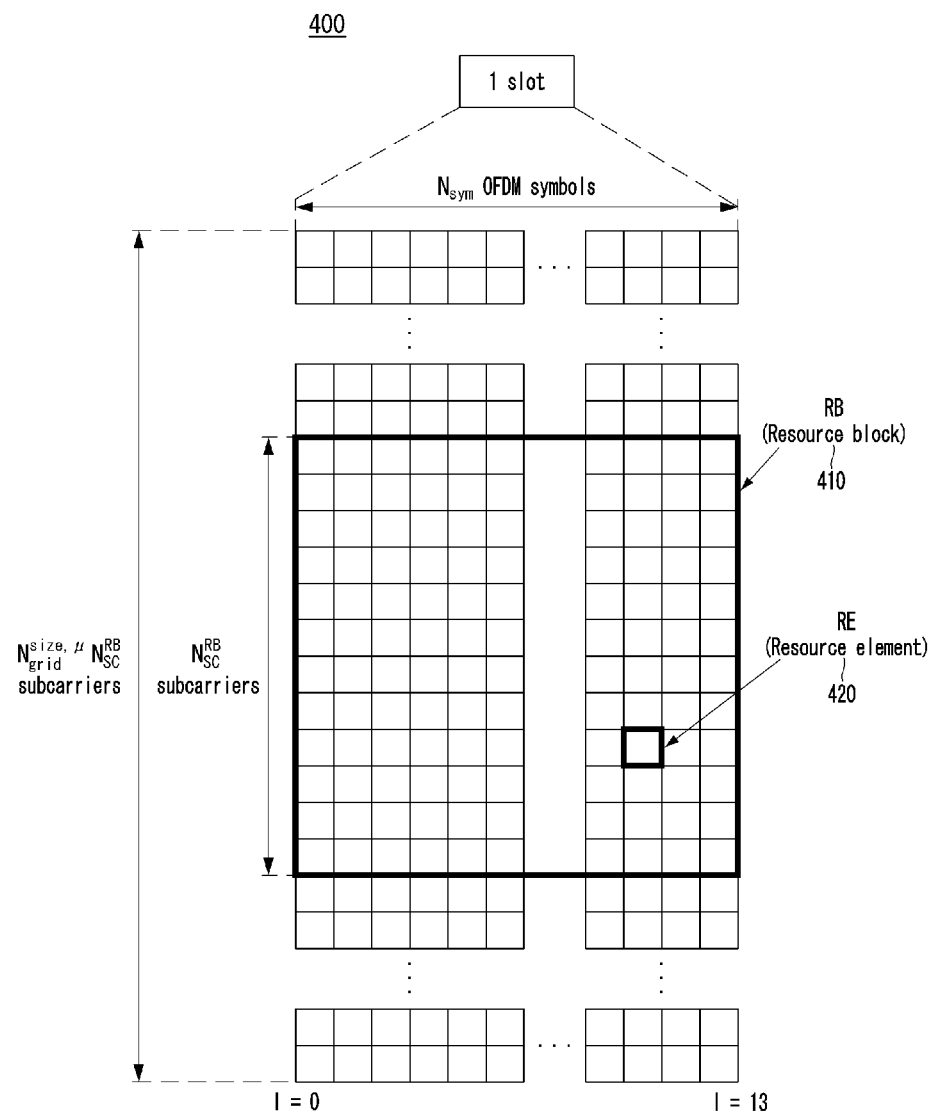
FIG. 4 is a conceptual diagram illustrating an exemplary embodiment of a time/frequency resource grid of a communication system.

FIG. 4 is a conceptual diagram illustrating an exemplary embodiment of a time/frequency resource grid of a communication system.

Referring to FIG. 4, a time/frequency resource grid 400 of a communication system may have $N_{grid}^{size,μ}N_{sc}^{RB}$ subcarriers and $N_{slot}^{subframe,μ}$ OFDMs. The resource grid may be defined for each numerology and each carrier. In this case, $N_{grid}^{start,μ}$ may mean a position of a common resource block (CRB) indicated by higher layer signaling. $N_{grid}^{size,μ}$ may mean the number of resource blocks (RBs) starting from the CRB, that is, a carrier bandwidth. $N_{grid}^{start,μ}$ and/or $N_{grid}^{size,μ}$ may have different values for each link direction (e.g., uplink, downlink, or sidelink) or for each numerology Here, the numerology μ may be referred to by other terms, such as a SCS configuration, if necessary.

Each element in the resource grid for an antenna port p and a SCS configuration μ may be referred to as a resource element (RE) 420, and may be uniquely defined for each position (k, l)$_{p,μ}$. In this case, k may be a frequency axis index, and l may indicate a symbol position on the time axis. RE(k, l)$_{p,μ}$ may correspond to a physical resource used to transmit a physical channel or a signal complex value $a_{k,l}^{(p,μ)}$. One RB 410 may be defined as consecutive $N_{sc}^{RB}$=12 subcarriers on the frequency axis.

The 5G NR communication system has introduced the concept of BWPs in order to reduce high implementation complexity and power consumption of terminals due to the widened carrier bandwidth compared to the 3G/4G communication system. One BWP may be composed of contiguous CRBs, a starting RB position $N_{BWP,i}^{start,\mu}$ of the BWP and the number $N_{BWP,i}^{size,\mu}$ of RBs constituting the BWP may satisfy Equations 2 and 3.

$$N_{grid,x}^{start,\mu} \leq N_{BWP,i}^{start,\mu} < N_{grid,x}^{start,\mu} + N_{grid,x}^{size,\mu} \quad \text{[Equation 2]}$$

$$N_{grid,x}^{start,\mu} < N_{BWP,i}^{start,\mu} + N_{BWP,i}^{size,\mu} \leq N_{grid,x}^{start,\mu} + N_{grid,x}^{size,\mu} \quad \text{[Equation 3]}$$

The terminal may be configured with up to four downlink BWPs within one component carrier (CC), and only one downlink BWP may be activated at a time. The terminal may not receive a physical downlink shared channel (PDSCH), a physical downlink control channel (PDCCH), a channel state information reference signal (CSI-RS), or the like outside the activated BWP.

The terminal may be configured with up to four uplink BWPs within one CC, and only one uplink BWP may be activated at a time. The terminal may not transmit a physical uplink shared channel (PUSCH), a physical uplink control channel (PUCCH), a sounding reference signal (SRS), or the like outside the activated BWP.

Figure 5:
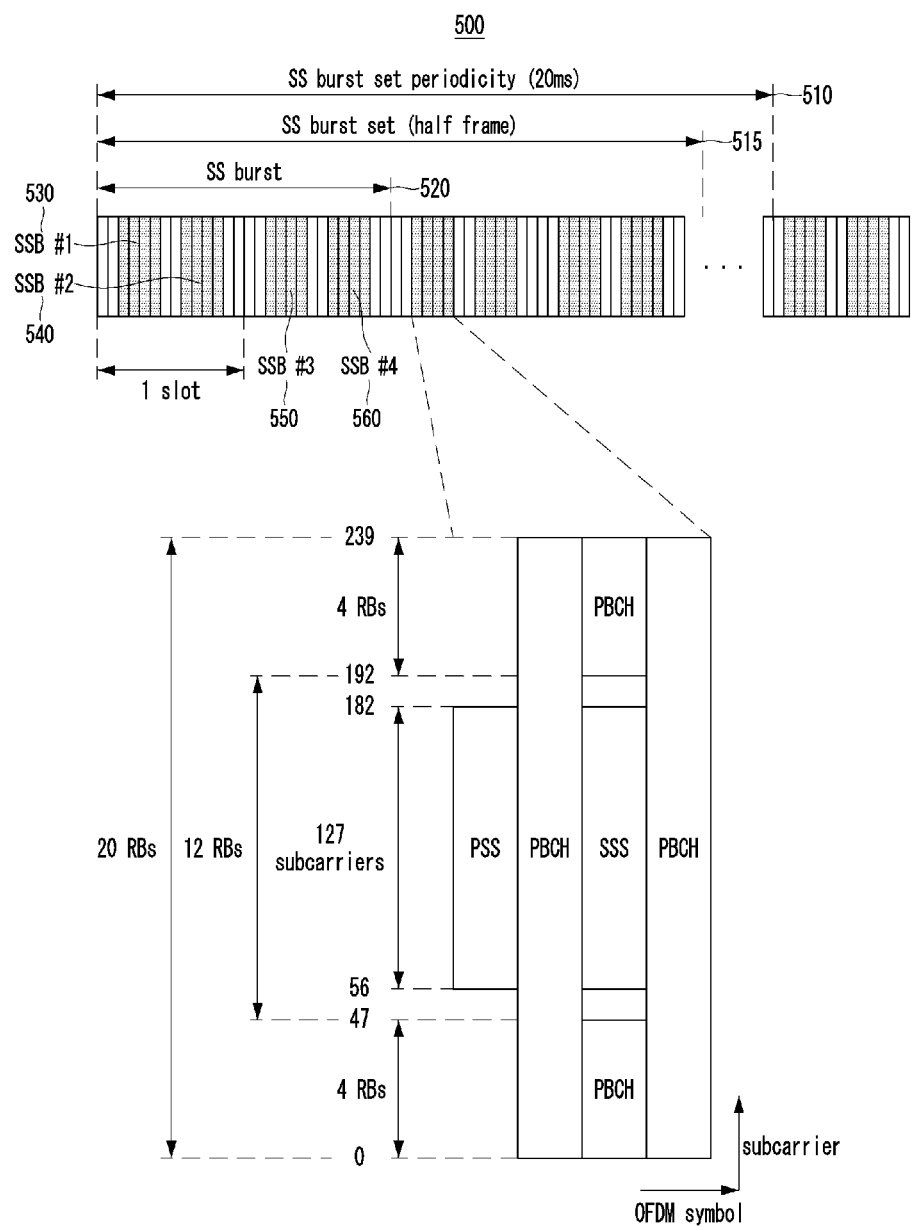
FIG. 5 is a conceptual diagram illustrating an exemplary embodiment of a synchronization signal and physical broadcast channel (SS/PBCH) block or synchronization signal block (SSB) of a communication system.

FIG. 5 is a conceptual diagram illustrating an exemplary embodiment of a synchronization signal and physical broadcast channel (SS/PBCH) block or synchronization signal block (SSB) of a communication system.

Referring to FIG. 5, an SS/PBCH block 500 of a communication system may be configured with a primary synchronization signal (PSS) transmitted in 127 subcarriers in the middle of a first OFDM symbol, a secondary synchronization signal (SSS) transmitted in 127 subcarriers in the middle of a third OFDM symbol, and a physical broadcast channel (PBCH) transmitted in second, third, and fourth OFDM symbols. The PBCH occupying the widest bandwidth may be transmitted over 20 RBs, which may be 3.6 MHz based on 15 kHz SCS. The base station transmits one SSB by applying the same beam. When the number of base station antennas increases or it is necessary to operate multiple beams such as applying one or more analog beams for high frequency support, the base station may support a multi-beam operation by transmitting multiple SSBs. Here, the term 'beam' may be expressed in various terms such as a transmission precoding or a spatial transmission (TX) filter when applied in practice. However, in order not to obscure the gist of the description, 'beam' is used hereinafter as a unified term.

For example, the base station may transmit a plurality of SSBs 530, 540, 550, and 560 to represent a plurality of beams (e.g., beam #1, beam #2, beam #3, beam #4). In this case, it may be possible that one or more SSBs are transmitted within one slot according to a pattern predetermined according to each numerology. The SSBs 530, 540, 550, and 560 to which different beams are applied may be bundled into one set by being included in an SS burst 520. The terminal may assume a half-frame window having a length of 5 ms at the time of monitoring SSBs. An SS burst set 515 configured by higher layer signaling within a half-frame may include one or more SS bursts 520. If RRC configuration values are unknown or unavailable when performing initial access (IA), the terminal may receive or measure the SSBs assuming that a periodicity of the SS burst set 510 is 20 ms. As an example, the terminal may receive SSB(s) with reference to SSB configuration information identical or similar to that shown in Table 4.

TABLE 4

| | |
|---|---|
| MIB ::= | SEQUENCE { |
| systemFrameNumber | |
| subCarrierSpacingCommon | |
| ssb-SubcarrierOffset | // SSB subcarrier offset (0~15) |
| dmrs-TypeA-Position | |
| pdcch-ConfigSIB1 | |
| cellBarred | |
| intraFreqReselection | |
| spare | |
| } | |
| MeasObjectNR ::= | SEQUENCE { |
| ssbFrequency | // Absolute Radio Frequency Channel Number (ARFCN) of SSB |
| ssbSubcarrierSpacing | // Numerology of SSB |
| smtc1 | |
|     // first SSB measurement timing configuration (SMTC) configured with reference to SSB-MTC | |
| smtc2  // Second SMTC configured with reference to SSB-MTC | |
| ... | |
| ... | |
| } | |
| SSB-Index | // SSB index within SS-burst |
| SSB-MTC ::= | SEQUENCE { |
|     // timing occasion configuration for SSBs to be measured by terminal | |
| periodicityAndOffset | CHOICE { |
| sf5 | // offset when a SSB reception window has a legnth of 5 subframes |
| sf10 | // offset when a SSB reception window has a legnth of 10 subframes |
| sf20 | // offset when a SSB reception window has a legnth of 20 subframes |
| sf40 | // offset when a SSB reception window has a legnth of 40 subframes |
| sf80 | // offset when a SSB reception window has a legnth of 80 subframes |
| sf160 | // offset when a SSB reception window has a legnth of 160 subframes |
| }, | |
| duration | // a lengh of a SSB recepion window (number of subframes) |
| } | |
| SSB-MTC2 ::= | SEQUENCE { |
| pci-List | // physical cell IDs (PCIs) following the SMTC configuration |
| periodicity | // SMTC periodicity (number of subframes) |
| } | |

Figure 6:
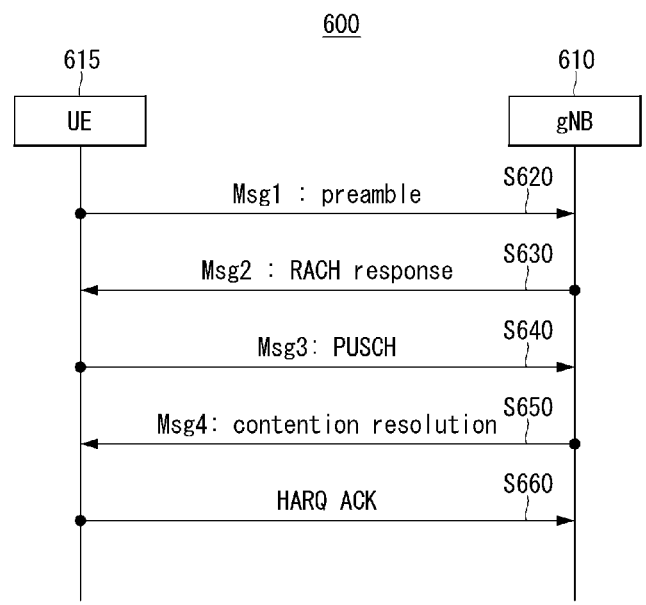
FIG. 6 is a sequence chart illustrating an exemplary embodiment of a random access procedure in a communication system.

FIG. 6 is a sequence chart illustrating an exemplary embodiment of a random access procedure in a communication system.

Referring to FIG. 6, in a random access procedure of a communication system 600, a terminal 615 may transmit a physical random access channel (PRACH) preamble, and the PRACH preamble may be referred to as 'Msg1' (S620). Through a transmission of the PRACH preamble, random access-radio network temporary identifier (RA-RNTI) may be determined. In this case, the RA-RNTI may be calculated by Equation 4.

$$RA\text{-}RNTI=1+s\_id+14\times t\_id+14\times 80\times f\_id+14\times 80\times 8\times ul\_carrier\_id$$ [Equation 4]

In Equation 4, s_id may be an index of a first OFDM symbol of a corresponding PRACH occasion (e.g., $0\leq s\_id<14$), t_id may be an index of a first slot of the PRACH occasion within a system frame (e.g., $0\leq t\_id<80$), f_id may be an index of the PRACH occasion in the time domain (e.g., $0\leq f\_id<8$), and ul_carrier_id may be a value according to a uplink carrier type used for the preamble transmission (e.g., 0 indicates a regular uplink carrier, 1 indicates a supplementary uplink carrier).

Before the terminal transmits the PRACH preamble, the terminal may have at least part of the following information by receiving system information from the base station on a PBCH or receiving RRC signaling from the base station.

PRACH preamble format
Time/frequency resource information for RACH transmission
Index for a logical root sequence table
Cyclic shift $N_{CS}$
Set type (unrestricted, restricted set A, restricted set B)

Referring again to FIG. 6, as a second procedure, the base station may provide a random access response (RAR) to the terminal, which may be referred to as 'Msg2' (S630). Particularly, the base station may calculate an RA-RNTI based on Equation 4 when the base station receives the PRACH preamble from the terminal in the step S620, and may transmit a DCI by using the RA-RNTI for scrambling. The terminal may monitor a PDCCH scrambled with the RA-RNTI in a period included in a RACH response window configured by the higher layer in a type 1 PDCCH common search space (CSS). The terminal may receive the PDCCH (or the DCI transmitted from the base station through the PDCCH), and may decode the PDCCH (or the DCI). If the terminal successfully decodes the PDCCH (or the DCI), the terminal may decode a PDSCH including the RAR transmitted from the base station in the step S630. If the terminal succeeds in decoding the RAR, the terminal may identify whether an RA preamble identifier (RAPID) in the RAR matches a RAPID pre-allocated to the terminal.

As a third procedure, the terminal may transmit a PUSCH to the base station, which may be referred to as 'Msg3' (S640). To this end, the terminal may determine whether to apply a transform precoding to transmission of the PUSCH (i.e., whether to apply discrete Fourier transform (DFT)-s-OFDM-based transmission or OFDM-based transmission) based on a higher layer parameter (e.g., msg3-transformPrecoding). Also, the terminal may determine a SCS to be used for transmission of the PUSCH according to a higher layer parameter (e.g., msg3-scs). In this case, the PUSCH of Msg3 may be transmitted through a serving cell to which the PRACH has been transmitted.

As a fourth procedure, the base station may transmit a contention resolution message to the terminal, which may be referred to as 'Msg4' (S650). The terminal may start a timer for receiving the contention resolution message, and may monitor a PDCCH scrambled with a temporary cell-RNTI (TC-RNTI) in the type 1 PDCCH CSS until the timer expires. If the terminal successfully decodes the PDCCH, the terminal may decode a corresponding PDSCH including a MAC CE, and set the TC-RNTI as a cell-RNTI (C-RNTI). After successfully decoding the Msg4, the terminal may report a hybrid automatic repeat request (HARQ) positive-acknowledgement (ACK) thereto to the base station, and may report whether the RACH procedure is successful to the base station (S660).

The RACH occasion (RO) may mean a time and frequency resource specified for reception of a RACH preamble, and the terminal may use the RO for PRACH transmission. As described above, in the 5G NR, multiple SSBs may be associated with different beams for the multi-beam operation, and the terminal may measure the multiple SSBs, and select an optimal SSB (i.e., optimal beam) based on one of various schemes such as a reference signal received power (RSRP), reference signal received quality (RSRQ), signal-to-noise ratio (SNR), signal-to-noise/interference ratio (SNIR), or the like. Thereafter, the terminal may determine a beam (i.e., TX spatial filter) to be used for PRACH transmission based on the beam (i.e., RX spatial filter) used when receiving the optimal SSB. In this case, a relationship between SSB(s) and RO(s) may be established for the purpose of allowing the base station or the network to know which SSB (i.e., beam) the terminal has selected. Through such the relationship, the base station may know the SSB (i.e., beam) selected by the terminal based on the RO in which the terminal has transmitted the PRACH. For example, the relationship between SSB(s) and RO(s) may be determined with reference to the higher layer configurations identical or similar to those shown in Table 5.

TABLE 5

```
RACH-ConfigCommon ::=                    SEQUENCE {
    rach-ConfigGeneric                   // set of RACH parameters
    totalNumberOfRA-Preambles            // the total number of RACH preambles (1~63)
    ssb-perRACH-OccasionAndCB-PreamblesPerSSB   CHOICE {
        oneEighth       // The number of preambles per SSB when one SSB is associated with eight ROs
        oneFourth       // The number of preambles per SSB when one SSB is associated with four ROs
        oneHalf         // The number of preambles per SSB when one SSB is associated with two ROs
        one             // The number of preambles per SSB when one SSB is associated with one RO
        two             // The number of preambles per SSB when two SSBs are associated with one RO
        four            // The number of preambles per SSB when four SSBs are associated with one RO
        eight           // The number of preambles per SSB when eigth SSBs are associated with one RO
        sixteen         // The number of preambles per SSB when sixteen SSBs are associated with one RO
    }
    groupBconfigured                     SEQUENCE {
        ra-Msg3SizeGroupA   // The size of a transport block fro contention-based RA of Group A
```

TABLE 5-continued

```
        messagePowerOffsetGroupB       // Threshold for preamble selection
        numberOfRA-PreamblesGroupA           // The number of CB preambles per SSB of Group A
    }
    ra-ContentionResolutionTimer   // Initial value of a contention resolution timer
    rsrp-ThresholdSSB       // Threshold for selection of an SSB and an associated RACH resource
    rsrp-ThresholdSSB-SUL   // Threshold for selection of an SSB and an associated RACH resource in
SUL
    prach-RootSequenceIndex                 CHOICE { // RACH root sequence index
        l839
        l139
    },
    msg1-SubcarrierSpacing      // SCS for Msg1 transmission
    restrictedSetConfig         // one of {unrestricted, restricted set A, restricted set B}
    msg3-transformPrecoder      // whether to apply transform precoding in transmisison of Msg3
    ...
}
RACH-ConfigGeneric ::=              SEQUENCE {
    prach-ConfigurationIndex    // indicates a preamble format, etc.
    msg1-FDM                    // The number of ROs FDMed at a time
    msg1-FrequencyStart         // frequnecy-axis offset of the lowest RO with reference to PRB 0
    zeroCorrelationZoneConfig   // N-CS configuration
    preambleReceivedTargetPower // Target power level at a network receiving node
    preambleTransMax
        // The maximum number of RA preambe transmissions performed unitl declaration of an RA
failure
    powerRampingStep        // Power ramping step
    ra-ResponseWindow       // Msg2 (RAR) window length (number of slots)
    ...,
}
```

Figure 7:
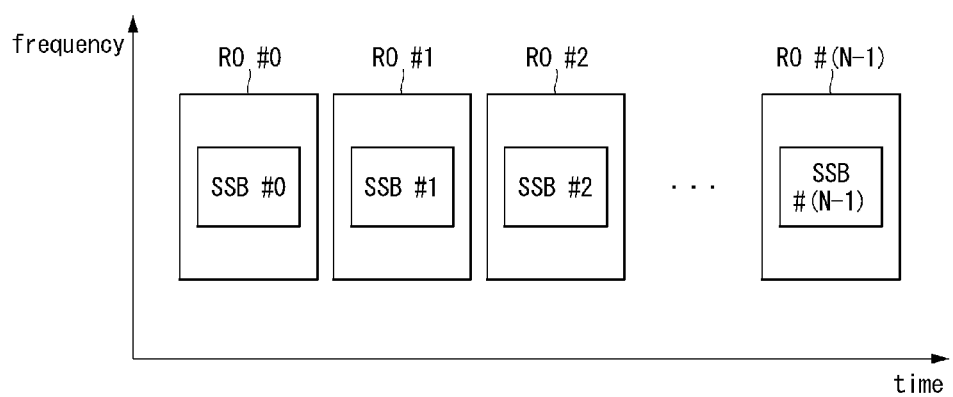
FIG. 7 is a conceptual diagram illustrating a first exemplary embodiment of SSB-RO association according to RACH configuration in a communication system.

FIG. 7 is a conceptual diagram illustrating a first exemplary embodiment of SSB-RO association according to RACH configuration in a communication system.

Referring to FIG. 7, in an SSB-RO mapping relation according to the RACH configurations, in a certain frequency band, N SSBs 710-1 to 710-n having time resources which are separated from each other may be mapped to ROs 720-1 to 720-n having time resources which are separated from each other on a one-to-one basis. For example, if a higher layer parameter msg1-FDM is set to 1 (i.e., msg1-FDM=one) and a higher layer parameter ssb-perRACH-OccasionAndCB-PreamblesPerSSB is set to 1 (e.g., ssb-perRACH-OccasionAndCB-PreamblesPerSSB=one), the N different SSBs 710-1 to 710-n may be mapped to the N different ROs 720-1 to 720-n on a one-to-one basis.

Figure 8:
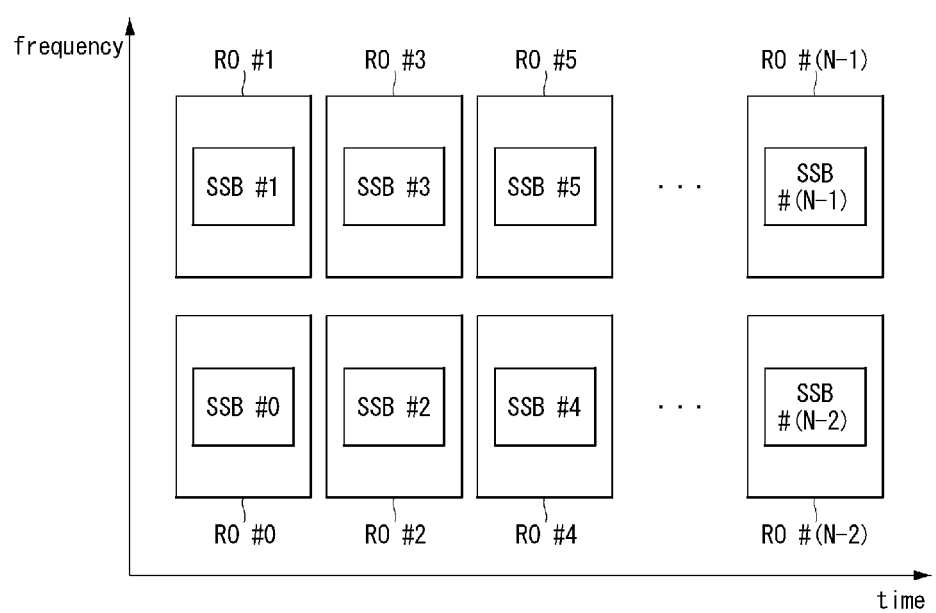
FIG. 8 is a conceptual diagram illustrating a second exemplary embodiment of SSB-RO association according to RACH configuration in a communication system.

FIG. 8 is a conceptual diagram illustrating a second exemplary embodiment of SSB-RO association according to RACH configuration in a communication system.

Referring to FIG. 8, in an SSB-RO mapping relation according to the RACH configurations, in a first frequency band, SSBs 810-1, 810-3, 810-5, . . . , and 810-(n−1) having time resources which are separated from each other may be mapped to ROs 820-1, 820-3, 820-5, . . . , and 820-(n−1) having time resources which are separated from each other on a one-to-one basis. In addition, in a second frequency band, SSBs 810-2, 810-4, 810-6, . . . , and 810-n having time resources which are separated from each other may be mapped to ROs 820-2, 820-4, 820-6, . . . , and 820-n) having time resources which are separated from each other on a one-to-one basis. For example, if the higher layer parameter msg1-FDM is set to 2 (i.e., msg1-FDM=two), and higher layer parameter ssb-perRACH-OccasionAndCB-PreamblesPerSSB is set to 2 (e.g., ssb-perRACH-OccasionAndCB-PreamblesPerSSB=two), the N different SSBs 810-1 to 810-n may be mapped to the N different ROs 820-1 to 820-n which are frequency division multiplexed (FDMed) in a frequency domain, on a one-to-one basis.

Meanwhile, the 5G NR communication system may support DCI formats shown in Table 6 based on Release-16.

TABLE 6

| DCI format | Usage |
|---|---|
| 0_0 | Used for scheduling a PUSCH within one cell |
| 0_1 | Used for scheduling one or more PUSCHs within one cell, or indicating downlink feedback information for a configured grant (CG) PUSCH (i.e., CG-DFI) |
| 0_2 | Used for scheduling a PUSCH within one cell |
| 1_0 | Used for scheduling a PDSCH within one cell |
| 1_1 | Used for scheduling a PDSCH within one cell or triggering a one-shot HARQ-ACK codebook feedback |
| 1_2 | Used for scheduling a PDSCH within one cell |
| 2_0 | Used for notifying a slot format, an available RB set, a channel occupancy time (COT) duration, and search space set group switching to a UE group |
| 2_1 | Used for notifying PRB(s) and OFDM symbol(s) assumed not to be intended to be used for transmission to a UE group |
| 2_2 | Used for transmission of a transmission power control (TPC) for a PUCCH and a PUSCH |
| 2_3 | Used for transmission of a TPC command group for SRS transmission by one or more UEs |
| 2_4 | Used for a UE to notify PRB(s) and OFDM symbol(s) for which UL transmission from the UE is cancelled to a UE group |
| 2_5 | Used for notifying availability of soft resources |
| 2_6 | Used for notifying power saving information outside a DRX active time to one or more UEs |
| 3_0 | Used for NR sidelink scheduling within one cell |
| 3_1 | Used for LTE sidelink scheduling within one cell |

A DCI may include downlink control information for one or more cells, and may be associated with one RNTI. The DCI may be encoded through the order of 1) information element multiplexing, 2) cyclic redundancy check (CRC) addition, 3) channel coding, and 4) rate matching, and decoding may also be performed in consideration of the above steps. In the above description, "a certain DCI is associated with one RNTI" may mean that CRC parity bits of the DCI are scrambled with the RNTI. Referring to Table 6, some DCI may include scheduling information of one or more PUSCHs for a certain cell.

For example, a CRC of the DCI format 0_1 may be scrambled with a C-RNTI, configured scheduling-RNTI (CS-RNTI), semi-persistent CSI RNTI (SP-CSI-RNTI), or modulation coding scheme cell RNTI (MCS-C-RNTI). The DCI format 0_1 may include at least one of the following information.

- Identifier for DCI format (1 bit): Indicator indicating a UL DCI format, which is always set to 0 in the case of DCI format 0_1
- Carrier indicator (0 or 3 bits): Indicator indicating a CC scheduled by the corresponding DCI
- DFI flag (0 or 1 bit): Configured grant downlink feedback information (CG-DFI) indicator.
- If the DCI format 0_1 is used for CG-DFI indication (when the DFI flag is set to 1), at least one of the following fields may be used:
- HARQ-ACK bitmap (16 bits), where the order of mapping HARQ process indexes within the bitmap is that the HARQ process indexes are mapped from the MSB to the LSB of the bitmap in ascending order. For each bit in the bitmap, a value of 1 indicates ACK, and a value of 0 indicates NACK.
- TPC command for a scheduled PUSCH (2 bits)
- All the remaining bits in the DCI format 0_1 are set to zero
- If the DCI format 0_1 is not used for CG-DFI indication (when there is no DFI flag field or DFI flag field is set to 0), at least one of the following fields may be used:
- UL/SUL indicator (0 or 1 bit): supplementary UL indicator.
- Bandwidth part indicator (0, 1, or 2 bits): Indicator indicating a BWP to be activated among uplink BWPs configured for the terminal.
- Frequency domain resource assignment: Indicator for allocating a frequency domain resource.
- Time domain resource assignment: Indicator for allocating a time domain resource.
- Frequency hopping flag (0 or 1 bit): Frequency axis hopping indicator
- Modulation and coding scheme (5 bits)
- New data indicator (NDI): Indicator indicating whether allocated data is new data or retransmission data.
- Redundancy version (RV): Indicator indicating an RV value when channel coding is applied to allocated data
- HARQ process number (4 bits): Indicator indicating a HARQ process to be allocated to scheduled data
- TPC command for a scheduled PUSCH (2 bits): TPC indicator
- SRS resource indicator: Aperiodic SRS resource selection indicator
- Precoding information and number of layers: Indicator indicating precoding and the number of transport layers to be used in PUSCH transmission
- Antenna ports: Indicator for uplink antenna ports to be used for PUSCH transmission
- SRS request: Indicator indicating whether to transmit aperiodic SRS
- CSI request: Indicator indicating whether and how to report channel state information
- PTRS-DMRS association: Indicator indicating a relationship between an uplink phase-noise tracking reference signal (PTRS) antenna port and a demodulation reference signal (DMRS) antenna port
- DMRS sequence initialization: Indicator for a DMRS sequence initialization value during OFDM-based uplink transmission
- UL-SCH indicator: Indicator indicating whether or not an uplink shared channel (UL-SCH) is included in a PUSCH (a PUSCH that does not include a UL-SCH needs to include CSI)
- Open-loop power control parameter set indication: Indicator indicating a set of open-loop power control (OPLC) parameter set
- Priority indicator: Uplink transmission priority indicator.
- Invalid symbol pattern indicator: Indicator indicating whether to apply an invalid symbol pattern configured by a higher layer As another example, a CRC of the DCI format 1_1 may be scrambled with a C-RNTI, CS-RNTI, or MCS-C-RNTI, and the DCI format 1_1 may include at least one of the following information.

- Identifier for DCI format (1 bit): Indicator indicating a DL DCI format, which is always set to 1 in the case of DCI format 1_1
- Carrier indicator (0 or 3 bits): Indicator indicating a CC scheduled by the corresponding DCI
- Bandwidth part indicator (0, 1, or 2 bits): Indicator indicating a BWP to be activated among downlink BWPs configured for the terminal
- Frequency domain resource assignment: Indicator for allocating a frequency domain resource
- Time domain resource assignment: Indicator for allocating a time domain resource
- PRB bundling size indicator: Indicator indicating a type (i.e., static or dynamic) and a size of PRB bundling
- Rate matching indicator: Indicator indicating a rate matching pattern configured by a higher layer
- ZP CSI-RS trigger: Indicator for applying aperiodic zero-power (ZP) CSI-RS
- 'modulation and coding scheme', 'new data indicator', and 'redundancy version' fields for a transport block 1
- 'modulation and coding scheme', 'new data indicator', and 'redundancy version' fields for a transport block 2
- HARQ process number: Indicator indicating a HARQ process to be allocated to scheduled data
- Downlink assignment index: DAI indicator for HARQ-ACK codebook generation in TDD operation.
- TPC command for a scheduled PUCCH: Power control indicator for PUCCH transmission.
- PUCCH resource indicator: Indicator indicating a PUCCH resource for transmitting HARQ-ACK information for an allocated PDSCH or a predetermined PDSCH set
- PDSCH-to-HARQ_feedback timing indicator: Indicator indicating a time axis offset between the allocated PDSCH and the PUCCH
- Antenna port(s): Indicator indicating antenna ports to be used for PDSCH transmission/reception
- Transmission configuration indication: Indicator indicating transmission configuration information (TCI) to be used for PDSCH transmission and reception
- SRS request: Indicator indicating whether to transmit aperiodic SRS
- DMRS sequence initialization: Indicator for a DMRS sequence initialization value used for PDSCH transmission and reception
- Priority indicator: PDSCH reception priority indicator As another example, certain DCI formats may be used to deliver the same control information to one or more terminals. For example, a CRC of the DCI format 2_3 may be scrambled with a transmit power control-sounding reference signal-RNTI (TPC-SRS-RNTI), and may include at least one of the following information.

Block number 1, Block number 2, ..., Block number B: Indicators indicating resource regions to which the DCI format 2_3 is applied. A starting part of the block is configured by a higher layer parameter startingBitOfFormat2-3 or startingBitOfFormat2-3SUL-v1530.

When a terminal for which a higher layer parameter srs-TPC-PDCCH-Group is set to type A performs uplink transmission without a PUCCH and PUSCH or uplink transmission in which SRS power control is not tied to PUSCH power control, one block is configured by the higher layer, and the following fields are defined for the block.

SRS request (0 or 2 bits): Aperiodic SRS transmission indicator

TPC command number 1, TPC command number 2, ..., TPC command number N: Indicators indicating uplink power control to be applied to a UL carrier indicated by a higher layer parameter cc-IndexInOneCC-Set.

When a terminal for which a higher layer parameter srs-TPC-PDCCH-Group is set to type B performs uplink transmission without a PUCCH and PUSCH or uplink transmission in which SRS power control is not tied to PUSCH power control, one or more blocks may be configured by the higher layer, and the following fields are defined for each block.

SRS request (0 or 2 bits): Aperiodic SRS transmission indicator.

TPC command (2 bits)

As another example, certain DCI formats may be used to deliver the same control information to one or more terminals. For example, a CRC of the DCI format 2_0 may be scrambled with an SFI-RNTI, and may be used for notifying information such as a slot format, a channel occupancy time (COT) duration, an available RB set, a search space set group switching, or the like. Specifically, the DCI format 2_0 may include at least one of the following information.

When a higher layer parameter slotFormatCombToAddModList is configured,
Slot format indicator 1, Slot format indicator 2, ..., Slot format indicator N When a higher layer parameter availableRB-SetsToAddModList-r16 is configured,
Available RB set indicator 1, Available RB set indicator 2, ..., Available RB set indicator N1

When a higher layer parameter co-DurationsPerCellToAddModList-r16 is configured,
COT duration indicator 1, COT duration indicator 2, ..., COT duration indicator N2

When a higher layer parameter searchSpaceSwitchTriggerToAddModList-r16 is configured,
Search space set group switching flag 1, Search space set group switching flag 2, ..., Search space set group switching flag M The size of the DCI format 2_0 may be set by higher layer signaling as one of 0 to 128 bits. For example, the DCI format 2_5 may be used to notify availability of soft-type resources of an IAB node. A CRC of the DCI format 2_5 may be scrambled with an availability indicator-RNTI (AI-RNTI), and may include the following information.

Availability indicator 1, Availability indicator 2, ..., and Availability indicator N As the size of DCI format 2_5, one of values less than or equal to 128 bits may be set by higher layer signaling. The terminal may receive configuration information of a CORESET #0 and a search space #0, identical or similar to that shown in Table 7.

TABLE 7

| PDCCH-ConfigSIB1 ::= | SEQUENCE { |
|---|---|
| controlResourceSetZero | |
| searchSpaceZero | |
| } | |
| ControlResourceSetZero BWP | // indicates a configuration value (0~15) of a CORESET #0 within an initial |
| SearchSpaceZero BWP | // indicates a configuration value (0~15) of a search space #0 within an initial |

The terminal may refer to the following higher layer configurations for cell-specific PDCCH monitoring, identical or similar to those shown in Tables 8 to 9.

TABLE 8

| PDCCH-ConfigCommon ::= | SEQUENCE { |
|---|---|
| controlResourceSetZero // indicates a configuration value (0~15) of a CORESET #0 within an initial BWP | |
| commonControlResourceSet | |
|   // configure a common CORESET by referring to CORESET configuration | |
| searchSpaceZero // indicates a configuration value (0~15) of a search space #0 within an initial BWP | |
| commonSearchSpaceList // configures a search sapce to be used for cell-specific PDCCH monitoring by referring to up to four search space configurations | |
|   searchSpaceSIB1 | // search space configuration for SIB1 |
|   searchSpaceOtherSystemInformation | // search space configuration for SIB2 or other SIBs |
|   pagingSearchSpace | // search space configuration for paging |
|   ra-SearchSpace | // search space configuration for random access procedure |
| ... | |
| } | |
| ControlResourceSet ::= | SEQUENCE { |
|   controlResourceSetId | // CORESET ID (a value other than 0 is used) |
|   frequencyDomainResources | // configuration of frequency resources of a CORESET |
|   duration | // configuration of a time-axis length (symbols) of a CORESET |
|   cce-REG-MappingType | CHOICE { // CCE-to-REG mapping configuration |
|     interleaved | SEQUENCE { |

TABLE 8-continued

```
        reg-BundleSize
        interleaverSize
        shiftIndex
    },
    nonInterleaved
},
precoderGranularity
tci-StatesPDCCH-ToAddList
        // indicates a QCL relation possible between a QCL reference RS and a PDCCH DMRS
tci-StatesPDCCH-ToReleaseList
tci-PresentInDCI              // indicates whether a TCI field exists within the DCI format 1_1
pdcch-DMRS-ScramblingID              // indicates a scrambling initialization value of a PDCCH DMRS
    ...
}
```

15

TABLE 9

```
SearchSpace ::=                    SEQUENCE {
    searchSpaceId                  // search space ID
    controlResourceSetId           // CORESET ID associated with the search space
    monitoringSlotPeriodicityAndOffset    CHOICE { // periodicity and offset of a PDCCH monitoring slot
        sl1                        // performs PDCCH monitoring in every slot
        ...
                                   // (omitted) monitoring offset values when a PDCCH monitoring periodicity is one of 2
to 1280 slots
        sl2560                     // a monitoring offset value when a PDCCH monitoring periodicity is 2560 slots
    }
    duration    // the number of slots where a search space exists for each occasion
╬
    monitoringSymbolsWithinSlot
    // a position of a first symbol on which monitoring is to be performed within a PDCCH monitoring
slot
    nrofCandidates                 SEQUENCE {
        aggregationLevel1          // The number of PDCCH candidates in case of aggregation level 1
        aggregationLevel2          // The number of PDCCH candidates in case of aggregation level 2
        aggregationLevel4          // The number of PDCCH candidates in case of aggregation level 4
        aggregationLevel8          // The number of PDCCH candidates in case of aggregation level 8
        aggregationLevel16         // The number of PDCCH candidates in case of aggregation level 16
    }
    searchSpaceType                           CHOICE { // indicates a search space type (common or
UE-specific) and DCI formats
        common                                SEQUENCE {
            dci-Format0-0-AndFormat1-0                SEQUENCE {
                ...
            }
            dci-Format2-0                             SEQUENCE {
                nrofCandidates-SFI                        SEQUENCE {
                    ...
                },
                ...
            }
            dci-Format2-1
            dci-Format2-2
            dci-Format2-3                             SEQUENCE {
                dummy 1
                dummy 2
            }
        },
        ue-Specific                           SEQUENCE {
            dci-Formats
            ...,
        }
    }
}
```

The terminal may refer to the following higher layer configurations for UE-specific PDCCH monitoring, identical or similar to those shown in Table 10.

TABLE 10

```
PDCCH-Config ::=                           SEQUENCE {
  controlResourceSetToAddModList
    // At most three CORESETs are configured by referring to CORESET configuration
  controlResourceSetToReleaseList
  searchSpacesToAddModList
    // At most ten search spaces are configured by referring to search space configuration
  searchSpacesToReleaseList
  downlinkPreemption              // downlink preemption indicator
  tpc-PUSCH                       // configuraion of reception of a group TPC for PUSCH transmission
  tpc-PUCCH                       // configuration of reception of a group TPC for PUCCH transmission
  tpc-SRS                         // configuration of reception of a group TPC for SRS transmission
  ...,
}
```

The presence of one antenna port may mean a case in which a channel experienced by a symbol transmitted through the corresponding antenna port can be estimated or inferred from a channel experienced by another symbol transmitted through the same antenna port.

"Two different antenna ports are quasi co-located (QCLed)" may mean a case in which large-scale characteristics of a channel experienced by a symbol transmitted through one antenna port can be estimated or inferred from a channel experienced by a symbol transmitted through another antenna port. The large-scale characteristics of the channel may mean at least one of 'delay spread', 'Doppler spread', 'Doppler shift', 'average gain', 'average delay', and 'spatial Rx parameters'.

When time/frequency resources of a certain signal (e.g., QCL target RS) are insufficient and large-scale characteristics of a channel cannot be accurately measured with only the corresponding signal, information (i.e., QCL information) on another signal (e.g., QCL reference RS having sufficient time/frequency resources) having large-scale characteristics that can be reused for reception of the corresponding signal (i.e., QCL target RS) may be provided to the terminal to improve the channel measurement performance of the terminal. The NR communication system may support various QCL types as follows.

QCL-Type A: including {Doppler shift, Doppler spread, average delay, delay spread}.
QCL-Type B: including {Doppler shift, Doppler spread}
QCL-Type C: including {Doppler shift, average delay}
QCL-Type D: including {Spatial Rx parameters}

Figure 9:
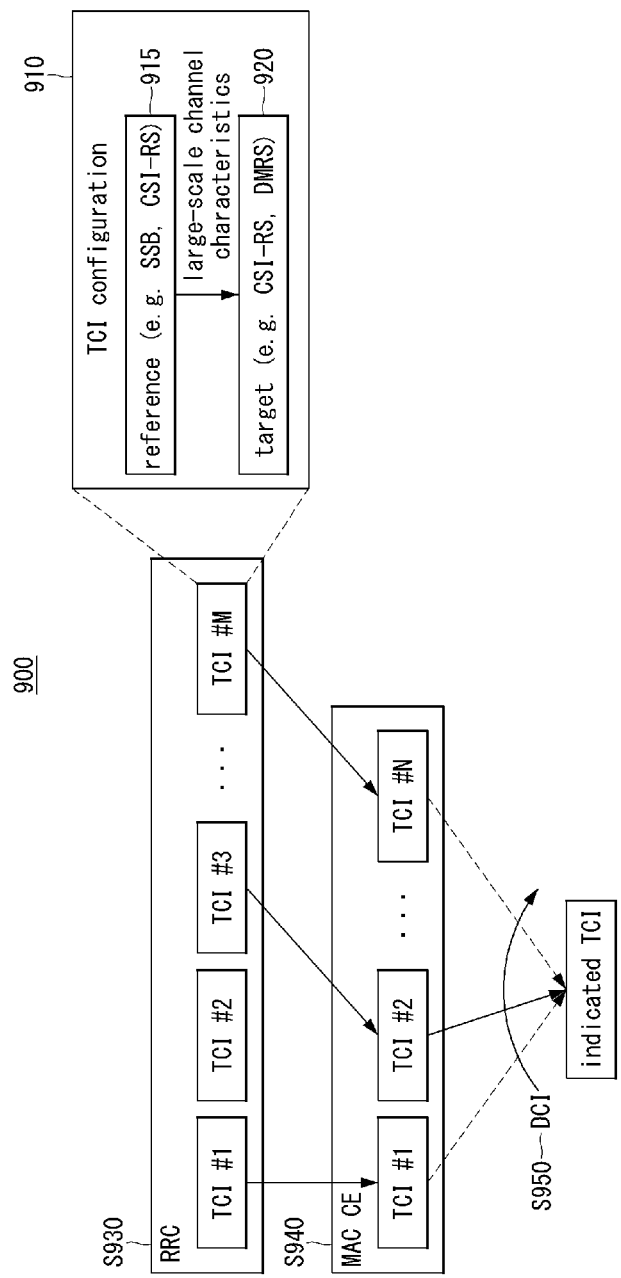
FIG. 9 is a conceptual diagram illustrating an exemplary embodiment of a QCL information transfer process through TCI state configuration and indication in a communication system.

FIG. 9 is a conceptual diagram illustrating an exemplary embodiment of a QCL information transfer process through TCI state configuration and indication in a communication system.

Referring to FIG. 9, in a process of transmitting QCL information through TCI state configuration and indication in a communication system 900, a base station may configure at most M TCI states to a terminal through higher layer (i.e., RRC) signaling, in accordance with a UE capability report and a maximum value (e.g., 4, 8, 64, or 128 depending on a frequency band) defined in a technical specification (S930). In this case, each TCI state configuration 910 may include information on a signal or channel (i.e., QCL reference 915) that provides large-scale channel characteristics to a signal or channel (i.e., QCL target 920) referring to the TCI. One TCI state configuration 910 may include up to two references (i.e., qcl-Type1 and qcl-Type2), the first reference may be one of the QCL-Type A, QCL-Type B, and QCL-type C (i.e., qcl-type1 ∈ {QCL-type A, QCL-type B, QCL-type C}), and the second reference may be the QCL-type D if present (i.e., qcl-type 2=QCL-type D).

Allowing the base station to apply all the TCIs configured through the RRC signaling in real time may greatly increase implementation complexity of the terminal, the base station may transmit an activation message for some of the TCIs configured through the RRC signaling to the terminal through L2 signaling such as a MAC CE (S940). The base station may activate a maximum of N (<M) TCIs, and the terminal may receive a dynamic indication only for the activated TCI.

Thereafter, the base station may dynamically indicate to the terminal some of the activated N TCIs through L1 signaling such as a DCI (S950). The terminal may apply QCL information indicated by the corresponding TCI at a predetermined timing after receiving the L1 signaling, and may perform a reception operation for the signal or channel.

The TCI state indication steps including the 'RRC signaling (S930)', 'MAC CE signaling (S940)', and 'DCI signaling (S950)' of FIG. 9 may be partially omitted depending on a type of the QCL target RS. For example, when the QCL target is a PDSCH DMRS, and one or more TCI states are configured through RRC signaling, the base station may indicate the TCI state using all the steps of FIG. 9. However, when the QCL target is a PDSCH DMRS, and a single TCI state is configured through RRC signaling, the MAC CE signaling (S940) and the DCI signaling step (S950) may be omitted. Similarly, when the QCL target is a PDCCH DMRS, the DCI signaling step S940 may be omitted. Specifically, the terminal may obtain configuration information for the TCI states and QCL information with reference to the RRC signaling identical or similar to those shown in Table 11.

TABLE 11

```
TCI-State ::=      SEQUENCE { // TCI configuration (I.1-00)
  tci-StateId         // TCI state ID
  qcl-Type1           // first QCL reference configured by referring to QCL information
  qcl-Type2           // second QCL reference configured by referring to QCL information
  ...
}
QCL-Info ::=       SEQUENCE {
  cell                // index of a cell in which QCL reference is transmitted
```

TABLE 11-continued

```
    bwp-Id              // index of a BWP in which QCL reference is transmitted
    referenceSignal           CHOICE {
        csi-rs          // index of a CSI-RS to be referred when QCL reference is a CSI-RS
        ssb             // index of an SSB to be referred when QCL reference is an SSB
    },
    qcl-Type
        // QCL type to be applied to a QCL target (one of QCL-type A, QCL-type B, QCL-type C,
and QCL-type D)
    ...
}
```

The base station may instruct the terminal to activate or deactivate some of the TCI states configured by the RRC signaling through MAC CE signaling, or may instruct the terminal to apply a TCI state indicated by a MAC CE to the QCL target RS. For example, the base station may use the following MAC CE signaling according to the type of the QCL target RS.

- TCI state activation/deactivation MAC CE for a UE-specific PDSCH DMRS
- TCI state indication MAC CE for a UE-specific PDCCH DMRS
- TCI state activation/deactivation MAC CE for an enhanced UE-specific PDSCH DMRS FIG. 10 is a conceptual diagram illustrating an exemplary embodiment of a TCI state activation/deactivation MAC CE in a communication system.

Referring to FIG. 10, a first octet (Oct 1) in a TCI state activation/deactivation MAC CE for a UE-specific PDSCH DMRS may include a CORESET pool ID field 1010, a serving cell ID field 1020, and a BWP ID field 1030, and a second octet (Oct 2) to an N-th octet (Oct N) may include $T_i$ fields 1040 indicating TCI state IDs i. The detailed meaning of each field may be as follows, and the sizes thereof may be variable.

- Serving cell ID: a serving cell ID to which the MAC CE is applied
- BWP ID: BWP ID to which the MAC CE is applied, which indicates a BWP in association with a BWP indication field within the DCI
- $T_i$: indicates a TCI state ID i. When this value is set to 0, it may mean that a TCI state whose TCI state ID is i is deactivated, and when this value is set to 1, it may mean that a TCI state whose TCI state ID is i is activated. The TCI states activated by 1 may be sequentially mapped to TCI indication field code points within the DCI.
- CORESET pool ID: If a DCI scheduling a PDSCH is monitored in a CORESET that does not include a higher layer parameter coresetPoolIndex, the field may be ignored. If a DCI scheduling a PDSCH is monitored in a CORESET including the higher layer parameter coresetPoolIndex, $T_i$ indication may be applied only when a value of the CORESET pool ID matches a value of coresetPoolIndex of the CORESET.

Figure 11:
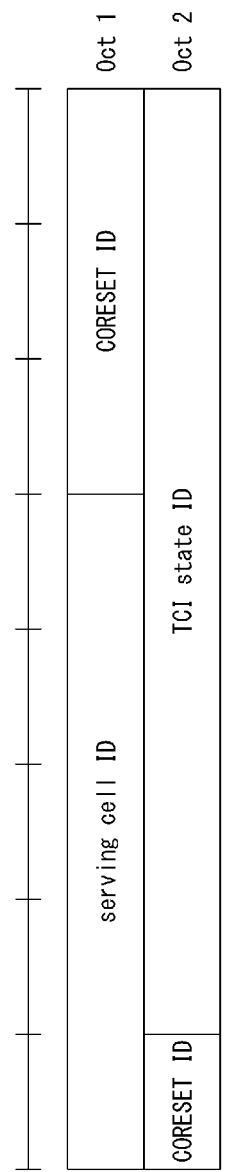
FIG. 11 is a conceptual diagram illustrating an exemplary embodiment of a TCI state indication MAC CE in a communication system.

FIG. 11 is a conceptual diagram illustrating an exemplary embodiment of a TCI state indication MAC CE in a communication system.

Referring to FIG. 11, a first octet (Oct 1) in a TCI state activation/deactivation MAC CE for a UE-specific PDSCH DMRS may include a serving cell ID field 1110 and a CORESET ID field 1120, and a second octet (Oct 2) may include a CORESET ID field 1130 and a TCI state ID field 1140. The sizes thereof may be variable.

- Serving cell ID: a serving cell ID to which the corresponding MAC CE is applied.
- CORESET ID: indicates a CORESET to which the MAC CE is applied. If this value is set to 0, a CORESET configured through controlResourceSetZero may be a CORESET #0.
- TCI state ID: means a TCI state ID indicated by the corresponding MAC CE.

The base station may configure spatial relation information to the terminal through higher layer (e.g., RRC) signaling in order to indicate uplink beam information. The spatial relation information may mean a signaling structure for using spatial domain filters used for transmission and reception of a reference RS for spatial TX filters for uplink transmission of a target RS according to the corresponding spatial relation. The spatial reference RS may be a downlink signal such as SSB or CSI-RS, and may also be an uplink signal such as SRS. If the reference RS is a downlink signal, the terminal may use the spatial RX filter values used for receiving the reference RS as spatial TX filter values for transmitting the target RS according to the spatial relation. If the reference RS is an uplink signal, the terminal may use the spatial TX filter values used for transmitting the reference RS as the spatial TX filter values for transmitting the target RS according to the spatial relation.

The signaling structure for the spatial relation information may vary depending on the type of target RS. For example, when the target RS is an SRS, the base station may perform RRC configuration for each SRS resource based on message identical or similar to those shown in Table 12.

TABLE 12

```
SRS-SpatialRelationInfo ::=  SEQUENCE {
    servingCellId            // index of a serving cell in which a reference RS is transmitted
    referenceSignal              CHOICE {
        ssb-Index            // SSB index when a reference RS is SSB
        csi-RS-Index         // CSI-RS resource index when a reference RS is CSI-RS
        srs                      SEQUENCE {
```

TABLE 12-continued

```
    resourceId          // SRS resource index when a reference RS is SRS
    uplinkBWP           // index of a UL BWP in which SRS is transmitted when a reference RS is
SRS
    }
  }
}
```

For example, when the target RS is an SRS, the base station may perform RRC configuration for each SRS resource, identical or similar to those shown in Table 13.

TABLE 13

```
PUCCH-SpatialRelationInfo ::=    SEQUENCE {
    pucch-SpatialRelationInfoId  // spatial relation information ID for PUCCH
    servingCellId                // index of a serving cell in which a reference RS is transmitted
    referenceSignal              CHOICE {
      ssb-Index                  // SSB index when a reference RS is SSB
      csi-RS-Index               // CSI-RS resource index when a reference RS is CSI-RS
      srs                        // specifiy a SRS resource by referring to PUCCH-SRS configuration
  },
  pucch-PathlossReferenceRS-Id
      // index of a RS resource to be used for measurement of a pathloss of a PUCCH
  p0-PUCCH-Id    // index of confuring p0 for PUCCH power control
  closedLoopIndex   // configuration value of closed-loop power control
}
PUCCH-SRS ::= SEQUENCE {
    resource                     // SRS resource index
    uplinkBWP                    // index of a BWP in which SRS is transmitted
}
```

In the 5G NR communication system, a slot format may include downlink symbol(s), uplink symbol(s), and/or flexible symbol(s).

Figure 12:
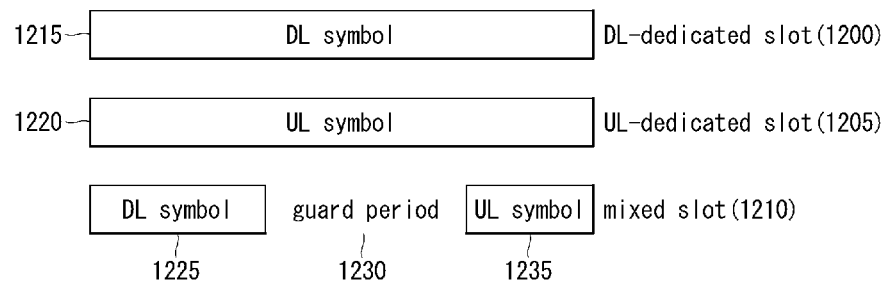
FIG. 12 is a conceptual diagram illustrating slot configurations according to slot formats in a communication system.

FIG. 12 is a conceptual diagram illustrating slot configurations according to slot formats in a communication system.

Referring to FIG. 12, in slot configurations according to slot formats in a communication system, a downlink dedicated slot 1200 may be a slot in which all symbols within the slot are configured only as downlink symbols 1215 according to a slot format. As another example, an uplink dedicated slot 1205 may be a slot in which all symbols within the slot are configured only as uplink symbols 1220 according to a slot format. As another example, in a downlink/uplink mixed slot 1210, some symbols within the slot may be configured as downlink symbols 1225, and some symbols within the slot may be configured as uplink symbols 1235 according to a slot format. In this case, specific symbols of the mixed slot 1210 including both the uplink and downlink symbols may be configured or indicated as a guard period 1230 for downlink-uplink switching, and the terminal may not perform transmission/reception during the guard period 1230.

In the 5G NR communication system, the base station may configure a 'slot format' over one or more slots for each serving cell to the terminal through a higher layer parameter tdd-UL-DL-ConfigurationCommon. In this case, the higher layer parameter tdd-UL-DL-ConfigurationCommon may include or refer to at least one of the following information.

Reference subcarrier spacing: reference numerology $\mu_{ref}$

Pattern 1: A first pattern.

Pattern 2: A second pattern.

Here, the pattern 1 or pattern 2 may include at least one of the following configurations.

Slot configuration periodicity (i.e., dl-UL-Transmission-Periodicity): Slot configuration periodicity P expressed in units of msec Number of downlink dedicated slots (i.e., nrofDownlinkSlots): The number $d_{slots}$ of slots composed only of downlink symbols Number of downlink symbols (i.e., nrofDownlinkSymbols): The number $d_{sym}$ of downlink symbols Number of uplink dedicated slots (i.e., nrofUplinkSlots): The number $\mu_{slots}$ of slots composed only of uplink symbols Number of uplink symbols (i.e., nrofUplinkSymbols): The number $\mu_{sym}$ of uplink symbols The slot configuration periodicity P msec of the first pattern may include $S=P \cdot 2^{\mu_{ref}}$ slots, and in this case, the numerology may follow $\mu_{ref}$. In addition, among the S slots, the first $d_{slots}$ slots may include only downlink symbols, and the last $\mu_{slots}$ slots may include only uplink symbols. In this case, $d_{sym}$ symbols after first $d_{slots}$ slots may be downlink symbols. In addition, $\mu_{sym}$ symbols before last $\mu_{slots}$ slots may be uplink symbols. The remaining symbols (i.e., $(S-d_{slots}-\mu_{slots}) \cdot N_{symb}^{slots}-d_{sym}-\mu_{sym}$ symbols) that are not designated as downlink symbols or uplink symbols in the pattern may be flexible symbols.

If the second pattern is configured and the slot configuration periodicity of the second pattern is $P_2$, a slot configuration periodicity $P+P_2$ msec configured with a combination of the first pattern and the second pattern may include first $S=P \cdot 2^{\mu_{ref}}$ slots and second $S_2=P_2 \cdot 2^{\mu_{ref}}$ slots. In this case, the positions and numbers of downlink symbols, uplink symbols, and flexible symbols in the second pattern may be configured with reference to the description of the first pattern based on configuration information of the second pattern. In addition, when the second pattern is configured, the terminal may assume that $P+P_2$ is a divisor of 20 msec.

The base station may override direction(s) of 'flexible symbol(s)' among symbols configured through the higher layer parameter tdd-UL-DL-ConfigurationCommon by using the higher layer parameter tdd-UL-DL-Configuration-Dedicated) based on the following information.

Slot configuration set (i.e., slotSpecificConfigurations-ToAddModList): A set of slot configurations Slot index (i.e., slotIndex): An index of a slot included in the set of slot configurations Symbol directions (i.e., symbols): The directions of the symbols indicated by the slot index (i.e., slotIndex). If all symbol directions are downlink (symbols=allDownlink), all symbols within the corresponding slot are downlink symbols. If all symbol directions are uplink (symbols=allUplink), all symbols within the corresponding slot are uplink symbols. If the symbol directions are explicit (symbols=explicit), nrofDownlinkSymbols may indicate the number of downlink symbols located in the first part of the corresponding slot, and nrofUplinkSymbols may indicate the number of uplink symbols located in the last part of the corresponding slot. If the nrofDownlinkSymbols or the nrofUplinkSymbols is omitted, the corresponding parameter may be regarded as indicating a value of 0. The remaining symbols within the slot become flexible symbols.

In the 5G communication system, the base station may indicate a slot format to the terminal based on L1 signaling. For example, when the terminal receives a higher layer parameter SlotFormatIndicator from the base station, the terminal may obtain configuration information a slot format indication-RNTI (i.e., SFI-RNTI). Meanwhile, when the terminal receives a higher layer parameter dci-PayloadSize from the base station, the terminal may obtain configuration information of a payload size of the DCI format 2_0. In addition, the terminal may additionally receive, from the base station, information on PDCCH candidate(s), CCE aggregation level, and search space set(s) of a CORESET for monitoring the DCI format 2_0. Each slot format indication (SFI) index field in the DCI format 2_0 may indicate a slot format to be applied to each slot in a slot set of a DL BWP and a UL BWP from a slot in which the terminal has detected the corresponding DCI format 2_0. In this case, the size of the slot set may be equal to or greater than a PDCCH monitoring periodicity of the DCI format 2_0. For example, when the slot set is composed of N slots, the DCI format 2_0 may include N SFI index fields, and each SFI index field may indicate a format value of Table 14 and Table 15 below. In Tables 14 and 15, 'D' may mean a downlink symbol, 'U' may mean an uplink symbol, and 'F' may mean a flexible symbol.

TABLE 14

| Slot for-mat | Symbol number within a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |

TABLE 14-continued

| Slot for-mat | Symbol number within a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |

TABLE 15

| Slot for-mat | Symbol number within a slot | | | | | | | | | | | | | |
|---|---|---|---|---|---|---|---|---|---|---|---|---|---|---|
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | F | U | D | D | D | D | D | F | U | U |
| 47 | D | D | F | U | U | U | U | D | D | F | U | U | U | U |
| 48 | D | F | U | U | U | U | U | D | F | U | U | U | U | U |
| 49 | D | D | D | F | F | U | D | D | D | D | F | F | U | U |
| 50 | D | D | F | F | U | U | D | D | F | F | U | U | U | U |
| 51 | D | F | F | U | U | U | D | F | F | U | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | D | D | D | D | D | D | D | D |
| 55 | D | D | F | F | F | U | U | U | D | D | D | D | D | D |
| 56-254 | Reserved | | | | | | | | | | | | | |
| 255 | UE determines a slot format of a slot based on a higher layer parameter tdd-UL-DL-ConfigurationCommon or a higher layer parameter tdd-UL-DL-ConfigurationDedicated, and a detected DCI format (when exists). | | | | | | | | | | | | | |

In the 5G NR communication system, it may be possible to support flexible and dense wireless backhaul links for each cell through the IAB feature, without support of a wired network.

Figure 13:
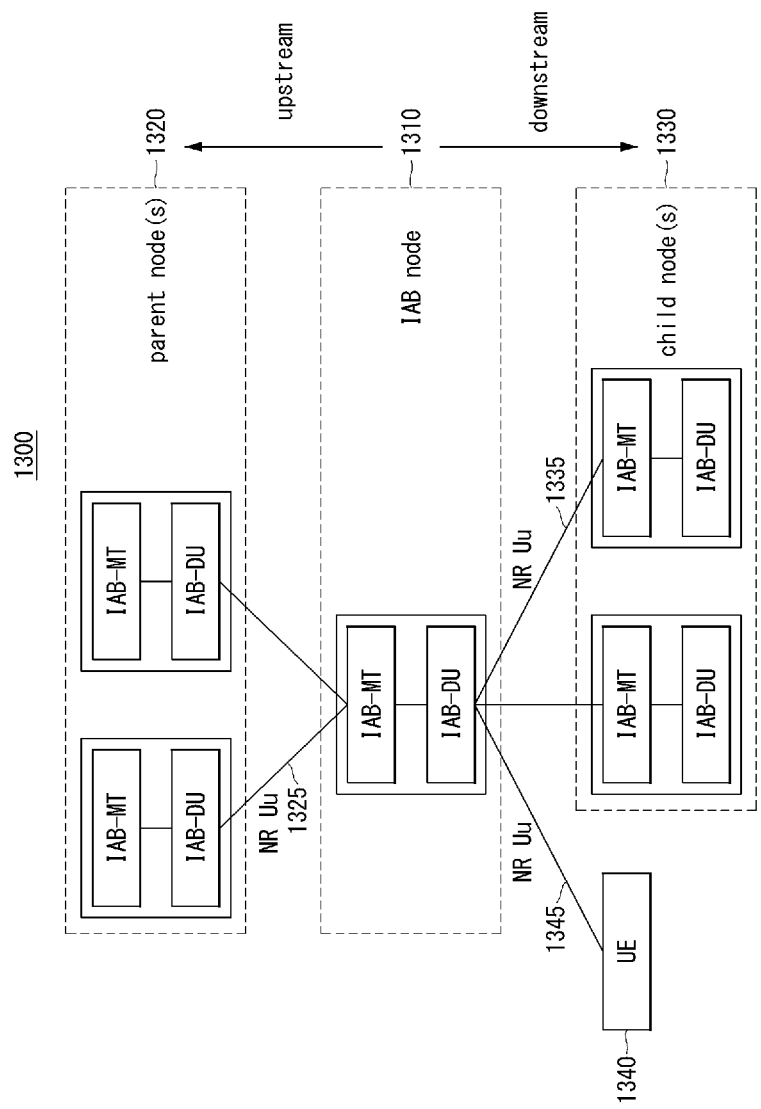
FIG. 13 is a conceptual diagram illustrating an exemplary embodiment of an IAB network in a communication system.

FIG. 13 is a conceptual diagram illustrating an exemplary embodiment of an IAB network in a communication system.

Referring to FIG. 13, a communication system 1300 may include one or more communication nodes. The communication nodes of the communication system 1300 may constitute an IAB network. For example, the communication system 1300 may include one or more IAB nodes. FIG. 13 shows an exemplary embodiment in which one IAB node communicates with one or more upper nodes and one or more lower nodes. However, this is only an example for convenience of description, and exemplary embodiments of the present disclosure are not limited thereto.

The communication system 1300 may include a plurality of IAB nodes. For example, the communication system 1300 may include a first IAB node 1310, one or more parent nodes 1320 corresponding to upper nodes of the first IAB node 1310, and/or one or more child nodes corresponding to lower nodes of the first IAB node 1310. Here, each of the one or more parent nodes 1320 may be referred to as a 'donor node'. The IAB node 1310, the one or more parent nodes 1320, and/or the one or more child nodes 1330 may constitute the IAB network. Each of the IAB nodes 1310, 1320, and 1330 constituting the IAB network may function as a type of repeater configured based on a front-haul structure. In the communication system 1300 to which the IAB network technology is applied, it is possible to support flexible and dense wireless backhaul links for each cell without support of a wired network.

Each of the IAB nodes 1310, 1320, and 1330 may include an IAB-DU and an IAB-MT. The IAB-MT may allow each IAB node to function as a terminal in communication with an upper node. For example, the first IAB node 1310 may communicate with the upper parent nodes 1320 through the IAB-MT. On the other hand, the IAB-DU may allow each IAB node to function as a base station or a cell in communication with a lower node. For example, the first IAB node 1310 may communicate with the lower child nodes 1330 or a terminal 1340 through the IAB-DU.

The IAB-MT of the first IAB node 1310 may be connected to the IAB-DUs of the parent nodes 1320 through Uu interfaces 1325. The IAB-DU of the first IAB node 1310 may be connected to the IAB-MTs of the child nodes 1330 through Uu interfaces 1335. The IAB-DU of the first IAB node 1310 may be connected to a terminal 1340 through a Uu interface 1345.

After the IAB node constituting the IAB network completely decodes a received signal, the IAB node may re-encode the decoded received signal, and amplify and transmit it. The IAB node may be classified as a type of regenerative relay. To this end, the IAB node may support a control plane (CP) and a user plane (UP) from the parent node to the terminal based on a protocol stack structure including the L1 and L2 layers, or higher layers.

The IAB node constituting the IAB network has an advantage of being able to perform various operations including operations as a base station and a terminal. On the other hand, the IAB node has disadvantages in that implementation complexity and production cost are relatively high, and a delay required for retransmission may be relatively large.

Figure 14:
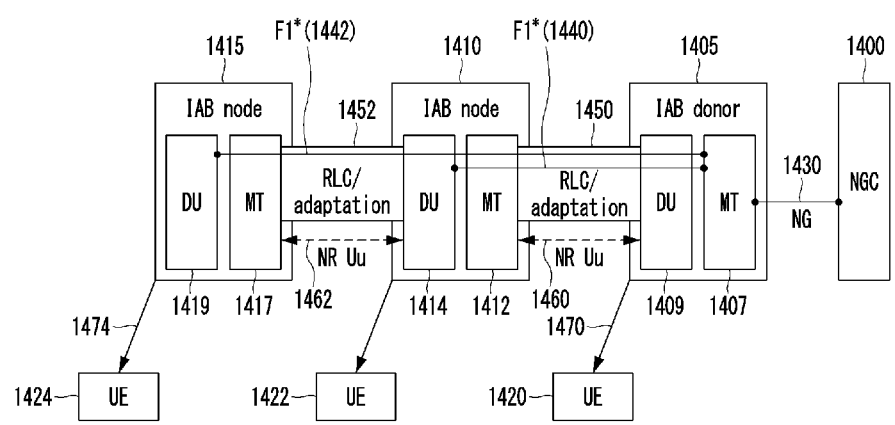
FIG. 14 is a block diagram illustrating an exemplary embodiment of a functional split structure of a central unit (CU) and a distributed unit (DU) in a communication system.

FIG. 14 is a block diagram illustrating an exemplary embodiment of a functional split structure of a central unit (CU) and a distributed unit (DU) in a communication system.

Referring to FIG. 14, in a CU-DU functional split structure in the IAB network, IAB nodes 1410 and 1415 in a two-hop chain are connected to an IAB donor 1405, and each of the IAB nodes 1410 and 1415 and terminals 1420, 1422, and 1424 may be connected to a next generation core (NGC) 1400 in a stand-alone (SA) mode. The IAB nodes 1410 and 1415 may include one DU and one MT, respectively. A certain IAB node (e.g., 1415) may be connected to the parent IAB node 1410 or the IAB donor 1405 via an MT 1417. As another example, a certain IAB node (e.g., 1410) may establish a RLC channel with the MT 1417 of the child IAB node 1415 through a DU 1414. In this case, the RLC channels 1450 and 1452 established for the MTs 1412 and 1417 may additionally include some information for IAB operations in addition to the existing components of a RLC channel for a terminal. Accordingly, the RLC channels 1450 and 1452 may be collectively referred to as 'modified RLC* (RLC*)'.

One IAB node may be connected to DUs of one or more parent IAB nodes or IAB donors. In this case, the IAB node may include a plurality of DUs, but each DU of the IAB node may have an F1-C connection 1440 or 1442 with a single IAB donor CU-CP. Even if the IAB node has a plurality of UP connections, the IAB node may operate based on a single CP connection (i.e., the IAB node may operate by being connected to a single IAB donor), so that no confusion occurs in operations of the IAB node.

The IAB donor 1405 may include the DU for supporting MTs of terminals and child IAB nodes. The IAB donor 1405 may include the CU 1407 for DUs 1409, 1414, and 1419 of itself and all child IAB nodes. It may be assumed that a certain IAB donor has a single IAB donor, and an IAB donor that manages the corresponding IAB donor may be changed by a topology adaptation function. A DU of an IAB node may be connected to a CU of the corresponding IAB donor through an F1 interface or a modified F1 interface (modified F1, F1*) (e.g., 1440, 1442). F1*-user plane (U) may be operated on the RLC channels 1450 and 1452 between the corresponding IAB-MTs 1417 and 1412 and the DUs 1414 and 1409 of the parent IAB node or donor.

Hereinafter, for convenience of description, in the present disclosure, higher layer parameters or higher layer configurations may not be limited to the above-described L2 and L3 signaling, and may collectively include information transmitted or configured through the F1 interfaces 1440 and 1442, the NG interface 1430 for connecting the CU to the NGC, the X2 interface, and the like.

Although it may seem that the slot format configuration and indication methods described with reference to FIGS. 11 and 12 are limited to terminals performing communication with the base station, this is only an example for convenience of description, and exemplary embodiments of the present disclosure are not limited thereto. For example, the slot format configuration and indication methods described with reference to FIGS. 11 and 12 may be similarly applied to the case of IAB-DU and/or IAB-MT. For example, for each serving cell of the IAB-DU, the IAB-DU may receive a higher layer parameter IAB-DU-Resource-Configuration for IAB-DU resource configuration, thereby configuring a slot format in each slot set. On the other hand, the IAB-MT may receive configuration information of 'slot format' over one or more slots for each serving cell through a higher layer parameter tdd-UL-DL-ConfigurationDedicated-IAB-MT from at least one upper node of the IAB-MT. When the IAB-MT receives the higher layer parameter tdd-UL-DL-ConfigurationDedicated-IAB-MT, the received higher layer parameter may substitute the higher layer parameter tdd-UL-DL-ConfigurationDedicated in the above-described slot format configuration and indication method. Specifically, the higher layer parameter tdd-UL-DL-ConfigurationDedicated-IAB-MT may include the following information.

- IAB-MT slot configuration set (i.e., slotSpecificConfigurationsToAddModList-IAB-MT): A set of slot configurations
- Slot index (i.e., slotIndex): Index of a slot included in the set of slot configurations
- IAB-MT symbol directions (i.e., symbols-IAB-MT): The direction of the slot indicated by the slot index.
- If the IAB-MT symbol directions are all downlink (symbols-IAB-MT=allDownlink), all symbols within the corresponding slot are downlink symbols.

If the IAB-MT symbol directions are all uplink (symbols-IAB-MT=allUplink), all symbols within the corresponding slot are uplink symbols.

If the IAB-MT symbol directions are explicit (symbols-IAB-MT=explicit), the nrofDownlinkSymbols may indicate the number of downlink symbols located in the first part of the slot, and the nrofUplinkSymbols may indicate the number of uplink symbols located in the last part of the corresponding slot. If the nrofDownlinkSymbols or the nrofUplinkSymbols is omitted, the corresponding parameter may be regarded as indicating a value of 0. The remaining symbols within the slot become flexible symbols.

If the IAB-MT symbol directions are IAB-MT explicit (symbols-IAB-MT=explicit-IAB-MT), the nrofDownlinkSymbols may indicate the number of downlink symbols located in the first part of the slot, and the nrofUplinkSymbols may indicate the number of uplink symbols located in the last part of the corresponding slot. If the nrofDownlinkSymbols or the nrofUplinkSymbols is omitted, the corresponding parameter may be regarded as indicating a value of 0. The remaining symbols within the slot become flexible symbols.

Similarly to the above-mentioned normal terminal, the IAB-MT may also receive the DCI format 2_0, and through this, may receive configuration information of a slot format from the base station of the IAB-DU of the parent node. In the case of DCI format 2_0 received by the IAB-MT, candidate values of each SFI field may not be limited to the values shown in Table 14. For example, the candidate values of each SFI field of the DCI format 2_0 received by the IAB-MT may further include values shown in Table 16.

TABLE 16

| Slot for-mat | Symbol number within a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 56 | U | U | U | U | U | U | U | U | U | U | U | U | U | F |
| 57 | U | U | U | U | U | U | U | U | U | U | U | U | F | F |
| 58 | U | U | U | U | U | U | U | U | U | U | U | F | F | F |
| 59 | U | U | U | U | U | U | U | U | U | U | F | F | F | F |
| 60 | U | U | U | U | U | U | U | U | U | F | F | F | F | F |
| 61 | U | U | U | U | U | U | U | U | F | F | F | F | F | F |
| 62 | U | U | U | U | U | U | U | F | F | F | F | F | F | F |
| 63 | U | U | U | U | U | U | F | F | F | F | F | F | F | F |
| 64 | U | U | U | U | U | F | F | F | F | F | F | F | F | F |
| 65 | U | U | U | U | F | F | F | F | F | F | F | F | F | F |
| 66 | U | U | U | F | F | F | F | F | F | F | F | F | F | F |
| 67 | U | U | F | F | F | F | F | F | F | F | F | F | F | F |
| 68 | U | F | F | F | F | F | F | F | F | F | F | F | F | F |
| 69 | U | F | F | F | F | F | F | F | F | F | F | F | F | D |
| 70 | U | U | F | F | F | F | F | F | F | F | F | F | F | D |
| 71 | U | U | U | F | F | F | F | F | F | F | F | F | F | D |
| 72 | U | F | F | F | F | F | F | F | F | F | F | F | D | D |
| 73 | U | U | F | F | F | F | F | F | F | F | F | F | D | D |
| 74 | U | U | U | F | F | F | F | F | F | F | F | F | D | D |
| 75 | U | F | F | F | F | F | F | F | F | F | F | D | D | D |
| 76 | U | U | F | F | F | F | F | F | F | F | F | D | D | D |
| 77 | U | U | U | F | F | F | F | F | F | F | F | D | D | D |
| 78 | U | U | U | U | U | U | U | U | U | U | U | F | F | D |
| 79 | U | U | U | U | U | U | U | U | U | U | U | F | F | D |
| 80 | U | U | U | U | U | U | U | U | U | U | U | F | F | D |
| 81 | U | U | U | U | U | U | U | U | U | U | U | F | F | D |
| 82 | U | U | U | U | U | U | U | U | U | F | F | F | D | D |
| 83 | U | U | U | U | U | U | U | U | F | F | F | F | D | D |
| 84 | U | F | D | D | D | D | D | D | D | D | D | D | D | D |
| 85 | U | U | F | D | D | D | D | D | D | D | D | D | D | D |
| 86 | U | U | U | F | D | D | D | D | D | D | D | D | D | D |
| 87 | U | F | F | D | D | D | D | D | D | D | D | D | D | D |
| 88 | U | U | F | F | D | D | D | D | D | D | D | D | D | D |
| 89 | U | U | U | F | F | D | D | D | D | D | D | D | D | D |

TABLE 16-continued

| Slot for-mat | Symbol number within a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 90 | U | F | F | F | D | D | D | D | D | D | D | D | D | D |
| 91 | U | U | F | F | F | D | D | D | D | D | D | D | D | D |
| 92 | U | U | U | F | F | F | D | D | D | D | D | D | D | D |
| 93 | U | U | U | U | U | U | U | U | U | F | F | F | F | D |
| 94 | U | U | U | U | U | U | F | F | F | F | F | F | D | D |
| 95 | U | U | U | U | U | U | F | F | D | D | D | D | D | D |
| 96 | U | U | U | U | U | U | U | D | D | D | D | D | D | D |

The IAB-MT may receive information on symbols not to be used by the IAB-MT for a certain serving cell through a higher layer parameter (e.g., Provided Guard Symbols MAC CE). The IAB-MT may perform a transition (i.e., operation change) between the IAB-MT and the IAB-DU of the IAB node during a time period including the symbols not used by the IAB-MT. The base station may signal a numerology for the symbols to the terminal through a higher layer parameter (e.g., Provided Guard Symbols MAC CE).

In a cell of a certain IAB-DU, a symbol within a slot may be configured as one of three types: 'hard', 'soft', and 'unavailable (or not-available)' (HSNA).

If a certain downlink, uplink, or flexible symbol is configured as the hard type, the cell of the IAB-DU may perform a signal transmit and/or reception operation in the corresponding symbol. This may mean that the fact that a certain symbol is configured as the hard type guarantees the reflection of the downlink, uplink, or flexible symbol configuration of the IAB-DU for the corresponding symbol.

Specifically, in an exemplary embodiment of the communication system, an F1 application protocol (F1AP) signaling as shown in Table 16 may be provided, and the upper IAB node (e.g., IAB donor, parent node, core network, etc.) may configure a DU resource type of the lower IAB node (e.g., IAB node, child node). Referring to Table 17, information of the DU resource type may include one HSNA slot configuration list consisting of one or more HSNA slot configurations. In this case, one HSNA slot configuration list may include HSNA slot configurations according to the maximum number of HSNAs (e.g., maxnoofHSNA). The n-th HSNA slot configuration included in the HSNA slot configuration list may include information on whether to apply the hard type, soft type, or not-available type to each of downlink symbols, uplink symbols, and flexible symbols of the n-th slot according to an application periodicity and a starting time of the HSNA slot configuration list.

TABLE 17

| IE/ group name | range | IE type and reference | liminality |
|---|---|---|---|
| HSNA slot configuration list | 0 . . . 1 | | |
| >HSNA slot configuration item | 1 . . . <maxnoofHSNASlots> | | |
| >>HSNA (Downlink) | | Enumerated (H, S, NA) | HSNA value for a downlink symbol of a slot |

TABLE 17-continued

| IE/group name | range | IE type and reference | liminality |
|---|---|---|---|
| >>HSNA (Uplink) | | Enumerated (H, S, NA | HSNA value for a uplink symbol of a slot |
| >>HSNA (Flexible) | | Enumerated (H, S, NA | HSNA value for a flexible symbol of a slot |

If a certain downlink, uplink, or flexible symbol is configured as the soft type, the IAB-DU cell may perform a signal transmission and reception operation in the symbol when at least one of the following conditions is satisfied.

Condition 1: The IAB-MT (co-located/associated with the IAB-DU) does not perform transmission or reception in the corresponding symbol.

Condition 2: The IAB-MT (co-located/associated with the IAB-DU) can perform transmission or reception in the corresponding symbol, but the transmission/reception operation of the IAB-MT does not change due to the use of the symbol at the IAB-DU.

Condition 3: The IAB-MT (co-located/associated with the IAB-DU) receives a DCI format 2_5 indicating the corresponding soft symbols as 'available'.

If a certain downlink, uplink, or flexible symbol is configured as the 'unavailable (or not-available (NA)) type', the IAB-DU (i.e., cell) may not perform transmission or reception in the symbol.

If the IAB-DU transmits one of a cell-specific, periodic, or semi-static signal or channel included in the following list in symbol(s) of a certain slot, the IAB-DU may perform a transmission/reception operation by assuming that the corresponding symbol(s) in the corresponding slot are configured as the hard type regardless of the configured resource type.

SS/PBCH block, CSS set for a type0-PDCCH configured by a system information block 1 (SIB1) for PDCCH configuration (i.e., PDCCHs for a type0-PDCCH CSS sets configured by pdcchConfigSIB1), periodic CSI-RS, and/or the like If the IAB-DU receives one of a cell-specific, periodic, or semi-static signal or channel included in the following list in symbol(s) of a certain slot, the IAB-DU may perform a transmission/reception operation by assuming that the corresponding symbol(s) in the corresponding slot are configured as the hard type regardless of the configured resource type.

PRACH, scheduling request (SR)

Following information may be configured for each cell in the set of cells of the IAB-DU.

IAB-DU cell identifier (i.e., iabDuCellId-AI): Identifier of the IAB-DU cell

AI position within DCI format (i.e., positionInDCI-AI): Position of an availability identifier (AI) index field within the DCI format 2_5.

Availability combinations (i.e., availabilityCombinations): includes a list of the following two pieces of information for availability combinations.

Resource availability (i.e., resourceAvailability): indicates resource availability for soft symbols included in one or more slots of the IAB-DU cell. The availability of soft symbols within one slot may be determined by referring to values in Table 17.

Availability combination identifier (i.e., availabilityCombinationId): indicates a mapping between the resource availability (i.e., resourceAvailability) and the AI index field in the DCI format 2_5.

As described above, in the DCI format 2_5, one AI index field may indicate to the IAB-DU the availability of soft symbols included in each slot in a certain slot set. In this case, the slot set may start from the earliest slot among the slots of the IAB-DU overlapping in the time axis with the slot in which the IAB-MT detects the corresponding DCI format 2_5. In addition, the size of the slot set may be greater than or equal to a PDCCH monitoring periodicity of the DCI format 2_5 given from a higher layer parameter SearchSpace. The AI index field of the DCI format 2_5 may include max $\{\lceil \log_2(\text{maxAIindex})\rceil, 1\}$ bits and may be mapped to one of the values of Table 18. In this case, the maximum value of the AI index (i.e., maxAIindex) may mean a maximum value among the provided availability combination identifiers (i.e., availabilityCombinationId). Table 18 may indicate a mapping relationship between the resource availability value and the soft symbol type within one slot.

TABLE 18

| Value | Indication |
|---|---|
| 0 | No indication of availability for soft symbols |
| 1 | Indicates that downlink symbols are available. No indication of availability for uplink and flexible soft symbols |
| 2 | Indicates that uplink symbols are available. No indication of availability for downlink and flexible soft symbols |
| 3 | Indicates that downlink and uplink soft symbols are available. No indication of availability for flexible soft symbols |
| 4 | Indicates that flexible soft symbols are available. No indication of availability for downlink and uplink soft symbols |
| 5 | Indicates that downlink and flexible soft symbols are available. No indication of availability for uplink soft symbols |
| 6 | Indicates that uplink and flexible soft symbols are available. No indication of availability for downlink soft symbols |
| 7 | Indicates that downlink, uplink, and flexible soft symbols are available |

As described above, the upper IAB node including the IAB donor may indicate whether the lower IAB node uses the soft symbols based on the DCI format 2_5 and the contents of Table 17. On the other hand, such the function may be designed assuming that the IAB node operates in a half-duplex manner. In other words, such the function may be designed mainly assuming that the MT and DU of the IAB node operate in a time division multiplexing (TDM) scheme or time division duplexing (TDD) scheme.

In an exemplary embodiment of the communication system, the F1AP signaling as shown in Table 19 may be used. Through this, the IAB node may report or deliver, to the upper IAB node (e.g., IAB donor or parent node), multiplexing information on a multiplexing capability between the IAB-DU of the IAB node (or, cell of a gNB-DU) and the IAB-MT of the IAB node (or, a cell configured in a co-located IAB-MT). Referring to Table 19, the multiplexing information may include one IAB-MT cell list composed of information on one or more IAB-MT cells. In this case, one IAB-MT cell list may include IAB-MT cell information according to the maximum number of serving cells (i.e., maxnoofServingCells). The n-th IAB-MT cell information included in the IAB-MT cell list may include a NR cell identity (ID) information of the corresponding cell and information on whether the following four types of multiplexing are supported.

DU_RX/MT_RX multiplexing: informs whether the IAB node supports simultaneous receptions in the DU and the MT DU_TX/MT_TX multiplexing: informs whether the IAB node supports simultaneous transmissions in the DU and the MT DU_TX/MT_RX multiplexing: informs whether the IAB node can simultaneously perform transmission in the DU and reception in the MT DU_RX/MT_TX multiplexing: informs whether the IAB node can simultaneously perform reception in the DU and transmission in the MT

TABLE 19

| IE/ group name | range | IE type and reference | liminality |
|---|---|---|---|
| >IAB-MT cell list | 1 | | |
| >IAB-MT cell item | 1 . . . <maxnoofServingCells> | | |
| >>NR cell identity | | Bit string (size: 36) | Identity of a serving cell configured for a co-located IAB-MT |
| >>DU_RX/ MT_RX | | Enumerated (supported, not-supported) | Indicates whether the IAB node supports simultaneous receptions in DU and MT |
| >>DU_TX/ MT_TX | | Enumerated (supported, not-supported) | Indicates whether the IAB node supports simultaneous transmissions in DU and MT |
| >>DU_TX/ MT_RX | | Enumerated (supported, not-supported) | Indicates whether the IAB node simultaneously supports transmission in DU and reception in MT |
| >>DU_RX/ MT_TX | | Enumerated (supported, not-supported) | Indicates whether the IAB node simultaneously supports reception in DU and transmission in MT |

According to Table 19, the IAB node may semi-statically report the DU/MT multiplexing capability or whether to support the DU/MT simultaneous operations for each cell, but whether the IAB node supports the DU/MT simultaneous operations may depend entirely on the corresponding IAB node itself. The upper IAB node may not support controlling the DU/MT simultaneous operations of the lower IAB node dynamically or semi-statically depending on a situation.

Figure 15:
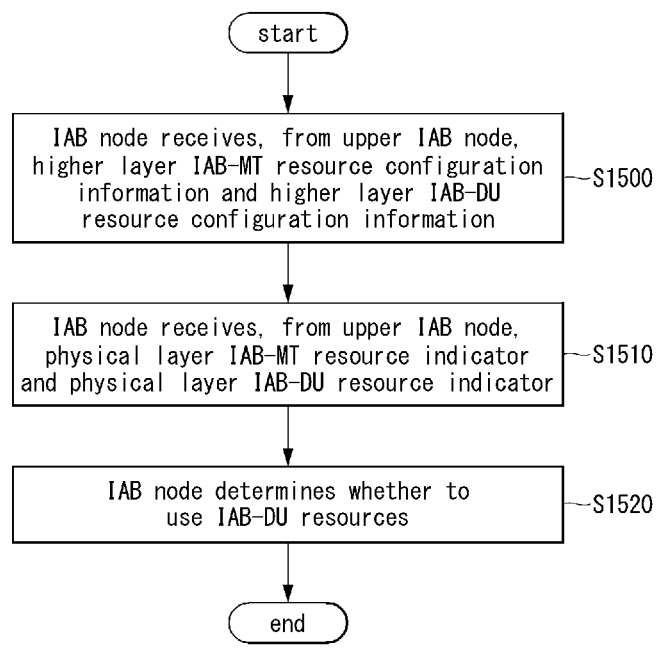
FIG. 15 is a flowchart illustrating a first exemplary embodiment of a method for resource management of an IAB node in a communication system.

FIG. 15 is a flowchart illustrating a first exemplary embodiment of a method for resource management of an IAB node in a communication system.

FIG. 15 shows a first exemplary embodiment of the method for resource management of an IAB node by taking the operation of the IAB node determining whether to use the IAB-DU resources as an example. However, this is only an example for convenience of description, and exemplary embodiments of the present disclosure are not limited thereto. For example, in the present disclosure, configurations described for 'whether to use IAB-DU resources' may be applied similarly or identically also to 'whether to use IAB node resources', 'whether to use IAB-MT resources', 'whether to use DU/MT simultaneous operation resources', and the like.

Referring to FIG. 15, in the order of determining whether to use the IAB-DU resources of the IAB node, the IAB node may identify whether the corresponding IAB-DU resources are available, and in order to determine whether to use the IAB-DU resources, may receive, from the upper IAB node, at least one of higher layer IAB-MT resource configuration information and higher layer IAB-DU resource configuration information (S1500). As an example, the higher layer IAB-MT resource configuration information may include slot configuration (i.e., downlink/uplink/flexible (DUF)) information and symbol configuration information for a cell (or cell group) of the IAB-MT. As another example, the higher layer IAB-DU resource configuration information may include slot configuration (i.e., downlink/uplink/flexible (DUF)) information and symbol configuration information for a cell (or cell group) of the IAB-DU.

The higher layer IAB-DU resource configuration information may include type (i.e., hard, soft, or not-available) information of the IAB-DU resources configured by the upper IAB node. The higher layer IAB-DU resource configuration information may include a part or all of cell-specific/semi-static downlink signals and channels such as SSB(s), type 0-PDCCH CSS set configured by a SIB1 for PDCCH configuration, CSI-RS, etc. configured in a cell (or cell group) configured to the IAB-DU. The higher layer IAB-DU resource configuration information may include a part or all of cell-specific/semi-static downlink signals and channels such as PRACH, SR, etc. configured in a cell (or cell group) configured to the IAB-DU.

In addition to the above-described higher layer configuration, the IAB node may receive at least one of a physical layer (L1 signaling) IAB-MT resource indicator and a physical layer IAB-DU resource indicator from the upper IAB node (S1510). As an example, the physical layer IAB-MT resource indicator may be a DCI format 2_0 including a slot format indicator for a cell (or a set of cells) which is configured to the IAB-MT. As another example, the physical layer IAB-DU resource indicator may be a DCI format 2_5 including a soft resource AI of the IAB-DU.

Finally, the IAB node may finally determine whether to use the IAB-DU resources based on the higher layer signaling (S1500) and the L1 signaling (S1510) (S1520).

Meanwhile, in general, it may not be possible to force all terminals to implement the same feature. The UE capability report may enable an expensive terminal to implement a large amount of features with high performance, and may enable a low-cost terminal to implement a small amount of features with low performance. The UE capability report may make it possible to secure the degree of freedom in terminal implementation for various situations, and when the capability information is reported to the network, the base station may configure each function within the limits supported by each terminal. Certain functions may be promised to be mandatory for all terminals to implement, and in this case, it may be possible to omit the UE capability report for the mandatory functions.

It may be possible for the terminal to perform UE capability reporting of different values for one function for each frequency band or for each duplex scheme. For example, the terminal may support a specific function for a frequency range 1 (FR1), which means a band below 6 GHz, but may report to the base station that the terminal does not support a specific function for a frequency range 2 (FR2), which means a band above 6 GHz. As another example, the terminal may report to the base station that a specific function is supported in the TDD scheme but not supported in the FDD scheme.

When the terminal performs the UE capability reporting, the base station should follow (should not violate) the content of the UE capability report when perform configuration, indication, or scheduling on the terminal. If the base station indicates, to the terminal, configuration, indication or scheduling contrary to the UE capability report, the terminal may ignore it.

Figure 16:
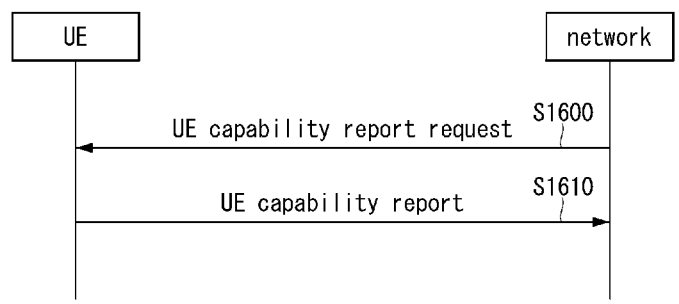
FIG. 16 is a flowchart illustrating an exemplary embodiment of a UE capability reporting procedure in a communication system.

FIG. 16 is a flowchart illustrating an exemplary embodiment of a UE capability reporting procedure in a communication system.

Referring to FIG. 16, in the UE capability reporting procedure, the base station may transmit a UE capability report request signal to the terminal through a higher layer parameter UECapabilityEnquiry when the terminal is in RRC connected mode (i.e., RRC_CONNECTED state) (S1600). In this case, the network may refer to only the UE capability report after access stratum (AS) security activation, and may not retransmit or report the UE capability report before the AS security activation to the core network (CN). Upon receiving the UE capability report request signal, the terminal may compile UE capability information according to a specific procedure, and report it to the base station through a UE capability information signal (e.g., UECapabilityInformation) (S1610).

The specific procedure for compiling the UE capability information signal may include a procedure of generating at least one of a list (i.e., supportedBandCombinationList) of band(s) or band combination(s) (BC(s)) supported by the terminal, feature set (FS) information related to feature sets supported by the terminal, or feature set combination (FSC) information related to feature set combinations supported by the terminal. For example, when the base station requests a UE capability report from the terminal in order to obtain information on band(s) or band combination(s) supported by the terminal, the terminal may report which band(s) it supports for each radio access technology (RAT). To this end, the base station may set a RAT-type in a UE RAT capability report request signal (e.g., UE-CapabilityRAT-Request), which is included in a UE RAT capability report request list signal (e.g., ue-CapabilityRAT-RequestList) that is a higher layer message, to one of 'nr', 'eutra-nr', 'eutra', and 'eutra-fdd'. This may mean that the base station may request a UE capability report for one or more RATs or RAT combinations from the terminal, and in this case, the terminal may respond to each request for a list of support bands for a plurality of RATs or RAT combinations. For example, if the RAT-type is set to 'nr', the terminal may include a list of bands or band combinations to which NR-DC can be applied in the UE capability report. As another example, if the RAT-type is set to 'eutra-nr', the terminal may include a list of bands or band combinations applicable to multi-RAT DC (MR-DC) such as EN-DC, NGEN-DC, NE-DC, or the like in the UE capability report. In addition, when the base station requests a UE capability report, the base station may provide, to the terminal, a list of bands for which the terminal determines whether support is provided, through a higher layer parameter frequencyBandListFilter. For the bands included in the higher layer parameter frequencyBandListFiter, the terminal may determine a candidate band combination by considering 'predetermined RAT types supported for each band', 'information on RAT-types requested by the base station', etc., and may include the candidate band combination in the UE capability report.

Figure 17A:
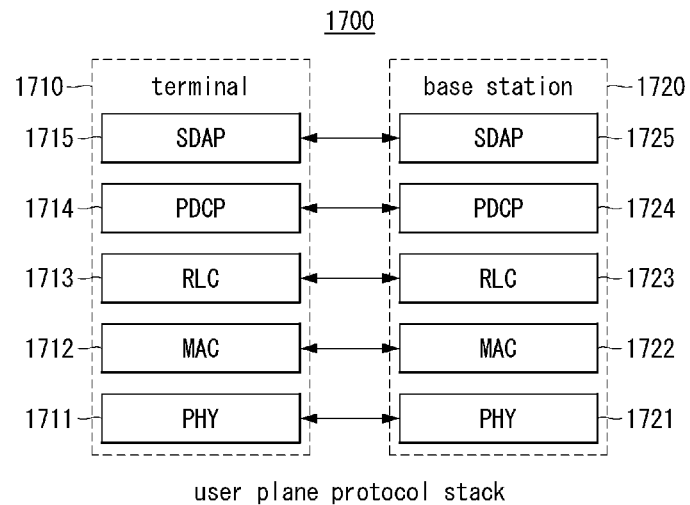
FIGS. 17A and 17B are conceptual diagrams for describing a first exemplary embodiment of a user plane protocol stack structure and a control plane protocol stack structure in a communication system.
Figure 17B:
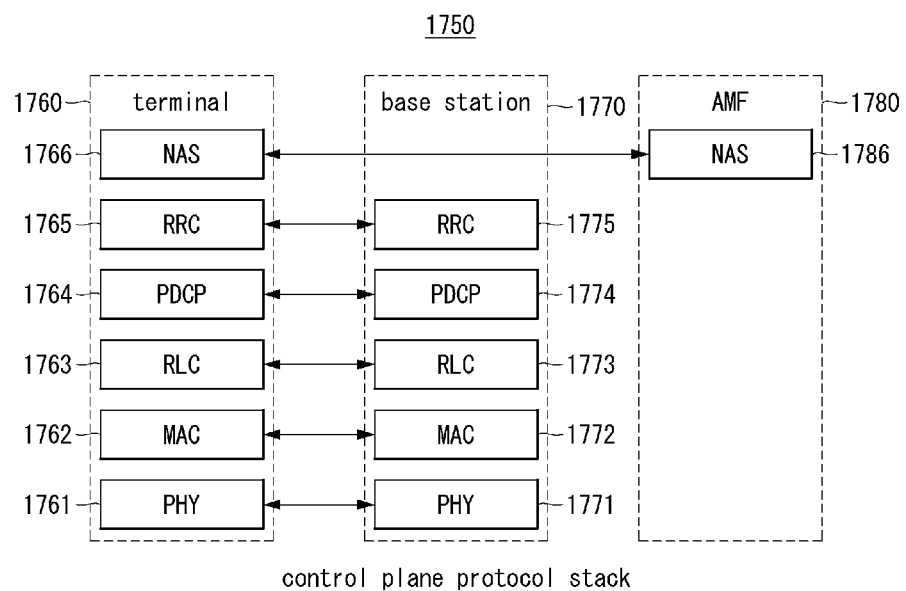

FIGS. 17A and 17B are conceptual diagrams for describing a first exemplary embodiment of a user plane protocol stack structure and a control plane protocol stack structure in a communication system.

Referring to FIGS. 17A and 17B, a radio interface protocol stack or radio interface protocol stack structures 1700 and 1750 may be defined in a radio connection section between communication nodes. For example, the radio interface protocol stack may be divided into a physical layer, a data link layer, a network layer, and the like, which are vertically configured.

The radio interface protocol stack may be divided into the user plane protocol stack 1700 and the control plane protocol stack 1750. Here, the control plane may be a plane for transmitting a control signal. The control signal may be referred to as a signaling signal. The user plane may be a plane for transmitting user data.

Referring to FIG. 17A, the communication system may include a terminal 1710 and a base station 1720. The terminal 1710 may be referred to as a user equipment (UE). The base station 1720 may correspond to an eNB, a gNB, or the like. The terminal 1710 and the base station 1720 may perform mutual data signal transmission/reception based on the user plane protocol stack structure 1700 shown in FIG. 17A.

In the user plane air interface protocol stack structure 1700 of the communication system, the terminal 1710 and the base station 1720 may include PHY layers 1711 and 1721 included in L1, MAC layers 1712 and 1722, RLC layers 1713 and 1723, and packet data convergence protocol (PDCP) layers 1714 and 1724 included in L2, service data adaptation protocol (SDAP) layers 1715 and 1725 included in L3, and the like.

Referring to FIG. 17B, the communication system may include a terminal 1760 and a base station 1770. The terminal 1760 and the base station 1770 may perform mutual control signal transmission/reception based on the control plane protocol stack structure 1750 shown in FIG. 17B.

In the control plane protocol stack structure 1750 of the communication system, the terminal 1760 and the base station 1770 may include PHY layers 1761 and 1771 included in L1, MAC layers 1762 and 1772, RLC layers 1763 and 1773, and PDCP layers 1764 and 1774 included in L2, and RRC layers 1765 and 1775 included in L3, and the like.

The communication system may further include an Access and Management Mobility Function (AMF) 1780. In the control plane protocol stack structure 1750, the terminal 1760 and the AMF 1780 may include non-access stratum (NAS) layers 1766 and 1786. The base station 1770 may not include a NAS layer. In other words, in the control plane protocol stack structure 1750, the NAS layer of the base station 1770 may be transparent.

Figure 18A:
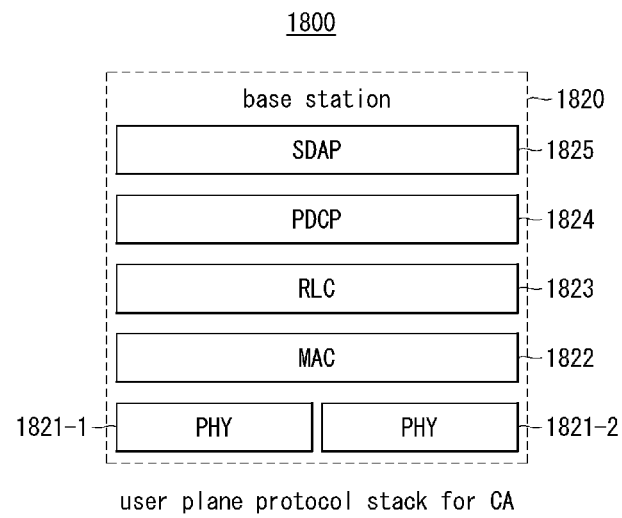
FIGS. 18A and 18B are conceptual diagrams for describing a second exemplary embodiment of a user plane protocol structure in a communication system.
Figure 18B:
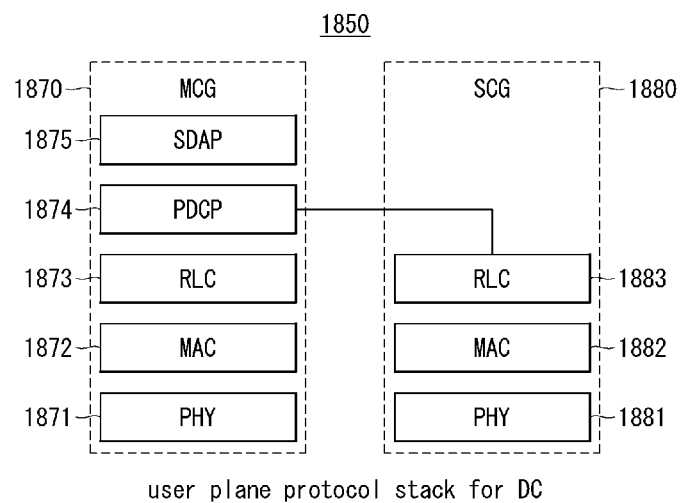

FIGS. 18A and 18B are conceptual diagrams for describing a second exemplary embodiment of a user plane protocol structure in a communication system.

Referring to FIGS. 18A and 18B, a radio interface protocol stacks or radio interface protocol stack structures 1800 and 1850 may be defined in a radio connection section between communication nodes. For example, in the radio connection section between communication nodes, the user plane protocol stack structure 1800 for carrier aggregation (CA) may be defined. Alternatively, in the radio connection section between communication nodes, the user plane protocol stack structure 1850 for dual connectivity (DC) may be defined.

Referring to FIG. 18A, the communication system may include a base station 1820. The base station 1820 may correspond to an eNB, a gNB, or the like. The base station 1820 may perform CA-based data communications with a lower node, such as a terminal, based on the user plane protocol stack structure 1800 for CA shown in FIG. 18A. In the user plane radio interface protocol stack structure 1800 for CA, the base station 1820 may include a plurality of PHY layers 1821-1 and 1821-2 included in L1, a MAC layer 1822, RLC layer 1823, and PDCP layer 1824 included in L2, and an SDAP layer 1825 included in L3, and the like.

Referring to FIG. 18B, the communication system may include a master cell group (MCG 1870) and a secondary cell group (SCG) 1880. A cell or base station of the MCG 1870 and SCG 1880 may configure a DC with a lower node such as a terminal based on the user plane protocol stack structure 1850 for DC. In the user plane radio interface protocol stack structure 1850 for DC, the cell or base station of the MCG 1870 may include a PHY layer 1871 included in L1, a MAC layer 1872, RLC layer 1873, and PDCP layer 1874 included in L2, a SDAP layer 1875 included in L3, and the like. Meanwhile, the cell or base station of the SCG 1880 may include a PHY layer 1881 included in L1, a MAC layer 1882 and RLC layer 1883 included in L2, and the like.

An exemplary embodiment of the communication system supporting 5G wireless communication may support the following various DC types.

EUTRA-NR DC (EN-DC): DC in which the MCG is configured based on 4G Evolved Universal Terrestrial Radio Access (E-UTRA), and the SCG is configured based on the 5G NR. Here, a control plane of the MCG may be configured through a 4G core (i.e., Evolved Packet Core (EPC)).

Next Generation-RAN E-UTRA-NR DC (NGEN-DC): DC in which the MCG is configured based on the E-UTRA and the SCG is configured based on the NR. In this case, a control plane of the MCG may be configured through a 5G core (i.e., Next Generation Core (NGC)).

NR-EUTRA DC (NE-DC): DC in which the MCG is configured based on the NR and the SCG is configured based on the E-UTRA NR DC: DC in which both the MCG and the SCG are configured based on the NR The base station may perform DC-related configuration for the terminal (i.e., UE, MT, etc.) using one or more higher layer parameters. For example, higher layer parameters used by the base station for the DC-related configuration may include at least some of CellGroupConfig, SpCellConfig, ReconfigurationWithSync, and SCellConfig. The higher layer parameter CellGroupConfig may be the same as or similar to that shown in Table 20.

TABLE 20

```
CellGroupConfig ::=                              SEQUENCE {
    cellGroupId      // cell group ID. 0 indicates MCG, and a value of 1 or more indicates SCG
    rlc-BearerToAddModList              //configure a relation list of MAC logical channel, RLC entity, and radio
bearer
    rlc-BearerToReleaseList             //release a relation list of MAC logical channel, RLC entity, and radio
bearer
    mac-CellGroupConfig                 //MAC parameters applicable to the corresponding cell group
    physicalCellGroupConfig
       //configuration of common PHY layer parameters such as HARQ, power control, etc. within a cell
group
    spCellConfig                        //configure a SpCell of a cell group by referring to SpCellConfig
    sCellToAddModList                   //configure a list of SCells included in a cell group by referring to
SCellConfig
    sCellToReleaseList                  //exclude the Scell from a cell group by referring to SCellIndex
    ...,
    [[
    reportUplinkTxDirectCurrent   //configure whether a UE reports a uplink DC position
    ]],
    [[
    bap-Address-r16   //configure a backhal adaptation protocol (BAP) address of a parent node in a cell
group
    bh-RLC-ChannelToAddModList-r16   //configure backhaul RLC entities and a list of corresponding
MAC logical channels
    bh-RLC-ChannelToReleaseList-r16   //release backhaul RLC entities and a list of corresponding MAC
logical channels
    f1c-TransferPath-r16   //configure a F1-C transfer path to be used by EN-DC IAB-MT
    simultaneousTCI-UpdateList1-r16   //a list 1 of serving cells for which TCI updata can be
simultaneously performed through a single MAC CE (corresponding to coresetPoolIndex =0, i.e.,
corresponding to serving cells of a first TRP for which TCI update can be simultaneouly performed)
    simultaneousTCI-UpdateList2-r16   //a list 2 of serving cells for which TCI updata can be
simultaneously performed through a single MAC CE (corresponding to coresetPoolIndex =0, i.e.,
corresponding to serving cells of a first TRP for which TCI update can be simultaneouly performed)
    simultaneousSpatial-UpdatedList1-r16 //a list 1 of serving cells for which spatial relation update can be
simultaneously performed through a single MAC CE (corresponding to coresetPoolIndex =0, i.e.,
corresponding to serving cells of a first TRP for which spatial relation update can be simultaneouly
performed)
```

TABLE 20-continued simultaneousSpatial-UpdatedList2-r16 //a list 2 of serving cells for which spatial relation update can be simultaneously performed through a single MAC CE (corresponding to coresetPoolIndex =0, i.e., corresponding to serving cells of a first TRP for which spatial relation update can be simultaneouly performed)
    uplinkTxSwitchingOption-r16    //configure a UL TX switching option for inter-band UL CA or (NG)EN-DC
    uplinkTxSwitchingPowerBoosting-r16 //configure whether a UE can perform 3dB power boosting for a second carrier when applying inter-band UL CA
]]
}

Meanwhile, the higher layer parameter SpCellConfig may be the same as or similar to that shown in Table 21.

TABLE 21

SpCellConfig ::=              SEQUENCE {
    servCellIndex    // servince cell ID of PSCell. PCell of MCG uses ID=0
    reconfigurationWithSync   //configuration values used for synchronous reconfiguration of a target SpCell
    rlf-TimersAndConstants    //configuration of a timer and a constant value for detecting and triggerig cell-level radio link failure
    rlmInSyncOutOfSyncThreshold
    spCellConfigDedicated    //ServingCellConfig of SpCell
    ...
}

Meanwhile, the higher layer parameter ReconfigurationWithSync may be the same as or similar to that shown in Table 22.

TABLE 22

ReconfigurationWithSync ::=              SEQUENCE {
    spCellConfigCommon              // ServingCellConfigCommon of SpCell
    newUE-Identity                  // New RNTI value configuration
    t304                            // configure a t304 timer value
    rach-ConfigDedicated                  CHOICE {
        // RACH configuration used for Reconfiguration with sync
        uplink
        supplementaryUplink
    }
OPTIONAL,   -- Need N
    ...,
    [[
    smtc   //configure a periodicity, offset, and duration of SSB to be used for change of PSCell or PCell, or addition of PSCell
    ]],
    [[
    daps-UplinkPowerConfig-r16
    ]]
}

Meanwhile, the higher layer parameter SCellConfig may be the same as or similar to that shown in Table 23.

TABLE 23

SCellConfig ::=              SEQUENCE {
    sCellIndex              // SCell index
    sCellConfigCommon              // ServingCellConfigCommon of SCell
    sCellConfigDedicated           // ServingCellConfig of SCell
    ...,
    [[
    smtc   //configure a periodicity, offset, and duration of SSB to be used for addition of SCell
    ]],
    [[
    sCellState-r16              // configure whether to activate SCell
    secondaryDRX-GroupConfig-r16
    ]]
}

Meanwhile, cell-specific configurations of a serving cell configured as a SpCell or SCell in the MCG or SCG may be performed with reference to a higher layer parameter ServingCellConfigCommon. The higher layer parameter ServingCellConfigCommon may be the same as or similar to that shown in Table 24.

TABLE 24

```
ServingCellConfigCommon ::=       SEQUENCE {
    physCellId                    // physical cell ID of the corresponding serving cell
    downlinkConfigCommon          // cell-specific downlink configuration of the corresponding serving cell
    uplinkConfigCommon            // cell-specific uplink configuration of the corresponding serving cell
    supplementaryUplinkConfig     // cell-specific SUL configuration of the corresponding serving cell
    n-TimingAdvanceOffset         // timing advanced offset configuration
    ssb-PositionsInBurst                CHOICE {
        shortBitmap               // 4-bit SSB position configuration
        mediumBitmap              // 8-bit SSB position configuration
        longBitmap                // 64-bit SSB position configuration
    }
    ssb-periodicityServingCell    // SSB periodicity configuration
    dmrs-TypeA-Position           // first DMRS symbol configuration for Type A DMRS
    lte-CRS-ToMatchAround         // LTE CRS rate matching configuration
    rateMatchPatternToAddModList  // rate matching pattern list additional/new configuration
    rateMatchPatternToReleaseList // rate matching pattern list release
    ssbSubcarrierSpacing          // subcarrier spacing configuration for SSB
    tdd-UL-DL-ConfigurationCommon // cell-specific D/F/U configuration for a TDD cell (refer to detail
description on slot formats)
    ss-PBCH-BlockPower            // SSB transmission power (-60dBm ~ 50dBm)
    ...,
    [[
    channelAccessMode-r16             CHOICE {
        dynamic
        semiStatic
    }
    discoveryBurstWindowLength-r16
    ssb-PositionQCL-r16           // configure QCL relation between SSB positions
    highSpeedConfig-r16
    ]]
}
```

Meanwhile, UE-specific configurations or cell-specific configurations of a serving cell configured as a SpCell or SCell in the MCG or SCG may be performed with reference to a higher layer parameter ServingCellConfig. The higher layer parameter ServingCellConfig may be the same as or similar to that shown in Table 25.

TABLE 25

```
ServingCellConfig ::=     SEQUENCE {
    tdd-UL-DL-ConfigurationDedicated   // UE-specific D/F/U configuration for a TDD cell (refer to
    detail description on slot formats)
    initialDownlinkBWP         // UE-specific configuration for an initial BWP (BWP #0)
    downlinkBWP-ToReleaseList  // a list of BWPs to be released
    downlinkBWP-ToAddModList   // a list of new BWPs or BWPs to be added
    firstActiveDownlinkBWP-Id
    bwp-InactivityTimer
    defaultDownlinkBWP-Id
    uplinkConfig
    supplementaryUplink
    pdcch-ServingCellConfig
    pdsch-ServingCellConfig
    csi-MeasConfig
    sCellDeactivationTimer
    crossCarrierSchedulingConfig
    tag-Id
    dummy
    pathlossReferenceLinking
    servingCellMO
    ...,
    [[
    lte-CRS-ToMatchAround
    rateMatchPatternToAddModList
    rateMatchPatternToReleaseList
    downlinkChannelBW-PerSCS-List
    ]],
    [[
    supplementaryUplinkRelease
    tdd-UL-DL-ConfigurationDedicated-IAB-MT-r16   // IAB-MT-specific D/F/U configuration for a
    TDD cell (refer to detail description on slot formats)
```

TABLE 25-continued

```
    dormantBWP-Config-r16
    ca-SlotOffset-r16        CHOICE {
        refSCS15kHz
        refSCS30KHz
        refSCS60KHz
        refSCS120KHz
    }
    channelAccessConfig-r16
    intraCellGuardBandsDL-List-r16
    intraCellGuardBandsUL-List-r16
    csi-RS-ValidationWith-DCI-r16
    lte-CRS-PatternList1-r16
    lte-CRS-PatternList2-r16
    crs-RateMatch-PerCORESETPoolIndex-r16
    enableTwoDefaultTCI-States-r16
    enableDefaultTCI-StatePerCoresetPoolIndex-r16
    enableBeamSwitchTiming-r16
    cbg-TxDiffTBsProcessingType1-r16
    cbg-TxDiffTBsProcessingType2-r16
    ]]
}
```

Meanwhile, cell-specific configurations of a serving cell configured as a SpCell or SCell within the MCG or SCG may be performed with reference to a higher layer parameter ServingCellConfig. The higher layer parameter ServingCellConfig may be the same as or similar to that shown in Table 26.

TABLE 26

```
ServingCellConfig ::=              SEQUENCE {
    tdd-UL-DL-ConfigurationDedicated    // UE-specific D/F/U configuration for a TDD cell (For details,
see the slot format description)
    initialDownlinkBWP             // UE-specific configuration for an initial BWP (BWP #0)
        downlinkBWP-ToReleaseList    // list of BWPs to be released
        downlinkBWP-ToAddModList    // list of BWPs to be newly added
        firstActiveDownlinkBWP-Id
        bwp-InactivityTimer
        defaultDownlinkBWP-Id
        uplinkConfig
        supplementaryUplink
        pdcch-ServingCellConfig
        pdsch-ServingCellConfig
        csi-MeasConfig
        sCellDeactivationTimer
        crossCarrierSchedulingConfig
        tag-id
        dummy
        pathlossReferenceLinking
        servingCellMO
        ...,
        [[
        lte-CRS-ToMatchAround
        rateMatchPatternToAddModList
        rateMatchPatternToReleaseList
        downlinkChannelBW-PerSCS-List
        ]],
        [[
        supplementaryUplinkRelease
        tdd-UL-DL-ConfigurationDedicated-IAB-MT-r16
            // IAB-MT-specific D/F/U configuration for a TDD cell (For details, see the slot format
description)
        dormantBWP-Config-r16
        ca-SlotOffset-r16                CHOICE {
            refSCS15kHz
            refSCS30KHz
            refSCS60KHz
            refSCS120KHz
        }
        channelAccessConfig-r16
        intraCellGuardBandsDL-List-r16
        intraCellGuardBandsUL-List-r16
        csi-RS-ValidationWith-DCI-r16
        lte-CRS-PatternList1-r16
        lte-CRS-PatternList2-r16
        crs-RateMatch-PerCORESETPoolIndex-r16
        enableTwoDefaultTCI-States-r16
        enableDefaultTCI-StatePerCoresetPoolIndex-r16
        enableBeamSwitchTiming-r16
```

TABLE 26-continued

```
cbg-TxDiffTBsProcessingType1-r16
cbg-TxDiffTBsProcessingType2-r16
]]
}
```

The DC or CA may be defined within a specific frequency resource. The DC or CA may operate within one band (e.g., 4G band or 5G band) including one or more CCs. The DC or CA operating within one band may be referred to as 'intra-band DC' or 'in-band CA'. On the other hand, the DC or CA may be applied across one or more bands or may be applied across a band combination configured as a combination of one or more bands. The DC or CA applied across one or more bands or a band combination may be referred to as 'inter-band DC' or 'inter-band CA'.

Meanwhile, the DC or CA may operate within one CC. The DC or CA operating within one CC may be referred to as 'intra-carrier DC' or 'intra-carrier CA'. On the other hand, the DC or CA may be applied across one or more CCs. The DC or CA applied across one or more CCs may be referred to as 'inter-carrier DC' or 'inter-carrier CA'.

Meanwhile, the DC or CA may operate within one frequency range (FR). The DC or CA applied within one FR may be referred to as 'intra-FR DC' or 'intra-FR CA'. On the other hand, the DC or CA may be applied across one or more FRs. For example, some cell groups or CCs may exist in the FR1, and the remaining cell groups or CCs may be configured to exist in the FR2. They may be applied across one or more FRs. The DC or CA may be referred to as 'inter-FR DC' or 'inter-FR CA'.

The intra-FR DC/CA, inter-FR DC/CA, intra-band DC/CA, inter-band DC/CA, intra-carrier DC/CA, inter-carrier DC/CA, or the like may be configured according to how far or close a frequency axis distance between one or more CCs or serving cells is. Hardware of a communication node such as a terminal or a base station may be implemented differently depending on which combination of the DCs/CAs should be supported. Hereinafter, exemplary embodiments of a hardware implementation method of a communication node may be described by taking an implementation scheme for supporting the intra-band CA or inter-band CA as an example. However, this is only an example for convenience of description, and exemplary embodiments of the present disclosure are not limited thereto.

FIG. 19 is a conceptual diagram illustrating an exemplary embodiment of a TCI state activation/deactivation MAC CE structure in a communication system supporting an IAB network.

In a communication system supporting an IAB network including an IAB node composed of an IAB-DU and an IAB-MT, the terminal may obtain configuration information on a list of serving cells for which TCI states can be simultaneously updated by referring to an RRC signaling as shown in Table 27.

TABLE 27

```
CellGroupConfig ::=                     SEQUENCE {
    cellGroupId     //ID of a cell group to which the following configuration is applied (0: MCG, 1: SCG)
        ...omitted...
    simultaneousTCI-UpdateList1-r16     //a list of serving cells for which TCI states are simultaneously
updated by a MAC CE (i.e., list of ServCellIndex)
    simultaneousTCI-UpdateList2-r16     //a second list of serving cells for which TCI states are
simultaneously updated by a MAC CE (i.e., list of ServCellIndex)
        ...omitted...
}
```

Referring to Table 27, the terminal may receive a MAC CE indicating TCI activation (or deactivation) for serving cell(s) (or CC(s)) in a specific serving cell list (or CC list). If the received MAC CE conforms to a format for simultaneous activation/deactivation of TCI states for all serving cells in the serving cell list (refer to FIG. 19), the terminal may update the TCI states of all serving cells referring to an RS ID indicated by the MAC CE among the serving cells included in the corresponding serving cell list.

Referring to Table 27, the terminal may obtain configuration information of up to two serving cell lists (e.g., simultaneousTCI-UpdateList1, simultaneousTCI-UpdateList2) each of which corresponds to a cell group (e.g., MCG or SCG). The TCI states of all serving cells in the serving cell list may be updated at the same time. If different serving cell lists include the same serving cell, the different serving cell lists may actually mean one serving cell list. Accordingly, when two serving cell lists are configured to one terminal, the two serving cell lists may be configured not to include the same serving cells. In other words, the two serving cell lists may be mutually exclusive.

Meanwhile, when different values of coresetPoolIndex are configured for one BWP in a specific serving cell, the base station (or network) may not include the corresponding serving cell in the serving cell list corresponding to simultaneous TCI-UpdateList1 or simultaneousTCI-UpdateList2. When a plurality of TRPs perform TCI management by multi-DCI-based multi-TRP operations, due to simultaneous activation or simultaneous deactivation of TCI states, confusion of the TCI relations may occur in the multi-TRP operations, and the base station may operate to prevent this problem. For example, when a specific serving cell includes a BWP for multi-DCI-based multi-TRP operations, the base station, etc. may not include the corresponding serving cell in the serving cell list corresponding to simultaneousTCI-UpdateList1 or simultaneousTCI-UpdateList2.

Referring to FIG. 19, the first octet (Oct 1) in the TCI state activation/deactivation MAC CE structure for UE-specific PDSCH DMRS may include a reserved (R) field, a serving cell ID field, and a BWP ID field. The second octet (Oct 2) to the M-th octet (Oct M) may include fields for $T_{i,1}$ and $T_{i,2}$, which are TCI state IDs. The second octet (Oct 2) to the M-th octet (Oct M) may further include fields including $C_i$ indicating whether the corresponding octet including $T_{i,2}$ exists or a reserved (R) field.

The detailed meaning of each field may be as follows, and the size thereof may be variable.

Serving cell ID: An ID of a serving cell to which the corresponding MAC CE is applied. If the indicated serving cell is included in the higher layer parameter simultaneousTCI-UpdateList1 or the higher layer parameter simultaneousTCI-UpdateList2, the corresponding MAC CE may be applied to all serving cells configured within simultaneousTCI-UpdateList1 or simultaneous TCI-UpdateList2.

BWP ID: An ID of a BWP to which the MAC CE is applied $C_i$: An indicator indicating the existence of an octet including the TCI state ID $T_{i,2}$. For example, when a $C_i$ value included in the k-th octet (Oct k) is set to 1, the (k+1)-th octet (Oct k+1) may include the TCI state ID $T_{i,2}$. On the other hand, when the $C_i$ value included in the k-th octet (Oct k) is set to 0, the (k+1)-th octet (Oct k+1) may not include the TCI state ID $T_{i,2}$.

TCI state ID $T_{i,j}$: This field specifies the TCI state indicated by the MAC CE according to a higher layer parameter TCI-StateId. Here, i may mean a code point index of a TCI indication field in a DCI, and j may mean an order of the TCI state mapped to the corresponding code point. For example, when $T_{3,2}$ indicates a TCI state ID #B, TCI #B may be mapped to the third code point of the TCI indication field in the DCI. In an exemplary embodiment of the communication system, 8 activated TCI code points may exist, and a maximum of two TCI states may be mapped to one TCI code point.

R: Reserved bit: This field may be set to 0.

The simultaneous downlink beam information indication (or TCI update) for multiple serving cells (or multiple CCs) described with reference to Table 27 may be similarly applied to an uplink case. For example, in the communication system supporting an IAB network including an IAB node composed of an IAB-DU and an IAB-MT, the terminal may obtain configuration information on a list of serving cells for which spatial relation information can be simultaneously updated by referring to an RRC signaling of Table 28.

MCG and SCG). The spatial relations of all serving cells in the serving cell list may be updated at the same time. If different serving cell lists include the same serving cell, the different serving cell lists may actually mean one serving cell list. Accordingly, when two serving cell lists are configured to one terminal, the two serving cell lists may be configured not to include the same serving cells. In other words, the two serving cell lists may be mutually exclusive.

Meanwhile, when different values of coresetPoolIndex are configured for one BWP in a specific serving cell, the base station (or network) may not include the corresponding serving cell in the serving cell list corresponding to simultaneousSpatial-UpdateList1 or simultaneousSpatial-UpdateList2. When a plurality of TRPs perform spatial relation management by multi-DCI-based multi-TRP operations, due to simultaneous activation or simultaneous deactivation of spatial relations, confusion of the spatial relations may occur in the multi-TRP operations, and the base station may operate to prevent this problem. For example, when a specific serving cell includes both control channels transmitted by a first TRP (e.g., corsetPoolIndex=0) and a second TRP (e.g., corsetPoolIndex=1) for the multi-DCI-based multi-TRP operations, the base station may not include the corresponding serving cell in the serving cell list corresponding to simultaneousSpatial-UpdatedList1 or simultaneousSpatial-UpdatedList2.

FIG. 20 is a conceptual diagram illustrating an exemplary embodiment of a serving cell set based sounding reference signal (SRS) spatial relation indication MAC CE structure in a communication system.

Referring to FIG. 20, in the serving cell set-based SRS spatial relation indication MAC CE structure, the first octet (Oct 1) may include a reserved (R) field, an SRS resource's cell ID field, an SRS resource's BWP ID field, and the like. The second octet (Oct 2) and subsequent octets may include R fields, SRS resource ID field, resource serving cell ID field, resource BWP ID field, resource ID field, and the like. The second octet (Oct 2) and subsequent octets may further include C fields, $F_i$ fields, R fields, and the like. The detailed meaning of each field may be as follows, and the size thereof may be variable.

TABLE 28

```
CellGroupConfig ::=                    SEQUENCE {
    cellGroupId   //ID of a cell group to which the following configuration is applied (0: MCG, 1: SCG)
    ...omitted...
    simultaneousSpatial-UpdateList1-r16   //a list of serving cells for which spatial relations are
simultaneously updated by a MAC CE (i.e., list of ServCellIndex)
    simultaneousSpatial-UpdateList2-r16   //a second list of serving cells for which spatial relations are
simultaneously updated by a MAC CE (i.e., list of ServCellIndex)
    ...omitted...
}
```

Referring to Table 28, the terminal may receive a MAC CE indicating spatial relation activation (or deactivation) for serving cell(s) (or CC(s)) in a specific serving cell list (or CC list). If the received MAC CE conforms to a format for simultaneous activation/deactivation of spatial relations for all serving cells in the serving cell list (refer to FIG. 20), the terminal may update the spatial relations of all serving cells referring to an RS ID indicated by the MAC CE among the serving cells included in the corresponding serving cell list.

Referring to Table 28, the terminal may obtain configuration information of up to two serving cell lists (e.g., simultaneousSpatial-UpdateList1, simultaneousSpatial-UpdateList2) each of which corresponds to a cell group (e.g., Cell ID of SRS resource: This field indicates an ID of a serving cell including indicated semi-persistent (SP) or aperiodic (AP) SRS resources. If the C field is set to 0, the indicator of this field may indicate an ID of a serving cell including all resources indicated by the resource $ID_i$ field. If the corresponding serving cell is included in any one of the serving cell lists such as simultaneousSpatial-UpdatedList1 or simultaneousSpatial-UpdatedList2, the corresponding MAC CE may be applied identically to all serving cells included in the corresponding serving cell list (simultaneousSpatial-UpdatedList1 or simultaneousSpatial-UpdatedList2).

BWP ID of SRS resource: This field indicates an ID of an uplink BWP including SP or AP SRS resources indicated according to a code point of a BWP indicator in a DCI. If the C field is set to 0, the indicator of this field may indicate an ID of a BWP including all resources indicated by the resource $ID_i$ fields.

C: This field indicates the existence of a resource serving cell ID field, a resource BWP ID field, a resource ID field, or the like. If a C field included in the k-th octet (Oct k) is set to 1, the (k+1)-th octet (Oct k+1) may include a resource serving cell ID field, a resource BWP ID field, etc., and the (k+2)-th octet (Oct k+2) may include a resource ID field, etc. On the other hand, if the C field included in the k-th octet (Oct k) is set to 0, the (k+1)-th octet (Oct k+1) may not include a resource serving cell ID field, a resource BWP ID field, etc. and the (k+2)-th octet (Oct k+2) may not include a resource ID field, etc.

SRS resource This field indicates an ID of a SP/AP SRS resource corresponding to a parameter SRS-ResourceId.

$F_i$: This field indicates the type of a reference RS used for deriving a spatial relations to the SRS resource indicated by the SRS resource $ID_i$. For example, $F_0$ may be applied to the first SRS resource indicated by SRS resource $ID_0$, and $F_1$ may be applied to the second SRS resource. If the $F_i$ field is set to 1, the reference RS may be regarded as an NZP CSI-RS. On the other hand, if the $F_i$ field is set to 0, the reference RS may be regarded as an SSB or SRS.

Resource serving cell This field indicates a serving cell ID of a reference RS used for deriving a spatial relation for the SRS resource corresponding to the SRS resource $ID_i$.

Resource BWP This field indicates a BWP ID of the reference RS used for deriving a spatial relation to the SRS resource corresponding to the SRS resource $ID_i$. Code point mapping of a BWP indicator in the DCI may be referred.

Resource $ID_i$: This field indicates an ID of the reference RS used for deriving a spatial relation of the SRS resource $_i$. The resource $ID_0$ may indicate a first SRS resource corresponding to the SRS resource $ID_0$, and the resource $ID_1$ may indicate a second SRS resource. If the $F_i$ field is set to 0 (i.e., when the reference RS is an SSB or SRS), the first bit of the resource $ID_i$ field may always be set to 0. If the $F_i$ field is set to 0 and the second bit of the resource $ID_i$ field is set to 1, the remaining bits of the resource $ID_i$ field may indicate an SSB-Index (i.e., SSB index). If the $F_i$ field is set to 0 and the second bit of the resource $ID_i$ field is set to 0, the remaining bits of the resource IR field may indicate SRS-ResourceId (i.e., SRS resource ID).

R: Reserved bit: This field may be set to 0.

Figure 21:
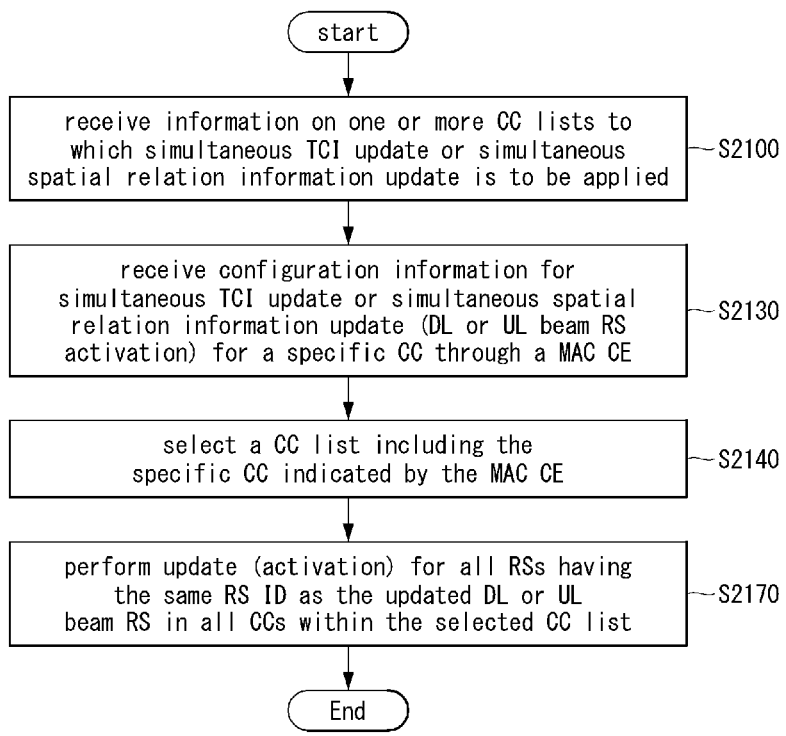
FIG. 21 is a flowchart for describing an exemplary embodiment of an operation method of a first communication node for a simultaneous TCI update or a simultaneous spatial relation indication procedure in a communication system.

FIG. 21 is a flowchart for describing an exemplary embodiment of an operation method of a first communication node for a simultaneous TCI update or a simultaneous spatial relation indication procedure in a communication system.

Referring to FIG. 21, a first communication node corresponding to a terminal (or IAB-MT of a lower node) may receive, from a second communication node corresponding to a base station (or IAB-DU of an upper node), a signal for simultaneous TCI update or simultaneous spatial relation indication (or simultaneous spatial relation information update), and operate based on the received signal.

Specifically, the first communication node may receive, from the second communication node, information on one or more CC lists (or one or more serving cell lists) configured for simultaneous TCI update (or simultaneous spatial relation information indication) (S2100). In other words, the second communication node may configure, with respect to the first communication node, one or more CC lists (or one or more serving cell lists) to which simultaneous TCI update (or simultaneous spatial relation information indication) is to be applied.

The first communication node may receive a MAC CE indicating information for simultaneous TCI update (or simultaneous spatial relation information indication) for a specific CC (or a specific serving cell) from the second communication node (S2130). In other words, the second communication node may indicate the information for simultaneous TCI update (or simultaneous spatial relation information indication) for a specific CC (or a specific serving cell) to the first communication node through the MAC CE. The MAC CE that the first communication node receives from the second communication node in step S2130 may have the MAC CE structure described with reference to FIG. 19 or FIG. 20. In step S2130, an update (e.g., activation or deactivation) for a specific DL (or UL) beam RS may be indicated.

The first communication node may compare the information of the CC (or serving cell) indicated based on the MAC CE received in step S2130 with the information of one or more CC lists (or one or more serving cell lists) received in step S2100. The first communication node may check whether the information of the CC (or serving cell) indicated based on the MAC CE received in step S2130 is included in the one or more CC lists (or serving cell lists) received in step S2100.

The first communication node may select a CC list (or serving cell list) including the CC (or serving cell) indicated based on the MAC CE received in step S2130 among the one or more CC lists (or serving cell lists) received in step S2100 (S2140). The first communication node may perform the same update (activation or deactivation) for all RSs having the same RS ID as the DL (or UL) beam RS updated in step S2130 for all CCs (or serving cells) in the selected CC list (or serving cell list) (S2170).

Communication in the FR2 band may require a CA or DC operation to support a bandwidth of several hundred MHz or more. For example, for communication in the FR2 band, a CA or DC composed of 8 CCs or less may be operated, and the number of beams required per one serving cell (or CC) may be tens or more. That is, hundreds of beams may be configured or indicated to one terminal across the entire band. This may increase the terminal implementation burden and signaling load exponentially. According to the above-described simultaneous beam indication function (simultaneous TCI update' or 'simultaneous spatial relation indication') for multiple serving cells (or CCs), the terminal implementation burden and signaling load may be reduced.

Meanwhile, according to the above-described simultaneous beam indication function for multiple serving cells (or CCs), a plurality of serving cell lists (or CC lists) cannot include the same serving cells (or the same CCs), and the serving cell lists (or CC lists) may be configured to be mutually exclusive. Accordingly, when an IAB node intends to use different operation modes (e.g., TDM and FDM, TDM and SDM, etc.) in the same serving cell (e.g., use the TDM between DU/MT time-frequency resources in a specific time period in the serving cell, and use the FDM between DU/MT time-frequency resources in another specific time period in the serving cell) and use beam sets having an intersection rather than an empty set between the operation modes, it may not be easy to use the above-described simultaneous beam indication function for the multiples serving cells (or CCs) as it is.

Hereinafter, such an operation will be described based on a serving cell or a serving cell list, but this is only an example for convenience of description and exemplary embodiments of the present disclosure are not limited thereto. For example, configurations described for a serving cell or a serving cell list in the present disclosure may be applied identically or similarly to a CC or a CC list.

In an exemplary embodiment of an IAB node designed to support simultaneous operations of an IAB-MT and an IAB-DU, the IAB-MT and the IAB-DU may operate based on one simultaneous operation scheme among the following Cases A to F.

Case A (DU Tx/MT Tx): The IAB-DU performs downlink transmission and the IAB-MT performs uplink transmission at the same time point (symbol).

Case B (DU Rx/MT Rx): The IAB-DU performs uplink reception and the IAB-MT performs downlink reception at the same time point (symbol).

Case C (DU Rx/MT Tx): The IAB-DU performs uplink reception and the IAB-MT performs uplink transmission at the same time point (symbol).

Case D (DU Tx/MT Rx): The IAB-DU performs downlink transmission and the IAB-MT performs downlink reception at the same time point (symbol).

Case E (DU/MT FDM required): For the simultaneous operations of the IAB-DU and the IAB-MT, radio resources of the IAB-DU and the IAB-MT are required to be FDMed.

Case F (DU/MT SDM required): For the simultaneous operations of the IAB-DU and the IAB-MT, radio resources of the IAB-DU and the IAB-MT are required to be SDMed.

The IAB-DU and the IAB-MT operating simultaneously based on one of Cases A to F may be included in one IAB node, or may be considered to constitute one IAB node. In other words, the IAB-DU and the IAB-MT operating simultaneously based on one of Cases A to F may be regarded as being co-located. Here, when the interference control capability of the IAB-DU and/or IAB-MT is relatively limited, Case E may be applied, and when the interference control capability of the IAB-DU and/or IAB-MT is relatively excellent, Case F may be applied.

In an exemplary embodiment of the communication system, the IAB node (or IAB-DU and IAB-MT) may support at least one or more of the four simultaneous operation schemes of Cases A to D. The IAB node (or IAB-DU and IAB-MT) may report information on the one or more simultaneous operation schemes supported by the IAB node to an upper node of the IAB node. Alternatively, the IAB node (or IAB-DU and IAB-MT) may report information on one or more combinations of a plurality of simultaneous operation schemes supported by the IAB node to an upper node of the IAB node. Here, the 'upper node of the IAB node' may correspond to an upper IAB node, an IAB donor node, a parent node, a central unit (CU), or a core network. The reporting may be performed identically or similarly to that shown in Table 19.

Meanwhile, in another exemplary embodiment of the communication system, the IAB node (or IAB-DU and IAB-MT) may support at least one or more of the six simultaneous operation schemes of Cases A to F. The IAB node (or IAB-DU and IAB-MT) may report information on one or more simultaneous operation schemes supported by the IAB node to the upper node. Alternatively, the IAB node (or IAB-DU and IAB-MT) may report information on one or more combinations of a plurality of simultaneous operation schemes supported by the IAB node to the upper node. The reporting may be performed identically or similarly to that shown in Table 29.

TABLE 29

| IE/ group name | range | IE type and reference | liminality |
| --- | --- | --- | --- |
| IAB-MT cell list | 1 | | |
| >IAB-MT cell item | 1 . . . <maxnoofServingCells> | | |
| >>NR cell identity | | Bit string (size: 36) | Identity of a serving cell configured for a co-located IAB-MT |
| >>DU_RX/ MT_RX | | Enumerated (supported, not-supported) | Indicates whether the IAB node supports simultaneous receptions in DU and MT |
| >>DU_TX/ MT_TX | | Enumerated (supported, not-supported) | Indicates whether the IAB node supports simultaneous transmissions in DU and MT |
| >>DU_TX/ MT_RX | | Enumerated (supported, not-supported) | Indicates whether the IAB node simultaneously supports transmission in DU and reception in MT |
| >>DU_RX/ MT_TX | | Enumerated (supported, not-supported) | Indicates whether the IAB node simultaneously supports reception in DU and transmission in MT |
| >> DU/MT FDM required | | Enumerated (supported, not-supported) | Indicates whether the IAB node supports (or requires) the FDM scheme |
| >> DU/MT SDM required | | Enumerated (supported, not-supported) | Indicates whether the IAB node supports (or requires) the SDM scheme |

The report according to Table 29 may further include elements corresponding to Cases E and F in addition to the elements constituting the report according to Table 19.

Meanwhile, the upper node (or CU) of the IAB node may identify information on the simultaneous operation scheme (or combination of the simultaneous operation schemes) supported by the IAB node through the reporting according to Table 19 or the reporting according to Table 29. The upper node (or CU) of the IAB node may configure through higher layer signaling or dynamically indicate through L1/L2 signaling which simultaneous operation scheme (or combination of simultaneous operation schemes) to apply in which time-frequency resources to the IAB node.

Hereinafter, 'Case A', 'Case B', 'Case C', 'Case D', 'Case E', or 'Case F' in the present disclosure means the aforementioned Case A, Case B, Case C, Case D, case E, or case F. In the present disclosure, 'H/S/NA type' or 'HSNA type' refers to at least one of 'hard (H)', 'soft (S)', and 'not-available (NA)' configured for a slot or symbol constituting a time resource. 'H/S/NA configuration' or 'HSNA configuration' refers to a procedure, message, or signal for configuring a HSNA type for each slot (or symbol), beam (or panel), resource, or the like.

The IAB-DU and the IAB-MT within one IAB node may operate in the half-duplex mode, full-duplex mode, or the like depending on various factors such as antenna separation degree and interference control degree. Here, preferred beams or available beams may be different for the respective operation modes. Techniques for beam management or beam control for the IAB node supporting a plurality of operation modes such as the half-duplex mode and the full-duplex mode may be required.

First Exemplary Embodiment of Communication System

In a first exemplary embodiment of the communication system, configurations for supporting HSNA configuration per beam (or panel) for beam management of an IAB node are proposed.

Figure 22:
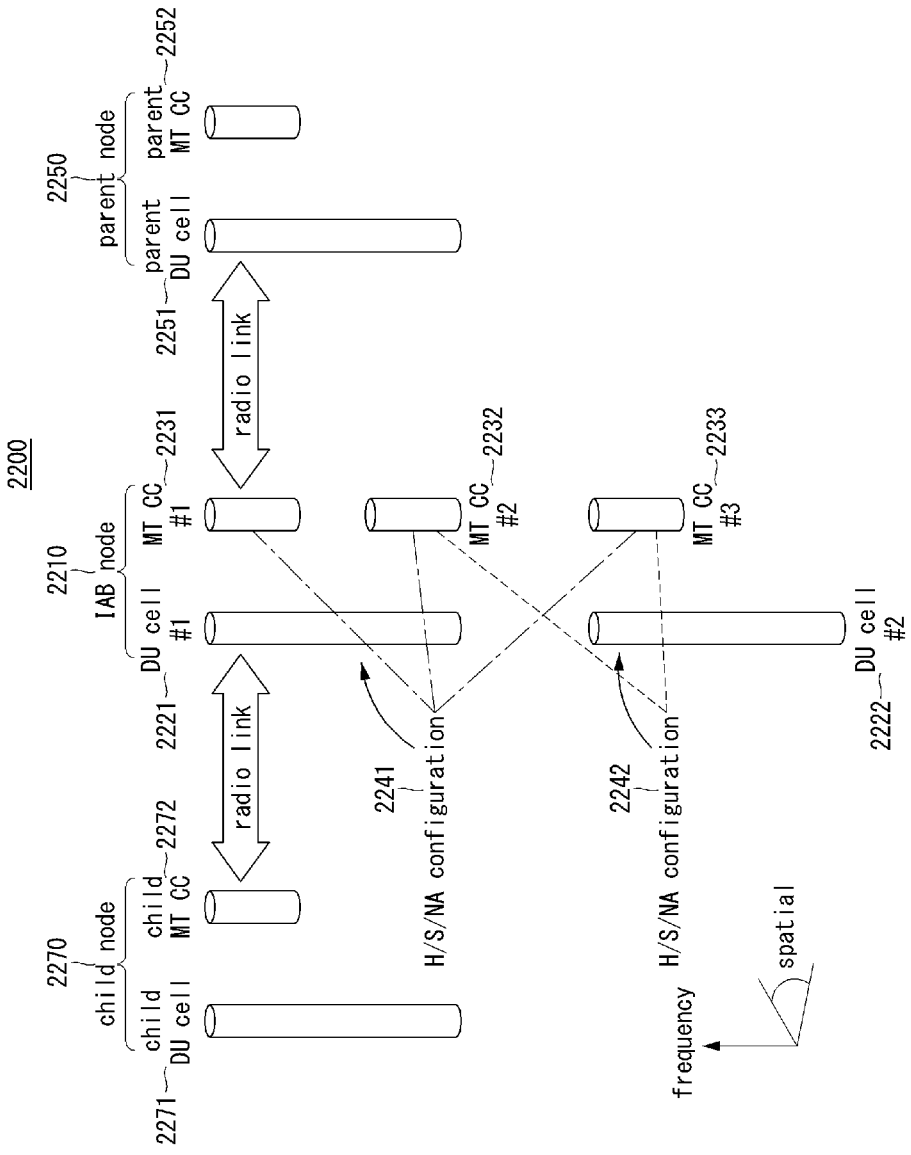
FIG. 22 is a conceptual diagram for describing an exemplary embodiment of an HSNA configuration operation scheme when a plurality of {DU cell, MT CC} pairs exist within one IAB node in a communication system.

FIG. 22 is a conceptual diagram for describing an exemplary embodiment of an HSNA configuration operation scheme when a plurality of {DU cell, MT CC} pairs exist within one IAB node in a communication system.

Referring to FIG. 22, a communication system 2200 may include at least one IAB node 2210. The communication system 2200 may further include at least one upper node (e.g., parent node 2250) of the IAB node 2210, at least one lower node (e.g., child node 2270) of the IAB node 2210, and the like. FIG. 22 shows an exemplary embodiment in which one IAB node 2210 performs communications with one parent node 2250 and one child node 2270 through various radio links. However, this is only an example for convenience of description, and exemplary embodiments of the present disclosure are not limited thereto.

The IAB node 2210 may consist of an IAB-DU and an IAB-MT. One or more IAB-DU cells (hereinafter, 'DU cells') (e.g., DU cell #1 2221, DU cell #2 2222) may correspond to the IAB-DU, and one or more IAB-MT CCs (hereinafter, 'MT CCs') (e.g., MT CC #1 2231, MT CC #2 2232, MT CC #3 2233) may correspond to the IAB-MT. A parent DU cell 2251 and a parent MT CC 2252 may exist in the parent node 2250. A child DU cell 2271 and a child MT CC 2272 may exist in the child node 2270. Radio links may be formed between the MT CCs 2231, 2232, and 2233 of the IAB node 2210 and the parent DU cell 2251 of the parent node 2250. Radio links may be formed between the DU cells 2221 and 2222 of the IAB node 2210 and the child MT CC 2272 of the child node 2270. FIG. 22 shows an exemplary embodiment in which only the IAB node 2210 has a plurality of DU cells and/or MT CCs, but this is only an example for convenience of description, and exemplary embodiments of the present disclosure are not limited thereto.

In an exemplary embodiment of the communication system, one H/S/NA slot configuration set (or H/S/NA configuration) may be provided for each DU cell. The parent node 2250 may perform H/S/NA resource configuration and availability indication (AI) for soft resources based on a correspondence relation of all MT CCs associated with one DU cell. For example, when the DU cell #1 2221 of the IAB node 2210 shares the same frequency band with the MT CC #1 2231 and the MT CC #2 2232 of the MT co-located with the DU cell #1 2221, or when the DU cell #1 2221 of the IAB node 2210 exists in a band adjacent to the MT CC #3 2233, the corresponding DU cell and MT CCs may cause interference at the same frequency with each other, and such interference may degrade performance of simultaneous DU/MT operations. In this case, the parent node 2250 may need to consider all of the associated MT CCs 2231, 2232, and 2233 when performing H/S/NA configuration 2241 for the DU cell #1 2221 of the IAB node 2210. Here, 'considering the associated MT CCs' may refer to determining a resource type H/S/NA for the corresponding DU based on resource allocation/indication information, multiplexing capability (see Table 19 or 29), and/or the like of the corresponding MT CCs. As another example, when the DU cell #2 2222 of the IAB node 2210 shares the same frequency band as the MT CC #3 2233 of the co-located MT, or exists in a band adjacent to the MT CC #2 2232, the DU cell 2222 and the MT CCs 2232 and 2233 may cause interference at the same frequency with each other, and such interference may degrade performance of the simultaneous DU/MT operations. In this case, the parent node may need to consider all of the associated MT CCs 2232 and 2233 when performing H/S/NA configuration 2242 for the DU cell #2 2222 of the IAB node 2210. On the other hand, in the case of MT CC #1 2231 in a frequency band that is sufficiently far from the DU cell #2 2222 of the IAB node 2210, if mutual interference within the {DU cell #2 and the MT CC #1} pair is determined to be sufficiently small, D/F/U configuration, existence, and the like of the MT CC #1 2231 may not affect the H/S/NA resource type configuration of the DU cell #2.

The DU (or DU cell) resource type configuration example described with reference to FIG. 22 may be extended in the spatial domain in consideration of a beamforming gain of the DU antenna (or panel) and a beamforming gain of the MT antenna (or panel).

Figure 23:
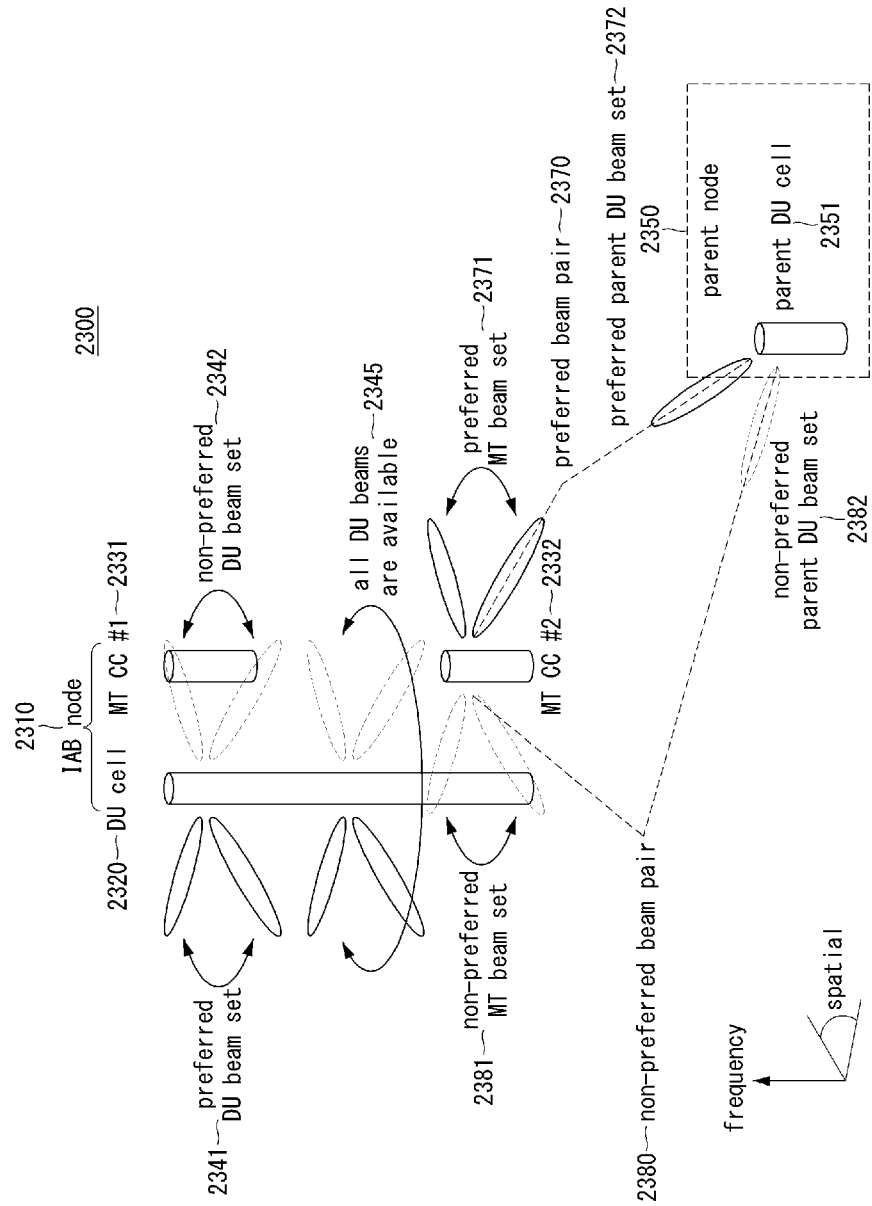
FIG. 23 is a conceptual diagram for describing an exemplary embodiment of a DU/MT beam preference configuration scheme according to frequency resource allocation for a DU cell and an MT CC of an IAB node in a communication system.

FIG. 23 is a conceptual diagram for describing an exemplary embodiment of a DU/MT beam preference configuration scheme according to frequency resource allocation for a DU cell and an MT CC of an IAB node in a communication system.

Referring to FIG. 23, a communication system 2300 may include at least one IAB node 2310. The communication system 2300 may further include at least one upper node (e.g., parent node 2350) of the IAB node 2310, at least one lower node (e.g., child node) of the IAB node 2310, and the like. FIG. 23 shows an exemplary embodiment in which one IAB node 2310 communicates with one parent node 2350 through beam(s). However, this is only an example for convenience of description, and exemplary embodiments of the present disclosure are not limited thereto.

The IAB node 2310 may consist of an IAB-DU and am IAB-MT. The IAB-DU may form at least one DU cell 2320, and the IAB-MT may form at least one MT CC (e.g., MT CC #1 2331, MT CC #2 2332). A parent DU cell 2351 and a parent MT CC (not shown) may exist in the parent node 2350. The MT CCs 2331 and 2332 of the IAB node 2310 and the parent DU cell 2351 of the parent node 2350 may communicate with each other using beam(s). FIG. 23 shows an exemplary embodiment in which the IAB node 2310 includes only one DU cell 2320 in the frequency domain in order to emphasize the extension in the spatial domain, but this is only an example for convenience of description, exemplary embodiments of the present disclosure are not limited thereto.

The DU cell 2320 of the IAB node 2310 may be serviced through beams 2341, 2342, and 2345 having different beam patterns formed by one or more DU antennas (or panels). In other words, the DU cell 2320 of the IAB node 2310 may be serviced through the beams 2341, 2342, and 2345 having maximum beam gains in different directions. The MT CCs 2331 and 2332 of the IAB node 2310 may be serviced through beams 2371 and 2381 formed by one or more MT antennas (or panels) and having different beam patterns. In other words, the MT CCs 2331 and 2332 of the IAB node 2310 may be serviced through beams 2371 and 2381 having maximum beam gains in different directions.

The positions and widths of the frequency bands occupied by one DU cell and one MT CC may not be the same. For example, the frequency band in which one DU cell 2320 is serviced may be formed over an area including all different frequency bands in which a plurality of MT CCs 2331 and 2332 are serviced, respectively. Here, a part of the frequency band in which the DU cell 2320 is serviced may not overlap the frequency bands in which the MT CCs 2331 and 2332 are serviced.

The IAB node 2310 may be connected to a child node (not shown) through the DU cell 2320. If the DU cell 2320 considers the simultaneous DU/MT operations in the frequency band overlapping with the MT CC #1 2231, a beam not directed in the direction of the antenna (or panel) of the MT CC #1 2331 from the antenna (or panel) of the DU cell 2320 may cause a relatively small amount of DU-MT interference. As such, a beam (or beam set) causing a relatively small amount of DU-MT interference may be determined as a DU beam (or beam set) suitable (or preferred) for the simultaneous DU/MT operations from the DU perspective. Through such determination, a preferred DU beam set 2341 for the DU cell 2320 may be selected. Meanwhile, a beam directed from the antenna (or panel) of the DU cell 2320 toward the antenna (or panel) of the MT CC #1 2331 may cause a relatively large amount of DU-MT interference. Such a beam (or beam set) causing a relatively large amount of DU-MT interference may be determined as a DU beam (or beam set) unsuitable (or non-preferred) for simultaneous DU/MT operations from the DU perspective. Through such determination, a non-preferred DU beam set 2342 for the DU cell 2320 may be selected.

Meanwhile, the DU cell 2320 may determine that all DU beams (or beam sets) 2345 are available without considering DU-MT interferences in a frequency band that does not overlap any MT CC frequency bands to which simultaneous DU/MT operations are applied or a frequency band overlapping the frequency band of the MT CC co-located with the DU cell and operating in the TDM mode.

Information on the preferred DU beam set 2341 and/or the non-preferred DU beam set 2342 may be indicated, represented, or reported by the TCI state ID(s), spatial relation ID(s), QCL ID(s), etc. related to the corresponding beam (or beam set). Alternatively, the information on the preferred DU beam set 2341 and/or the non-preferred DU beam set 2342 may be indicated, represented, or reported by an ID of an RS (e.g., reference RS or target RS) referenced by the TCI configuration, spatial relation configuration, QCL configuration, etc. The relation between the beam (or beam set) and the TCI state ID, spatial relation ID, QCL ID, and/or RS ID may be equally or effectively applied throughout the present disclosure. Hereinafter, overlapping descriptions in relation to the above-described relation may be omitted.

The IAB node 2310 may configure, indicate, or notify information on the preferred DU beam set 2341 and/or the non-preferred DU beam set 2342 to a lower node. Here, 'notifying the lower node of information on the suitable (or unsuitable) DU beam/beam set' may correspond to instructing the corresponding lower node to exclude the corresponding beam or beams included in the corresponding beam set in future CSI/beam related reports (e.g., report for a specific mode, e.g., simultaneous DU/MT operations) explicitly (e.g., through a separate higher layer parameter or an indication based on L1 signaling) or implicitly (e.g., according to whether information on the DU beam/beam set is notified). This may prevent a discrepancy between the preferred/non-preferred DU beams for simultaneous DU/MT operations in the IAB node 2310 and the preferred/non-preferred DU beam from the point of view of the lower node, thereby facilitating beam selection of the IAB DU 2320.

Meanwhile, the IAB node 2310 may report information on the preferred DU beam set 2341 and/or the non-preferred DU beam set 2342 to an upper node (e.g., parent node 2350). Here, 'reporting to the upper node information on the suitable (or unsuitable) DU beam/beam set' may correspond to instructing the corresponding upper node to exclude the corresponding beam or beams included in the corresponding beam set in future resource allocation (e.g., resource allocation for a specific mode, e.g., simultaneous DU/MT operations) explicitly (e.g., through a separate higher layer parameter or an indication based on L1 signaling) or implicitly (e.g., according whether information on the DU beam/beam set is notified). This may prevent a discrepancy between the preferred/non-preferred DU beams for simultaneous DU/MT operations in the IAB node 2310 and the preferred/non-preferred DU beam from the point of view of the upper node, thereby facilitating beam selection of the IAB DU 2320.

The IAB node 2310 may be connected to the parent node 2350 (or the parent DU cell 2351 of the parent node 2350) through at least one of the MT CCs 2331 and 2332. If the MT CC #2 2332 connected to the parent node 2350 is instructed to perform simultaneous operations with the DU cell 2320, it may be assumed that a plurality of available beam pairs 2370 and 238 exist between the parent DU cell 2351 and the MT CC #2 2332. In this case, the IAB node 2310 may report information on a preferred beam pair 2370 (or preferred beam pair set) and/or information on the non-preferred beam pair 2380 (or the non-preferred beam pair set) to the upper node (e.g., parent node 2350) from the MT CC #2 2332 perspective (or from the point of view of the CC list or serving cell list including the MT CC #2 2332). Here, the information on the preferred beam pair 2370 or the information of the non-preferred beam pair 2380 may be replaced with information on a beam (or beam set) of the MT CC #2 constituting the preferred beam pair 2370 or information on a beam (or beam set) of the MT CC #2 constituting the non-preferred beam pair 2380. For example, the IAB node 2310 may report information on the preferred MT beam set 2371 and/or information on the non-preferred MT beam set 2381 to the upper node (e.g., parent node 2350). Through this report, the IAB node 2310 may reduce a discrepancy between the preference on the MT beam used when performing simultaneous DU/MT operations and MT transmission/reception beams actually indicated according to the TCI state (or QCL type D) or spatial relation information indicated by the upper node.

In an exemplary embodiment of the communication system, the IAB node 2310 may identify the MT CC #2 2332 operating in the multiplexing mode among one or more MT CCs formed by the IAB MTs constituting the IAB node 2310. Here, the multiplexing mode may correspond to the simultaneous DU/MT operation mode in the IAB network. The multiplexing mode may correspond to one or more simultaneous operation scheme described with reference to Table 19 or Table 29. The IAB node 2310 may determine beam preference information for the MT CC #2 2332 (hereinafter, 'first beam preference information').

Here, the first beam preference information may include information on preferred MT beams (i.e., information on one or more beams suitable for the MT CC #2 2232 to use in a multiplexing mode) among beams formed by the MT CC #2 2332 or information of a preferred MT beam set 2371. Alternatively, the first beam preference information may include information on non-preferred MT beams (i.e., information on one or more beams not suitable for the MT CC #2 2232 to use in the multiplexing mode) among beams formed by the MT CC #2 2332 or information of a non-preferred MT beam set 2381. Alternatively, the first beam preference information may include information on one or more beams suitable for the MT CC #2 2332 to use in the multiplexing mode among beams of the MT CC #2 2332 and information on one or more beams suitable for communication with the MT CC #2 2332 (i.e., preferred beam pair 2370) among beams of the parent DU cell 2351 of the parent node 2350. Alternatively, the first beam preference information may include information on one or more beams not suitable for the MT CC #2 2332 to use in the multiplexing mode among beams of the MT CC #2 2332 and information on one or more beams not suitable for communication with the MT CC #2 2332 (i.e., preferred beam pair 2370) among beams of the parent DU cell 2351 of the parent node 2350. The first beam preference information may be indicated based on information on at least one of TCI state ID(s), spatial relation ID(s), QCL ID(s), or RS ID(s) corresponding to one or more beams suitable for the MT CC #2 2332 to use in the multiplexing mode or one or more beams not suitable for the MT CC #2 2332 to use in the multiplexing mode.

The first beam preference information may be determined based on a relation between one or more DU cells and the MT CC #2 2332 constituting the IAB node 2310. Specifically, the first beam preference information may be determined based on at least one of a degree of interference between the one or more DU cells and the MT CC #2 2332 constituting the IAB node 2310, a relationship between a frequency band of each of the one or more DU cells and a frequency band of the MT CC #2 2332, and relative positions of the one or more DU cells and the MT CC #2 2332.

The IAB node 2310 may report the first beam preference information to the parent node 2350. The parent node 2350 may receive the first beam preference information transmitted from the IAB node 2310. The parent node 2350 may determine H/S/NA configuration information for the beams of MT CC #2 2332 based on the first beam preference information. The parent node 2350 may transmit beam configuration information including the H/S/NA configuration information determined for the beams of MT CC #2 2332 to the IAB node 2310. Here, a specific configuration related to the H/S/NA configuration information will be described in more detail with reference to FIG. 24.

Meanwhile, in another exemplary embodiment of the communication system, the IAB node 2310 may identify the DU cell 2320 operating in the multiplexing mode among one or more DU cells formed by the IAB DU constituting the IAB node 2310. Here, the multiplexing mode may correspond to the simultaneous DU/MT operation mode in the IAB network. The IAB node 2310 may determine beam preference information (hereinafter, 'second beam preference information') for the DU cell 2320.

Here, the second beam preference information may include information on preferred DU beams (i.e., information on one or more beams suitable for the DU cell 2320 to use in the multiplexing mode) among beams formed by the DU cell 2320 or information of a preferred DU beam set 2341. Alternatively, the second beam preference information may include information on non-preferred DU beams (i.e., information on one or more beams not suitable for the DU cell 2320 to use in the multiplexing mode) among beams formed by the DU cell 2320 or information of a non-preferred DU beam set 2342. The second beam preference information may be indicated based on information on at least one of TCI state ID(s), spatial relation ID(s), QCL ID(s), or RS ID(s) corresponding to one or more beams suitable for the DU cell 2320 to use in the multiplexing mode or one or more beams not suitable for the DU cell 2320 to use in the multiplexing mode.

The second beam preference information may be determined based on a relation between one or more MT CCs and the DU cell 2320 constituting the IAB node 2310. Specifically, the second beam preference information may be determined based on at least one of a degree of interference between the one or more MT CCs and the DU cell 2320 constituting the IAB node 2310, a relationship between a frequency band of each of the one or more MT CCs and a frequency band of the DU cell 2320, and relative positions of the one or more MT CCs and the DU cell 2320.

The IAB node 2310 may report the second beam preference information to the parent node 2350. The parent node 2350 may receive the second beam preference information transmitted from the IAB node 2310. The parent node 2350 may determine H/S/NA configuration information for the beams of the DU cell 2320 based on the second beam preference information. The parent node 2350 may transmit second beam configuration information including the H/S/NA configuration information determined for the beams of the DU cell 2320 to the IAB node 2310. The IAB node 2310 may communicate with a lower node (e.g., child node) based on the second beam preference information and/or the second beam configuration information. Here, a specific configuration related to the H/S/NA configuration information will be described in more detail with reference to FIG. 24.

Figure 24:
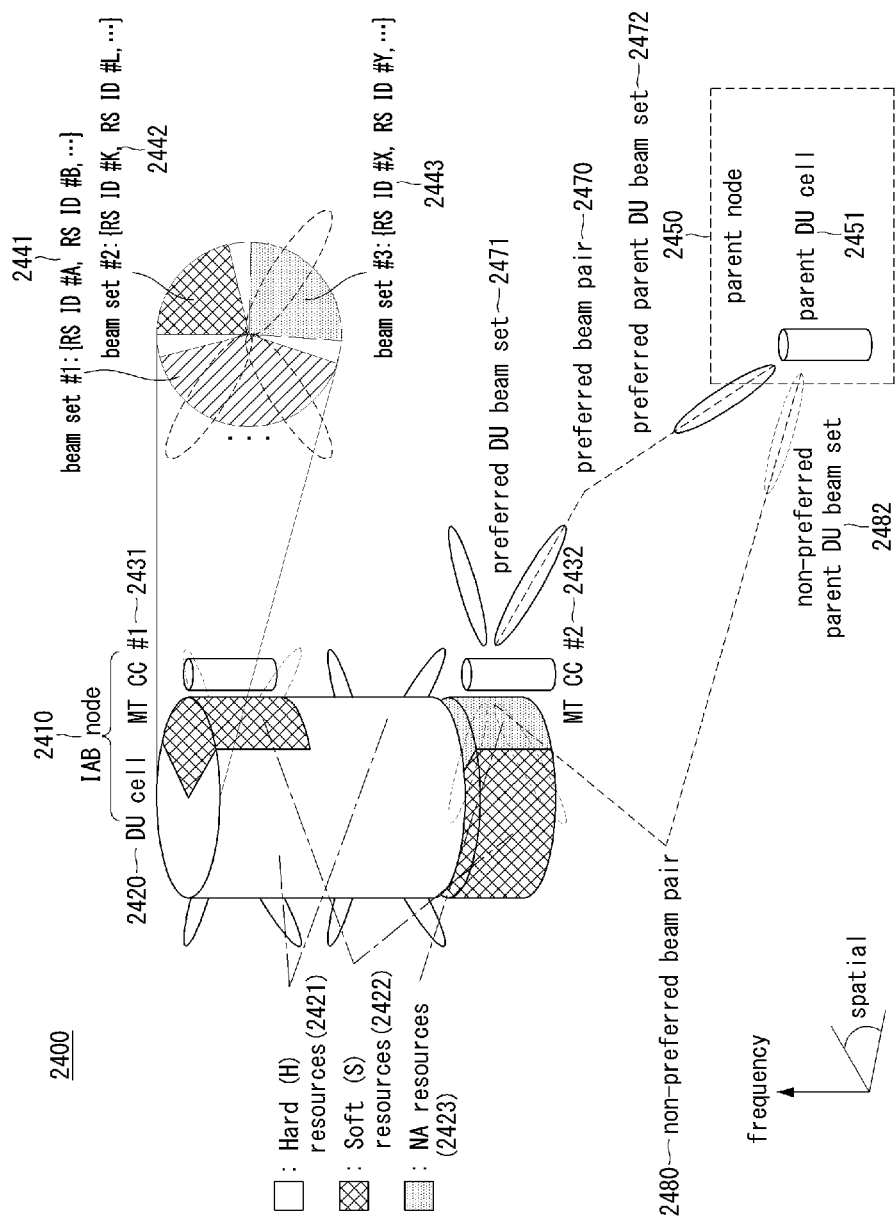
FIG. 24 is a conceptual diagram for describing an exemplary embodiment of a method of extending H/S/NA configuration for beam management for simultaneous DU/MT operations in the spatial domain in a communication system.

FIG. 24 is a conceptual diagram for describing an exemplary embodiment of a method of extending H/S/NA configuration for beam management for simultaneous DU/MT operations in the spatial domain in a communication system.

Referring to FIG. 24, a communication system 2400 may include at least one IAB node 2410. The communication system 2400 may further include at least one upper node (e.g., parent node 2450) of the IAB node 2410, at least one lower node (e.g., child node) of the IAB node 2410, and the like.

The IAB node 2410 may consist of an IAB-DU and an IAB-MT. One or more DU cells 2420 may be formed by the IAB-DU, and one or more MT CCs (e.g., MT CC #1 2431, MT CC #2 2432) may be formed in the IAB-MT. A parent DU cell 2451 and a parent MT CC (not shown) may exist in the parent node 2450. The MT CCs 2431 and 2432 of the IAB node 2410 and the parent DU cell 2451 of the parent node 2450 may communicate with each other using beam(s).

The DU cell 2420 of the IAB node 2410 may be serviced through beams 2441, 2442, and 2443 having different beam patterns formed by one or more DU antennas (or panels). The MT CCs 2431 and 2432 of the IAB node 2410 may be serviced through beams 2471 and 2481 formed by one or more MT antennas (or panels) and having different beam patterns.

The positions and widths of the frequency bands occupied by one DU cell and one MT CC may not be the same. For example, the frequency band in which one DU cell 2420 is serviced may be formed over an area including all different frequency bands in which a plurality of MT CCs 2431 and 2432 are serviced, respectively. Here, a part of the frequency band in which the DU cell 2420 is serviced may not overlap the frequency bands in which the MT CCs 2431 and 2432 are serviced. In consideration of these characteristics, the conventional H/S/NA resource configuration (or H/S/NA resource type configuration) configured per cell may be extended to the frequency domain and the space domain.

Specifically, the spatial domain of the DU cell 2420 of the IAB node 2410 may be divided into one or more beam sets 2441, 2442, and 2443 each including one or more beams. Here, information of the one or more beam sets, in actual implementation, may be configured in various forms such as a set of TCI IDs, a set of spatial relation IDs, a higher layer parameter coresetPoolIndex having a specific value, and a set of RS IDs according to various purposes such as downlink beam indication, uplink beam indication, and uplink common beam indication.

For example, the beam set #1 2441 may be configured as a set of beams to be applied (or applicable) to the TDM mode or a set of beams for which the TDM is required. Here, the beam set #1 2441 may be configured to include explicitly indicated beams or may be promised to be configured in an implicit manner such as 'a set of beams (or RSs) not included in any beam set'. The beam set #2 2442 may be configured as a set of beams to be applied (or applicable) to a specific simultaneous DU/MT operation mode (e.g., one of Cases A to D). The beam set #3 2443 may be configured as a set of beams to be applied (or applicable) to another specific simultaneous DU/MT operation mode (e.g., one of Cases E and F). In FIG. 24, each of the beam sets 2441, 2442, and 2443 is illustrated as being mutually exclusive, but this is only an example for convenience of description, and exemplary embodiments of the present disclosure are not limited thereto. For example, in an exemplary embodiment of the communication system 2400, different beam sets may be configured to share the same beam, or a specific beam set may be configured to include another set. This may be regarded as considering a case where there is no beam restriction in the TDM mode (or TDM or FDM mode), but beam restriction occurs in the FDM or SDM mode (or SDM mode).

In another exemplary embodiment of the communication system 2400, the frequency domain of the specific DU cell 2420 may be divided into one or more frequency resource groups each including one or more frequency resource units. The frequency resource unit may be promised or configured based on various criteria such as, for example, per MT CC, per BWP, per resource block group (RBG), or per configured RB.

FIG. 24 shows an exemplary embodiment in which the upper node (e.g., parent node 2450) of the IAB node 2410 divides the spatial domain into two beam sets considering the two modes (i.e., TDM mode and non-TDM node), and divide the frequency domain into three frequency resource groups in consideration of a frequency band corresponding to each of the two MT CCs 2431 and 2432 and a frequency band in which the MT CC is absent. Here, the upper node may configure the first beam set in a band overlapping with the MT CC #1 2431 and all beam sets in the band without the MT CC as 'hard (H)' resources 2421, so the IAB-DU corresponding to the DU cell 2420 performs scheduling without additional indication/permission. This may be regarded as considering whether the corresponding resources are used or not has an insignificant influence on the performance of operations according to the non-TDM mode. As another example, the upper node may configure the second beam set of the band overlapping with the MT CC #1 2431 and the first beam set of the band overlapping with the MT CC #2 2432 as soft (S) resources 2422 so that the IAB DU 2420 performs scheduling when the upper node allows use of the corresponding resources by an availability indicator. This may be regarded as considering that whether or not the corresponding resources are used may have different effects on the performance of operations according to the non-TDM mode depending on various cases. As another example, the upper node may configure the second beam set of the band overlapping with the MT CC #2 2432 as NA resources 2423, so that the IAB-DU corresponding to the DU cell 2420 cannot perform scheduling for the corresponding resources. This may be regarded as considering that whether or not the corresponding resources are used has a large effect on the performance of operations according to the non-TDM mode.

Table 30 shows an embodiment of the H/S/NA resource type setting improvement method for the spatial and frequency domain extension described above.

TABLE 30

|  | Beam (set) #1 | . . . | Beam (set) #M |
|---|---|---|---|
| Frequency Resource #1 | H or S or NA | . . . | H or S or NA |
| . . . | . . . | . . . | . . . |
| Frequency Resource #N | H or S or NA | . . . | H or S or NA |

Referring to Table 30, the upper node may provide the lower node with H/S/NA settings for each frequency resource or beam (set) through at least one of bitmap, separate setting for each domain, and joint setting. When frequency resource configuration is indicated through the bitmap, 1 may indicate H, 0 may indicate NA, and S may be omitted.

Specifically, as in the embodiment shown in FIG. 24, when it is assumed that a total of three configured frequency resource groups exist in one DU cell, and all DU beams are divided into two beam groups and perform the operations of examples of H/S/NA configuration of FIG. 24, the H/S/NA setting for the spatial-frequency axis as shown in Table 31 below may be used.

TABLE 31

|  | Beam set #1 | Beam set #2 |
|---|---|---|
| Frequency Resource #1 | H | S |
| Frequency Resource #2 | H | H |
| Frequency Resource #3 | S | NA |

The setting of Table 31 can be considered together with the above-described time axis H/S/NA setting for each cell (see Table 17) and used to provide the H/S/NA setting for the three-dimensional space-frequency-time.

In one embodiment of the communication system, the upper node may provide the lower node an AI (availability indication), etc. for a resource set to S (soft) in terms of a beam/spatial domain according to the methods of Table 17 and Tables 30 to 31 described above. Through this, it is possible to dynamically indicate whether the resource is available or not. In this case, the above-described dynamic indication may be DCI format 2_5 received by the IAB-MT of the lower node. In this case, the mapping relationship between the AI index field value of DCI format 2_5 and the availability of soft symbols in the slot may not follow Table 18, and may be extended as shown in Table 32.

TABLE 32

| Value | Indication |
|---|---|
| 0 | No indication of availability for soft symbols |
| 1 | DL soft symbols are indicated available<br>No indication of availability for UL and Flexible soft symbols |
| 2 | UL soft symbols are indicated available<br>No indication of availability for DL and Flexible soft symbols |
| 3 | DL and UL soft symbols are indicated available<br>No indication of availability for Flexible soft symbols |
| 4 | Flexible soft symbols are indicated available<br>No indication of availability for DL and UL soft symbols |
| 5 | DL and Flexible soft symbols are indicated available<br>No indication of availability for UL soft symbols |
| 6 | UL and Flexible soft symbols are indicated available<br>No indication of availability for DL soft symbols |
| 7 | DL, UL, and Flexible soft symbols are indicated available |
| 8 | DL soft resources at {frequency resource #A, beam (set) #a} are indicated available<br>No indication of availability for UL and Flexible soft resources |
| 9 | UL soft resources at {frequency resource #A, beam (set) #a} are indicated available<br>No indication of availability for DL and Flexible soft resources |
| 10 | DL and UL soft resources at {freq. resource #A, beam (set) #a} are indicated available<br>No indication of availability for Flexible soft resources |
| 11 | Flexible soft resources at {frequency resource #A, beam (set) #a} are indicated available<br>No indication of availability for DL and UL soft resources |
| 12 | DL and Flexible soft resources at {freq. resource #A, beam (set) #a} are indicated available<br>No indication of availability for UL soft resources |
| 13 | UL and Flexible soft resources at {freq. resource #A, beam (set) #a} are indicated available<br>No indication of availability for DL soft resources |
| 14 | DL, UL and Flexible, soft resources at {freq. resource #A, beam (set) #a} are indicated available |
| 15 | Reserved |

To this end, each AI index field payload of DCI format 2_5 may be extended from 3 bits to 4 bits or more. According to Table 32, the upper IAB node may indicate a conventional operation (e.g., indicating whether to use the D/U/F soft symbol of the IAB-DU based on the DU/MT TDM operation) according to values 0 to 7. In addition, the upper IAB node may indicate whether to use the soft resource set limited to a specific space/frequency resource by values 8 to 14. In this case, the IAB node may need a criterion for determining whether to follow the mapping of Table 18 or the mapping of Table 32. For example, 1) the IAB node may follow the mapping of Table 32 when receiving the settings of Tables 30 to 31 in an implicit way.

Alternatively, 2) a higher layer parameter indicating whether to follow the mapping of Table 18 or the mapping of Table 32 in an explicit way may be introduced. In Table 32, a pair of frequency resources and spatial resources {frequency resource #A, beam (set) #a} is merely an example for convenience of description, and the embodiment of the present invention is not limited thereto. For example, in another embodiment of the communication system, one of the frequency resource and the beam/spatial resource may be omitted.

In an embodiment of the communication system, the upper node may perform a time domain AI indication according to Table 17, and in addition, according to Table 33, to further indicate whether to use a soft resource for a specific space/frequency resource can be set.

TABLE 33

| Value | Indication |
|---|---|
| 0 | No indication of availability for soft symbols |
| 1 | DL soft resources at {frequency resource #A, beam (set) #a} are indicated available<br>No indication of availability for UL and Flexible soft resources |
| 2 | UL soft resources at {frequency resource #A, beam (set) #a} are indicated available<br>No indication of availability for DL and Flexible soft resources |
| 3 | DL and UL soft resources at {freq. resource #A, beam (set) #a} are indicated available<br>No indication of availability for Flexible soft resources |
| 4 | Flexible soft resources at {frequency resource #A, beam (set) #a} are indicated available<br>No indication of availability for DL and UL soft resources |
| 5 | DL and Flexible soft resources at {freq. resource #A, beam (set) #a} are indicated available<br>No indication of availability for UL soft resources |
| 6 | UL and Flexible soft resources at {freq. resource #A, beam (set) #a} are indicated available<br>No indication of availability for DL soft resources |
| 7 | DL, UL and Flexible, soft resources at {freq. resource #A, beam (set) #a} are indicated available |
| 8 | DL soft resources at {frequency resource #B, beam (set) #b} are indicated available<br>No indication of availability for UL and Flexible soft resources |
| 9 | UL soft resources at {frequency resource #B, beam (set) #b} are indicated available<br>No indication of availability for DL and Flexible soft resources |
| 10 | DL and UL soft resources at {freq. resource #B, beam (set) #b} are indicated available<br>No indication of availability for Flexible soft resources |
| 11 | Flexible soft resources at {frequency resource #B, beam (set) #b} are indicated available<br>No indication of availability for DL and UL soft resources |
| 12 | DL and Flexible soft resources at {freq. resource #B, beam (set) #b} are indicated available<br>No indication of availability for UL soft resources |
| 13 | UL and Flexible soft resources at {freq. resource #B, beam (set) #b} are indicated available<br>No indication of availability for DL soft resources |
| 14 | DL, UL and Flexible, soft resources at {freq. resource #B, beam (set) #b} are indicated available |
| 15 | Reserved |

Here, whether to apply Table 33 may be determined as follows. 1) When the settings of Tables 30 to 31 are received in an implicit way, an appointment to follow the mapping of Table 33 may be set. Alternatively, 2) a higher layer parameter indicating whether to follow the mapping of Table 33 in an explicit way may be introduced. In Table 33, a pair of frequency resources and spatial resources {frequency resource #A, beam (set) #a} and {frequency resource #B, beam (set) #b} are merely examples for convenience of description, and Examples are not limited thereto. For example, in another embodiment of the communication system, one of the frequency resource and the beam/spatial resource may be omitted.

In order to indicate whether to use the DU/MT simultaneous operation HSNA configuration for each frequency resource or space/beam resource and whether to use the simultaneous operation soft symbol accordingly, a new DCI format (eg, DCI format 2-y) is defined or a new RNTI (for example, FreqAI-RNTI, BeamAI-RNTI, SpatialAI-RNTI, etc.) may be defined. Through the new DCI format or the new RNTI, the IAB node may distinguish whether the DCI related thereto indicates whether soft symbols can be used according to the conventional HSNA configuration or whether simultaneous operation soft resources can be used according to the new simultaneous operation HSNA configuration. As an example, the IAB node can distinguish whether the DCI indicates AI for soft symbols on the time axis (that is, if the AI-RNTI is scrambled, it is determined as an instruction on the time axis) or AI for soft resources on the frequency axis or the space axis according to which RNTI is scrambled to the CRC (for example, if FreqAI-RNTI is scrambled, it is judged as an instruction on the frequency axis, and if BeamAI-RNTI is scrambled, it is judged as an instruction on the spatial axis).

In the example of FIG. 24, one of the following methods 1 to 4 may be applied to reduce the AI indication signaling burden for the soft resource and to lower the IAB node implementation complexity. In addition, when the following methods 1 to 4 are applied, an upper layer parameter indicating which method is applied to L1/L2 signaling may be introduced.

Method 1 (Implicit availability determination for spatial/beam domain soft resources): According to Method 1, a concurrent operation mode (TDM) represented by a corresponding beam (set) according to which beam (set) the upper node has instructed to use It is possible to implicitly allow the use of soft resources set for mode or at least one of cases A to F). As an example, the first beam set 2441 of FIG. 24 corresponds to the TDM mode, the second beam set 2442 corresponds to the TDM mode and case E (FDM), and the third beam set 2443 is the TDM and case It can be set to correspond to E (FDM) and case F (SDM). In this example, the combination of TDM and case E and case F is for convenience of description and may be variously combined with other modes such as cases A to D in actual application. In a situation such as this example, it can be understood that the IAB node can use a soft resource for the TDM mode when the upper node indicates a beam beam (TCI state, spatial relation, etc.) included in the first beam set 2441 (that is, interpretation of AI instruction according to conventional Tables 17 to 18). On the other hand, if the upper node indicates a beam (TCI state, spatial relationship, etc.) included in the second beam set 2442, it can be understood that soft resources for the FDM mode as well as the TDM mode can be used. Similarly, if the upper node indicates a beam (TCI state, spatial relation, etc.) included in the third beam set 2443, it is understood that soft resources for SDM mode as well as TDM and FDM modes can be used. If the type of case applied to each beam set is changed in this example, the FDM, SDM, etc. may be appropriately changed into DU-TX/MT-TX, DU-TX/MT-RX, DU-RX/MT-TX, DU-RX/MT-RX, etc according to the description for each case described above.

Method 2 (dynamic beam indication restriction according to beam/beam set preference reporting): According to one of the methods provided in the present disclosure, the IAB node may report information about the preferred (or non-preferred) beam (or beam set) to an upper node or notify the information to a lower node. In this case, the preferred (or non-preferred) MT beam (or beam set) may be reported in the same granularity (ie, per MT CC) or a smaller unit (e.g., per BWP, per RB group, per configured RBs, etc.) as the Multiplexing Info IE described above. Thereafter, the IAB node may expect only a dynamic beam indication included in the reported preferred beam (set) (or not included in the reported non-preferred beam (set)) within hard or soft resources (that is, extended to the frequency domain or spatial/beam domain) for simultaneous DU/MT operation. This is when the upper node sets the H/S/NA configuration extended to the spatial/beam domain to the IAB node, the spatial/beam domain H/S/NA configuration and actual dynamic beam allocation (TCI state indication/activation or spatial relation indication) does not match, it means that transmission and reception according to the corresponding indication may not be performed. Through this, it is possible to eliminate ambiguity in the operation of the IAB node.

Method 3 (cell-specific/semi-static signal transmission/reception management method #1 according to beam/beam set preference report): According to one of the methods provided in the present disclosure, the IAB node may report information about the preferred (or non-preferred) beam (or beam set) to an upper node or notify the information to a lower node. Thereafter, the IAB node is included in the preferred beam (set) within hard to soft resources (that is, extended to the frequency domain or spatial/beam domain) for DU/MT simultaneous operation (or included in the non-preferred beam (set)) may be promised to transmit and receive only cell-specific signals/channels or semi-static signals/channels). This can be understood as omitting transmission and reception of cell-specific/semi-static signals/channels when DU/MT simultaneous operation and cell-specific/semi-static signals/channels collide from a beam point of view. This may be understood as setting the priority for setting or instruction for the DU/MT simultaneous operation higher than the priority for the beam instruction (for a specific channel/signal). Through this, it is possible to prevent cell-specific or semi-static signal/channel transmission/reception in an unfavorable direction during simultaneous DU/MT operation and to increase radio transmission efficiency.

Method 4 (cell-specific/semi-static signal transmission/reception management method #2 according to beam/beam set preference reporting): According to one of the methods provided in the present disclosure, the IAB node may report information about the preferred (or non-preferred) beam (or beam set) to an upper node or notify the information to a lower node. At this time, when the time-frequency resource of the cell-specific or semi-static signal/channel overlaps (on the time axis) with the time-frequency resource for DU/MT simultaneous operation, the IAB node is a cell-specific or semi-static signal/channel beam The direction (TCI state, QCL-TypeD, spatial TX/RX filter of RS referenced by spatial relation) can be guaranteed to be included in the preferred beam (set) for DU/MT simultaneous operation. For example, if DU/MT simultaneous operation and cell-specific/semi-static signal/channel collide from a beam point of view, cell-specific/semi-static signal/channel transmission/reception is performed as set, and the setting for DU/MT simultaneous operation It can be understood that the to-instruction is ignored and the operation is performed in the TDM mode. This may be understood as setting the priority for beam indication (for a specific channel/signal) higher than the priority for setting or indication for DU/MT simultaneous operation. Through this, it is possible to prevent cell-specific or semi-static signal/channel transmission/reception in an unfavorable direction during simultaneous DU/MT operation and to increase radio transmission efficiency.

In applying the methods provided in the present disclosure, for the purpose of maintaining the IAB node complexity in each DU/MT simultaneous operation mode below a certain level, the number of activated/released TCI/spatial relations for each DU/MT simultaneous operation mode is increased. It is possible to manage independently. To this end, MAC CE to L1 signaling for TCI/spatial relation indication or activation may be extended to explicitly include DU/MT simultaneous operation modes (at least one of cases A to F) to which the corresponding signaling is applied.

In the examples of this embodiment ranging from FIGS. 24 to 33, the DU cell has been focused on, but this is for convenience of description and is not limited to actual application and can be similarly extended and applied to MT CC (control for beams or beam sets).

Second Exemplary Embodiment of Communication System

In a second exemplary embodiment of the communication system, configurations for supporting TCI update or spatial relation update of multiple serving cells (or CCs) or multiple beams for an IAB node are proposed.

Figure 25:
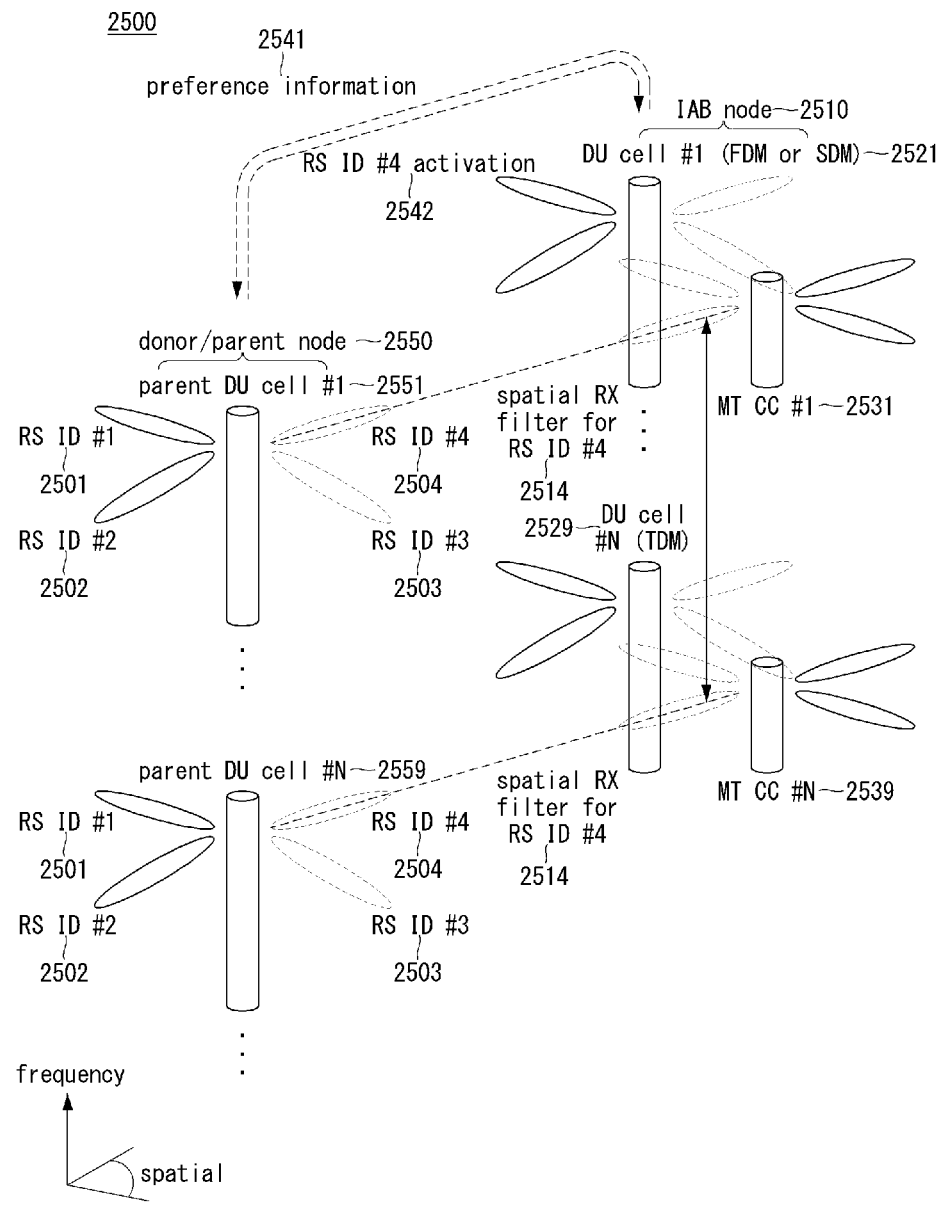
FIG. 25 is a conceptual diagram for describing an exemplary embodiment of a method of performing TCI update or spatial relation update of multiple serving cells (or CCs) and multiple beams for an IAB node in a communication system.

FIG. 25 is a conceptual diagram for describing an exemplary embodiment of a method of performing TCI update or spatial relation update of multiple serving cells (or CCs) and multiple beams for an IAB node in a communication system.

Referring to FIG. 25, a communication system 2500 may include at least one IAB node 2510. The communication system 2500 may further include at least one upper node (e.g., parent node 2550) of the IAB node 2510, at least one lower node (e.g., child node) of the IAB node 2510, and the like. FIG. 25 shows an exemplary embodiment in which one IAB node 2510 performs communication with one parent node 2550 and one child node 2270 through beams. However, this is only an example for convenience of description, and exemplary embodiments of the present disclosure are not limited thereto.

The IAB node 2510 may have one or more DU cells (e.g., DU cell #1 2521, ..., and DU cell #N 2529) and one or more MT CCs (e.g., MT CC #1 2531, ..., and MT CC #N 2539). The parent node 2550 may have one or more parent DU cells (e.g., parent DU cell #1 2551, ..., and parent DU cell #N 2559) and one or more MT CCs (not shown). FIG. 25 shows an exemplary embodiment in which the numbers of DU cells and MT CCs of the IAB node 2510 and the number of DU cells of the parent node 2550 are all N. However, this is only an example for convenience of description, and exemplary embodiments of the present disclosure are not limited thereto.

The DU cells 2521, ..., and 2529 of the IAB node 2510 may be serviced through beams having different beam patterns formed by one or more DU antennas (or panels). The MT CCs 2531, ..., and 2539 of the IAB node 2510 may be serviced through beams having different beam patterns formed by one or more MT antennas (or panels). The parent DU cells 2551, ..., and 2559 of the parent node 2550 may be serviced through beams having different beam patterns formed by one or more DU antennas (or panels).

In an exemplary embodiment of the communication system 2500, the same RS ID (e.g., 2521, 2502, 2503, 2504, ...) may be configured to represent or indicate beams having the same or similar directions across a plurality of serving cells (or CCs). For example, in the exemplary embodiment shown in FIG. 25, the RS ID #4 2504 may be regarded as being mapped to beams (or, RSs corresponding thereto) having a direction from the parent node 2550 toward to the IAB node 2510 or a similar direction thereto identically in a plurality of serving cells (or CCs). In other words, the RS ID #4 may be regarded as being mapped to a spatial TX filter and/or spatial RX filter having the direction from the parent node 2550 toward the IAB node 2510 or a similar direction thereto identically in a plurality of serving cells (or CCs). In this case, the parent DU cells 2551, ..., and 2559 of the parent node 2550 may use the beams in the direction corresponding to the RS ID #4 to transmit signals to the MT CCs 2531, ..., and 2539 of the IAB node 2510. On the other hand, the MT CCs 2531, ..., and 2539 of the IAB node 2510 may a spatial RX filter 2514 in the direction corresponding to the RS ID #4 to receive signals transmitted by the parent DU cells 2551, ..., and 2559. In other words, optimal beam pair(s) (or beam pair link(s)) may be configured based on the RS ID #4 2504 between the parent DU cells 2551, ..., and 2559 of the parent node 2550 and the MT CCs 2531, ..., and 2539 of the IAB node 2510.

Meanwhile, in an exemplary embodiment of the communication system 2500, the direction corresponding to the RS ID #4 2504 may not be suitable for simultaneous DU/MT operations due to the spatial positions of the parent DU cells 2521, ..., and 2529 of the IAB node 2510 and the MT CCs 2531, ..., and 2539 of the IAB node 2510. In this case, the IAB node 2510 may report to the parent node 2550 that the MT CC beam (or spatial RX filter) in the direction corresponding to the RS ID #4 2504 is not suitable for simultaneous DU/MT operations based on the same or similar method as described with reference to the first exemplary embodiment of the communication system. For example, the IAB node 2510 may report preference information 2541 for the MT CC beam (or spatial RX filter 2514, etc.) in the direction corresponding to the RS ID #4 2504 to the parent node 2550. Here, the preference information 2541 reported to the parent node 2550 may include information that the MT CC beam in the direction corresponding to the RS ID #4 2504 is included in a non-preferred MT beam set for simultaneous DU/MT operations. Alternatively, the preference information 2541 reported to the parent node 2550 may include information that the MT CC beam in the direction corresponding to the RS ID #4 2504 is not included in a preferred MT beam set for simultaneous DU/MT operations.

On the other hand, in an exemplary embodiment of the communication system 2500, based on the same or similar multiplexing capability information as shown in Table 19, a specific {DU cell, MT CC} pair of the IAB node 2510 may be configured or indicated to operate in the TDM mode or non-TDM mode. For example, a {DU cell #1 2521, MT CC #1 2531} pair of the IAB node 2510 may be configured or indicated to operate in the non-TDM mode (i.e., TDM not-required, at least one of Cases A to F), and a {DU cell #N 2529, MT CC #N 2539} pair may be configured or indicate to operate in the TDM mode (i.e., TDM required). Here, it may be possible for the MT CC #N 2539 configured or indicated to operate in the TDM mode to use the MT CC beam in the direction corresponding to the RS ID #4 2504 to perform communications with the parent node 2550 (e.g., the parent DU cell #N 2559).

In the above-described situation, when the upper node 2550 indicates simultaneous TCI state update or spatial relation update (in other words, RS ID #4 activation) to all MT CCs 2531, . . . , and 2539 according to the conventional method (i.e., based on FIGS. 19 and 21) for the RS ID #4 2504 with respect to the IAB node 2510, a conflict or discrepancy may occur between the preference information 2541 for simultaneous DU/MT operations, which the IAB node 2510 reported to the parent node 2550, and the TCI/spatial relation information 2542 which the parent node 2550 indicated to the IAB node 2510. By using at least one of the following schemes (Schemes A to E), the above-described conflict or discrepancy problem may be resolved, or based on a preset priority, the ambiguity of the operations of the IAB node 2510 or the IAB MT CCs 2531 and 2539 may be resolved. Here, when one or more of the following schemes (Schemes A to E) are used, information on which scheme(s) are used may be indicated through a predetermined higher layer parameter, L1/L2 signaling, or the like.

Scheme A: The IAB node may report a list of serving cells or CCs using the same or similar IAB MT beam (i.e., spatial TX filter or spatial RX filter) to the upper node. For example, the IAB node may report, to the upper node, one serving cell (or CC) list and a set of RS IDs (e.g., CSI-RS IDs, SSB IDs, or SRS IDs) using the same spatial RX (or TX) filter in all serving cells (CCs) included in the corresponding list. Thereafter, the upper node may configure or indicate the simultaneous DU/MT operation mode of the same type to the serving cells (CCs) belonging to the corresponding serving cell (CC) list, thereby resolving the conflict/discrepancy.

Scheme B: The IAB node may report a preferred (or non-preferred) MT beam (or beam set) for a {DU cell, MT CC} pair which has reported a mode (e.g., TDM not-required) other than the TDM mode as their simultaneous DU/MT operation capability according to Table 18, etc. In this case, the preferred (or non-preferred) MT beam (or beam set) may be reported using the same granularity (i.e., per MT CC) or a smaller granularity (e.g., per BWP, per RB group, per configured RBs, etc.) as the multiplexing information IE described above. In addition, the reporting on the preferred (or non-preferred) beam (or beam set) for a {DU cell, MT CC} pair having reported a simultaneous DU/MT operation multiplexing capability (i.e., multiplexing information IE) as 'TDM required' may be omitted. This may mean that there should be no restriction on the use of the MT beam in the case of the TDM mode. Through this, the upper node may predict for which beam a conflict/discrepancy may occur, and when a collision/discrepancy does not occur, the upper node may perform simultaneous TCI update or simultaneous spatial relation indication.

Scheme C: When the upper node performs simultaneous TCI update or simultaneous spatial relation indication to the IAB node (or configures a serving cell (or CC) list for simultaneous TCI update or simultaneous spatial relation update), the IAB node may be promised not to report preferred (or non-preferred) beams (or beam set) having different values for serving cells (CCs) included in the corresponding list. Through this, it is possible to prevent a conflict/discrepancy from occurring or to reduce the probability of occurrence.

Scheme D: The IAB node supporting the function of the simultaneous TCI update or spatial relation indication may be promised not to report preferred (or non-preferred) beams having different values within a specific frequency resource (e.g., within one cell group, within the same band, within the same carrier, or within an independently configured band). Through this, it is possible to prevent a conflict/discrepancy from occurring or to reduce the probability of occurrence.

Scheme E: The number of serving cell lists (or CC lists) for simultaneous TCI update or simultaneous spatial relation indication may be extended from two to three or more, or the aforementioned restriction 'one serving cell (or CC) cannot be included in different serving cell lists (or CC lists) at the same time' may be relaxed. For example, when a serving cell list A is composed of {cell 1, cell 2, cell 3} and a serving cell list A' is composed of {cell 2, cell 3}, the serving cell list A may be configured to be applied to the TDM mode, and the serving cell list A' may be configured to be applied to the non-TDM mode. This may mean that a simultaneous operation mode (TDM or at least one of Cases A to F) to be applied to a certain serving cell list (or CC list) may be explicitly configured. Through this, it is possible to prevent a conflict/discrepancy from occurring or to reduce the probability of occurrence.

In terms of beam management, the complexity of the UE may be defined as the number of TCI state/spatial relations that can be simultaneously activated or instructed (Max_Num). The IAB node applies one of the following options in applying the methods of this embodiment and reports the value to the upper node to inform the information on the maximum complexity that the terminal (IAB MT) can support.

Option 1: According to the first option, Max_Num defined within a specific frequency resource (e.g. per cell group, per band, per cell, per BWP, etc.) can be shared and used by all CCs regardless of the DU/MT simultaneous operation mode. That is, the value of Max_Num defined and used for conventional Rel-15/-16 beam management (Max_Num_r16) and Max_Num considering simultaneous DU/MT operation (Max_Num_r17) are the same, and the upper node must properly divide the number of beams for the TDM mode and the beams for the non-TDM mode within the reported value (Max_Num_r17).

Option 2: According to the second option, Max_Num_17 for simultaneous DU/MT operation for each CC may be additionally defined. At this time, there is no change in Max_Num (Max_Num_r16) defined and used for conventional Rel-15/-16 beam management, and in CC to which at least one of cases A to F is applied, a beam must be appropriately allocated within Max_Num_17 for each mode.

Option 3: According to the third option, Max_Num_17, which is additionally defined for DU/MT simultaneous operation within a specific frequency resource (e.g. per cell group, per band, per cell, per BWP, etc.), is DU/MT simultaneous operation. Applicable CCs can be divided and used. That is, the maximum number of beams that an MT supporting simultaneous operation can be activated or instructed is equal to sum of Max_Num defined and used for conventional Rel-15/-16 beam management (Max_Num_r16) and Max_Num for DU/MT simultaneous operation (Max_Num_r17).

Figure 26:
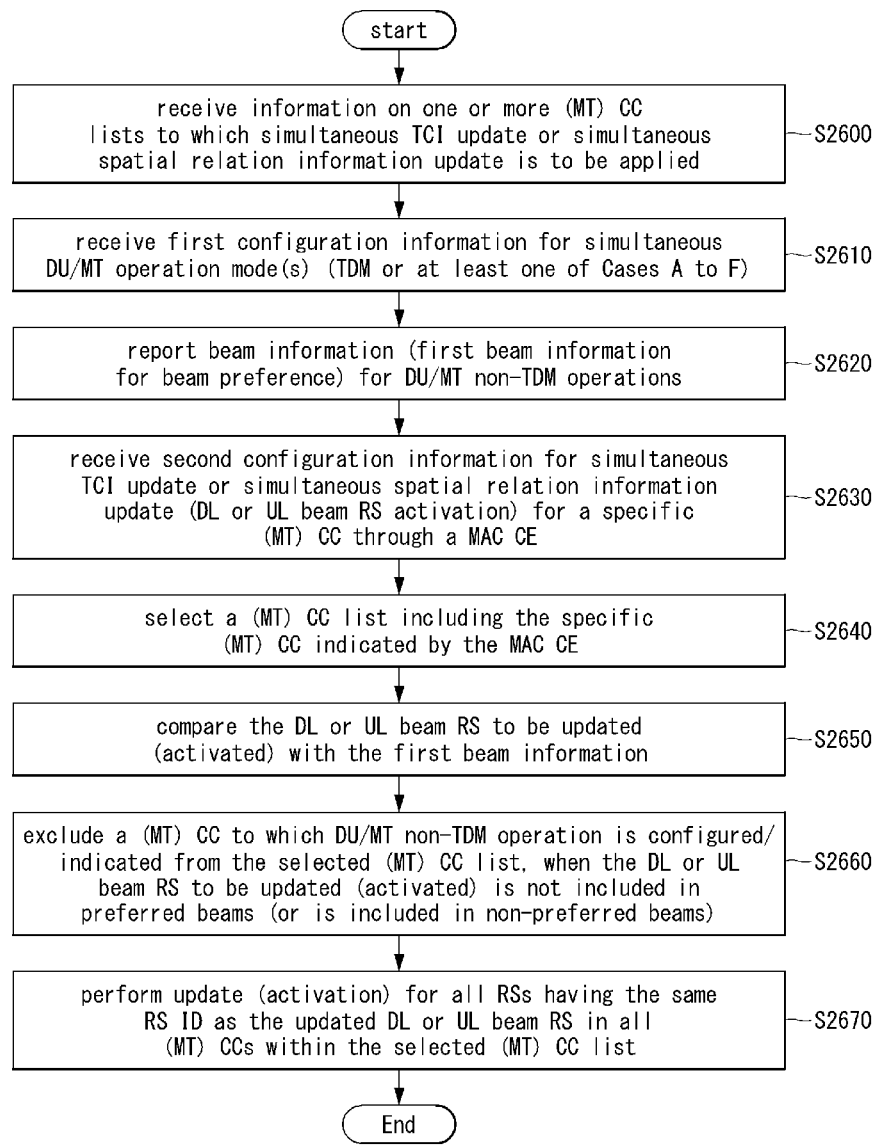
FIG. 26 is a flowchart illustrating a first exemplary embodiment of an operation method of a first communication node for simultaneous TCI update or simultaneous spatial relation indication procedure for multiple serving cells (or multiple CCs) in a communication system.

FIG. 26 is a flowchart illustrating a first exemplary embodiment of an operation method of a first communication node for simultaneous TCI update or simultaneous spatial relation indication procedure for multiple serving cells (or multiple CCs) in a communication system.

Referring to FIG. 26, a first communication node corresponding to a terminal (or IAB-MT of a lower node) may receive, from a second communication node corresponding to a base station (or IAB-DU of an upper node), a signal for simultaneous TCI update or simultaneous spatial relation indication (simultaneous spatial relation information update), and perform operations based on the received signal.

Specifically, the first communication node may receive, from the second communication node, information of one or more (MT) CC lists (or one or more serving cell lists) configured for simultaneous TCI update (or simultaneous spatial relation information indication) (S2600). In other words, the second communication node may configure, with respect to the first communication node, one or more (MT) CC lists (or one or more serving cell lists) to which simultaneous TCI update (or simultaneous spatial relation information indication) is to be applied.

The first communication node may receive, from the second communication node, configuration information of simultaneous DU/MT operation mode(s) (i.e., TDM or at least one of Cases A to F) for each of DU cells, MT CCs, or {DU cell, MT CC} pairs constituting the first communication node or each of one or more time/frequency resources separately configured (S2610). In other words, the second communication node may configure, with respect to the first communication node, the simultaneous DU/MT operation mode(s) (i.e., TDM or at least one of Cases A to F) for each of DU cells, MT CCs, or {DU cell, MT CC} pairs constituting the first communication node or each of one or more time/frequency resources separately configured.

The first communication node may report first beam information corresponding to the simultaneous DU/MT operation mode(s) received through step S2610 to the second communication node (S2620). Here, the first beam information may include beam preference information for each simultaneous DU/MT operation mode. The beam preference information for each simultaneous DU/MT operation mode may include information on preferred beams and/or information on non-preferred beams for each simultaneous DU/MT operation mode. Alternatively, the first communication node may transmit or notify the first beam information corresponding to the simultaneous DU/MT operation mode received through step S2610 to a third communication node, which is a lower node.

The first communication node may receive a MAC CE indicating information for simultaneous TCI update (or simultaneous spatial relation information indication) for a specific (MT) CC (or a specific serving cell) of the first communication node from the second communication node (S2630). In other words, the second communication node may indicate to the first communication node information for simultaneous TCI update (or simultaneous spatial relation information indication) for the specific (MT) CC (or serving cell) based on the MAC CE. The MAC CE that the first communication node receives from the second communication node in step S2630 may have the MAC CE structure described with reference to FIG. 19 or FIG. 20.

The first communication node may compare the information of the CC (or serving cell) indicated based on the MAC CE received in step S2630 with the information of one or more CC lists (or serving cell lists) received in step S2600. The first communication node may check whether the information of the CC (or serving cell) indicated based on the MAC CE received in step S2630 is included in the information of one or more CC lists (or serving cell list) received in step S2600. The first communication node may select a CC list (or serving cell list) that includes the CC (or serving cell) indicated based on the MAC CE received in step S2630 among the one or more CC lists (or serving cell lists) received in step S2600 (S2640).

The first communication node may compare information of a DL (or UL) beam RS updated by the MAC CE received in step S2630 with the first beam information. The first communication node may determine whether information on the DL (or UL) beam RS updated by the MAC CE received in step S2630 is included in the first beam information (S2650). Specifically, the first communication node may determine whether the information of the DL (or UL) beam RS updated by the MAC CE received in step S2630 is included in the information on the preferred beam(s) for each simultaneous DU/MT operation mode or the information on the non-preferred beam(s) for each simultaneous DU/MT operation mode.

When the information of the DL (or UL) beam RS updated by the MAC CE received in step S2630 is not included in the information on the preferred beam(s) for each simultaneous DU/MT operation mode (or it is included in the information of the non-preferred beam(s) for each simultaneous DU/MT operation mode)), the IAB node may operate to exclude the serving cell (or CC) to which the simultaneous DU/MT operation (at least one of Cases A to F) is applied from the serving cell list (or CC list) selected in step S2640 (S2660). This may be regarded as an operation for removing a discrepancy between 'beam preference for simultaneous operation' and 'TCI update/spatial relation indication'.

Thereafter, in all serving cells (or CCs) remaining in the serving cell list (or CC list) selected in step S2640, the first communication node may perform the TCI update or spatial relation update for all RSs having the same RS ID as the DL (or UL) beam RS updated by the MAC CE received in step S2630 (S2670).

Figure 27:
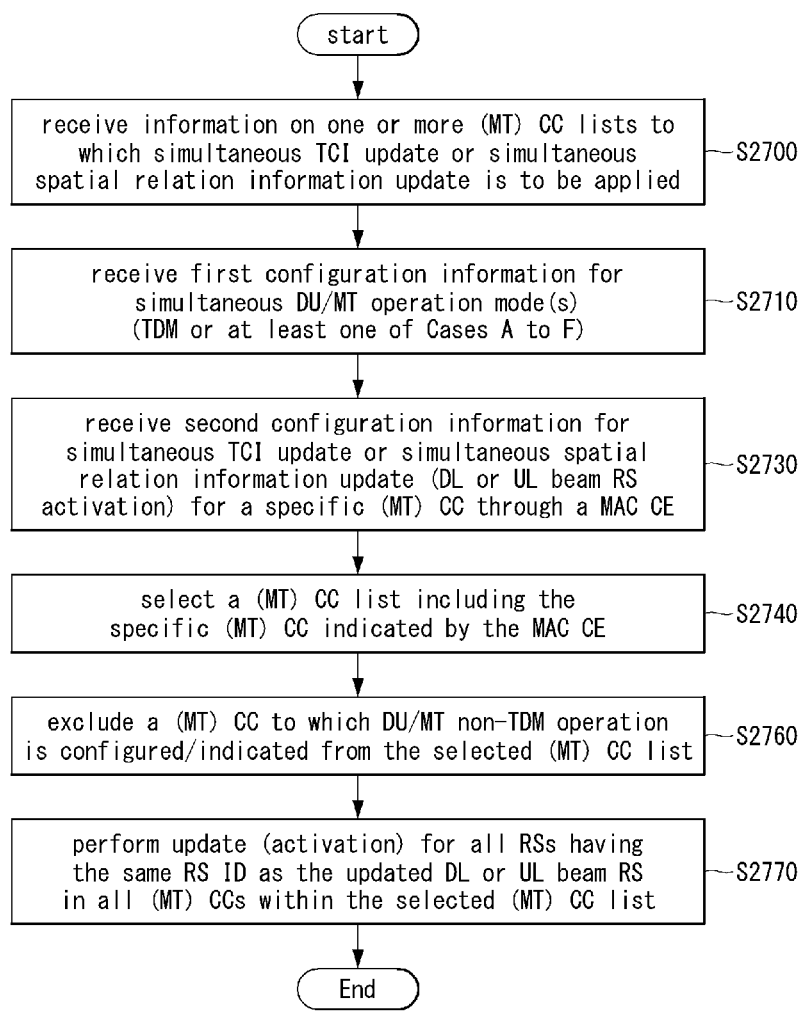
FIG. 27 is a flowchart illustrating a second exemplary embodiment of an operation method of a first communication node for simultaneous TCI update or simultaneous spatial relation indication procedure for multiple serving cells (or multiple CCs) in a communication system.

FIG. 27 is a flowchart illustrating a second exemplary embodiment of an operation method of a first communication node for simultaneous TCI update or simultaneous spatial relation indication procedure for multiple serving cells (or multiple CCs) in a communication system.

Referring to FIG. 27, a first communication node corresponding to a terminal (or IAB-MT of a lower node) may receive, from a second communication node corresponding to a base station (or IAB-DU of an upper node), a signal for simultaneous TCI update or simultaneous spatial relation indication (simultaneous spatial relation information update), and perform operations based on the received signal.

Specifically, the first communication node may receive, from the second communication node, information of one or more (MT) CC lists (or one or more serving cell lists) configured for simultaneous TCI update (or simultaneous spatial relation information indication) (S2700). In other words, the second communication node may configure, with respect to the first communication node, one or more (MT) CC lists (or one or more serving cell lists) to which simultaneous TCI update (or simultaneous spatial relation information indication) is to be applied.

The first communication node may receive, from the second communication node, configuration information of simultaneous DU/MT operation mode(s) (i.e., TDM or at least one of Cases A to F) for each of DU cells, MT CCs, or {DU cell, MT CC} pairs constituting the first communication node or each of one or more time/frequency resources separately configured (S2710). In other words, the second communication node may configure, with respect to the first communication node, the simultaneous DU/MT operation mode(s) (i.e., TDM or at least one of Cases A to F) for each of DU cells, MT CCs, or {DU cell, MT CC} pairs constituting the first communication node or each of one or more time/frequency resources separately configured.

The first communication node may receive a MAC CE indicating information for simultaneous TCI update (or simultaneous spatial relation information indication) for a specific (MT) CC (or a specific serving cell) of the first communication node from the second communication node (S7630). In other words, the second communication node may indicate to the first communication node information for simultaneous TCI update (or simultaneous spatial relation information indication) for the specific (MT) CC (or serving cell) based on the MAC CE. The MAC CE that the first communication node receives from the second communication node in step S2730 may have the MAC CE structure described with reference to FIG. 19 or FIG. 20.

The first communication node may compare the information of the CC (or serving cell) indicated based on the MAC CE received in step S2730 with the information of one or more CC lists (or serving cell lists) received in step S2700. The first communication node may check whether the information of the CC (or serving cell) indicated based on the MAC CE received in step S2730 is included in the information of one or more CC lists (or serving cell list) received in step S2700. The first communication node may select a CC list (or serving cell list) that includes the CC (or serving cell) indicated based on the MAC CE received in step S2730 among the one or more CC lists (or serving cell lists) received in step S2700 (S2740).

The IAB node may operate to exclude the serving cell (or CC) to which the simultaneous DU/MT operation (at least one of Cases A to F) is applied from the serving cell list (or CC list) selected in step S2740 (S2760). This may be regarded as an operation for removing a discrepancy between 'beam preference for simultaneous operation' and 'TCI update/spatial relation indication'.

Thereafter, in all serving cells (or CCs) remaining in the serving cell list (or CC list) selected in step S2740, the first communication node may perform the TCI update or spatial relation update for all RSs having the same RS ID as the DL (or UL) beam RS updated by the MAC CE received in step S2730 (S2770).

A first communication node according to the second exemplary embodiment of the communication system, may operate according to a predetermined operation method including at least a part of the respective steps constituting FIGS. 26 and 27. The first communication node may communicate with the second communication node. The first communication node and the second communication node may be referred to as a first device and a second device, or a first apparatus and a second apparatus respectively.

An operation method of the first device according to the second exemplary embodiment of the communication system may comprise: receiving, from a second apparatus, information of one or more component carrier (CC) lists each including at least one CC configured for a first update procedure among one or more CCs formed by a first transceiver constituting the first apparatus; receiving, from the second apparatus, first configuration information including information on a multiplexing mode corresponding to each of the one or more CCs; receiving, from the second apparatus, second configuration information configured for the first update procedure for a first CC among the one or more CCs; selecting a first CC list including the first CC indicated by the second configuration information from among the one or more CC lists; updating the first CC list based on the first configuration information; and performing the first update procedure indicated by the second configuration information for all CCs included in the updated first CC list.

The first apparatus may include the first transceiver and a second transceiver, and each of the one or more CCs formed by the first transceiver and one or more cells formed by the second transceiver may operate based on information on a multiplexing mode indicated by the second apparatus.

The first transceiver may be a first integrated access and backhaul (IAB)-mobile terminal (MT) forming one or more MT CCs, the second transceiver may be a first IAB-distributed unit (DU) forming one or more DU cells, the second apparatus includes a second IAB-MT and a second IAB-DU, the multiplexing mode may be a simultaneous DU/MT operation mode, and the first apparatus and the second apparatus may perform communications with each other through the first IAB-MT and the second IAB-DU.

The second configuration information includes, with respect to the first CC, information indicating whether to activate or deactivate a first beam reference signal (RS) corresponding to a first beam, and the performing of the first update procedure may comprise: performing, for the all CCs included in the updated first CC list, activation or deactivation of all beam RSs having a same RS identifier (ID) as an RS ID of the first beam RS indicated by the second configuration information.

The updating of the first CC list may comprise: identifying whether a CC for which a non-time division multiplexing (TDM) operation is indicated by the first configuration information as the multiplexing mode exists among CCs included in the first CC list; and when the CC for which the non-TDM operation is indicated exists, excluding the CC for which the non-TDM operation is indicated from the first CC list.

The updating the first CC list may comprise: identifying whether a CC for which a non-time division multiplexing (TDM) operation is indicated among the multiplexing mode by the first configuration information exists among CCs included in the first CC list; and when the CC for which the non-TDM operation is indicated exists, updating the first CC list to include only CCs for which a first mode (e.g. TDM operation, FDM operation, or SDM operation) among the multiplexing mode which is indicated separately.

The operation method may further comprise: after the receiving of the first configuration information, transmitting, to the second apparatus, first beam preference information corresponding to the multiplexing mode corresponding to each of the one or more CCs, wherein the first beam preference information may include at least one of preferred beam information and non-preferred beam information corresponding to the multiplexing mode corresponding to each of the one or more CCs.

The second configuration information may includes, with respect to the first CC, information indicating whether to activate or deactivate a first beam reference signal (RS) corresponding to a first beam, and the performing of the first update procedure may comprise: identifying whether the preferred beam information indicated by the first beam preference information includes the first beam; when the preferred beam information indicated by the first beam preference information does not include the first beam, identifying whether a CC for which a non-TDM operation is indicated by the first configuration information as the multiplexing mode exists among CCs included in the first CC list; and when the CC for which the non-TDM operation is indicated exists, excluding the CC for which the non-TDM operation is indicated from the first CC list.

The second configuration information may include, with respect to the first CC, information indicating whether to activate or deactivate a first beam reference signal (RS) corresponding to a first beam, and the performing of the first update procedure may comprise: identifying whether the preferred beam information indicated by the first beam preference information includes the first beam; when the preferred beam information indicated by the first beam preference information does not include the first beam, identifying whether a CC for which a non-TDM operation is indicated by the first configuration information as the multiplexing mode exists among CCs included in the first CC list; and when the CC for which the non-TDM operation is indicated exists, updating the first CC list to include only CCs for which an indicated first mode (e.g. TDM operation, FDM operation, or SDM operation) is configured as the multiplexing mode.

The one or more CC lists may be configured to be mutually exclusive so as not to include same CC(s).

Figure 28:
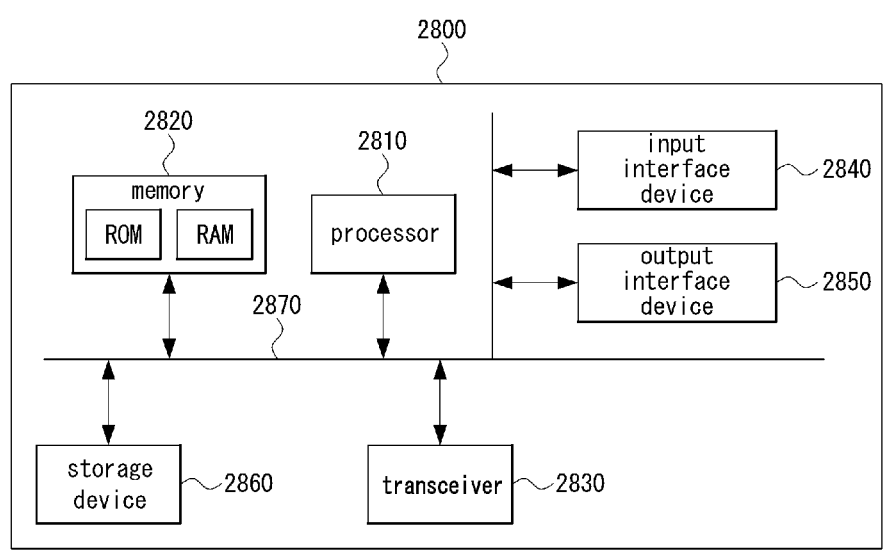
FIG. 28 is a block diagram illustrating an exemplary embodiment of a communication node constituting a communication system.

FIG. 28 is a block diagram illustrating an exemplary embodiment of a communication node constituting a communication system.

Referring to FIG. 28, a communication node 2800 may comprise at least one processor 2810, a memory 2820, and a transceiver 2830 connected to the network for performing communications. Also, the communication node 2800 may further comprise an input interface device 2840, an output interface device 2850, a storage device 2860, and the like. The respective components included in the communication node 2800 may communicate with each other as connected through a bus 2870.

However, each component included in the communication node 2800 may be connected to the processor 2810 via an individual interface or a separate bus, rather than the common bus 2870. For example, the processor 2810 may be connected to at least one of the memory 2820, the transceiver 2830, the input interface device 2840, the output interface device 2850, and the storage device 2860 via a dedicated interface.

The processor 2810 may execute a program stored in at least one of the memory 2820 and the storage device 2860. The processor 2810 may refer to a central processing unit (CPU), a graphics processing unit (GPU), or a dedicated processor on which methods in accordance with embodiments of the present disclosure are performed. Each of the memory 2820 and the storage device 2860 may be constituted by at least one of a volatile storage medium and a non-volatile storage medium. For example, the memory 2820 may comprise at least one of read-only memory (ROM) and random access memory (RAM).

The communication node 2800 may correspond to any one of communication nodes constituting the exemplary embodiments of the communication system described with reference to FIGS. 1 to 27. In an exemplary embodiment of the communication system, the communication node 2800 may correspond to an IAB node. Alternatively, on the other hand, in an exemplary embodiment of the communication system, the communication node 2800 may correspond to an IAB-DU or IAB-MT constituting the IAB node. In an exemplary embodiment of the communication system, the communication node 2800 may perform the same or similar operations to the operations of the IAB node described with reference to at least one of FIGS. 13 to 27.

Meanwhile, the communication node 280 may correspond to an upper node of the IAB node. The communication node 280 may perform the same or similar operations as those of the upper node of the IAB node described with reference to at least one of FIGS. 13 to 27 Alternatively, the communication node 280 may correspond to a lower node of the IAB node. The communication node 280 may perform the same or similar operations as those of the lower node of the IAB node described with reference to at least one of FIGS. 13 to 27.

The processor 2810 of the communication node 2800 may perform operations for communications with an upper node or a lower node. The processor 2810 of the communication node 2800 may enable the communication node 2800 to perform beam management operations for communications with an upper node or a lower node based on the configurations described with reference to FIGS. 21 to 27. The communication node 2800 may be implemented to support at least one of the first exemplary embodiment of the communication system and the second exemplary embodiment of the communication system.

Configurations of the first embodiment of the communication system and/or the second embodiment of the communication system may be applied to the communication node 2800. The configurations of the first embodiment and the second embodiment need not be mutually exclusive. At least some of the configurations of the first embodiment and the second embodiment may be combined with each other. For example, according to the first embodiment of the communication system, in the case of "resources set to NA in the beam domain side" or "resources set to S (soft) in the beam domain side, but not indicated to be available through AI afterward" according to the first embodiment of the communication system, the second According to an embodiment, an appointment to be excluded from the simultaneous TCI/spatial relationship indication operation may be set. Through this, the implementation complexity of the IAB node can be reduced.

Although the first and second embodiments of the communication system have been described focusing on configurations related to the IAB node, this is merely an example for convenience of description and the embodiment of the present invention is not limited thereto. For example, the first and second embodiments of the communication system are also provided for wireless communication between wireless communication devices that are not IAB nodes (for example, wireless communication between a base station (gNB) and a terminal operating in simultaneous transmission/reception or full-duplex mode) In this case, the terminal may correspond to the IAB node or IAB-MT of the IAB node, and the base station may correspond to the IAB-DU of the upper node or the upper node.

In the present disclosure, the configurations described with reference to at least one of FIGS. 1 to 28 may be implemented by a predetermined apparatus. For example, the communication node 2800 described with reference to FIG. 28 may be referred to as an apparatus (e.g., first apparatus, second apparatus and third apparatus, or first device, second device and third device, etc.). The operations of the IAB node, the upper node of the IAB node, and the lower node of the IAB node described with reference to FIGS. 21 to 28 may be performed by the first apparatus, the second apparatus, or the third apparatus.

According to the exemplary embodiments of the method and apparatus for beam management in a communication system, based on a band in which frequencies overlap and a band in which frequencies do not overlap between an IAB-DU and an IAB-MT corresponding to each other within an IAB node of the communication system, a preferred beam set and/or a non-preferred beam set can be selected. Accordingly, the beam management can be efficiently performed, and communication capacity can be expanded. According to the exemplary embodiments of the method and apparatus for beam management in the communication system, depending on whether a TDM or non-TDM is applied between the IAB-DU and the IAB-MT corresponding to each other within the IAB node of the communication system, whether beam directions are spatially overlapped between the IAB-DU and the IAB-MT, or the like, resource configuration and allocation can be performed so that interference between the IAB-DU and the IAB-MT is minimized. Accordingly, the beam management can be efficiently performed, and the communication capacity can be expanded.

However, the effects that can be achieved by the beam management method and apparatus in the communication system according to the exemplary embodiments of the present disclosure are not limited to those mentioned above, and other effects not mentioned may be clearly understood by those of ordinary skill in the art to which the present disclosure belongs from the configurations described in the present disclosure.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a first device, comprising:
    identifying a first mobile terminal (MT) component carrier (CC) operating in a multiplexing mode among one or more MT CCs formed by an integrated access and backhaul (IAB)-MT constituting the first device;
    determining first beam preference information for the first MT CC;
    transmitting, to a second device which is an upper node of the first device, the first beam preference information; and
    performing beam-based communications with the second device based on the first beam preference information,
    wherein the first beam preference information includes information on one or more beams suitable for the first MT CC to use in the multiplexing mode among beams of the first MT CC and/or information on one or more beams not suitable for the first MT CC to use in the multiplexing mode among the beams of the first MT CC.

2. The operation method according to claim 1, wherein the first beam preference information further includes information on one or more beams suitable for communications with the first MT CC among beams of the second device, or further includes information on one or more beams not suitable for communications with the first MT CC among the beams of the second device.

3. The operation method according to claim 1, wherein the first beam preference information is indicated based on at least one of transmission configuration indication (TCI) state identifier(s) (ID(s)), spatial relation ID(s), quasi co-location (QCL) ID(s), reference signal (RS) ID(s), or a combination thereof corresponding to one or more beams suitable for the first MT CC to use in the multiplexing mode or one or more beams not suitable for the first MT CC to use in the multiplexing mode.

4. The operation method according to claim 1, wherein the multiplexing mode corresponds to a simultaneous distributed unit (DU)/MT operation mode in the IAB network, and the first beam preference information is determined based on at least one of a degree of interference between one or more DU cells formed by an IAB-DU constituting the first device and the first MT CC, a relation between a frequency band of each of the one or more DU cells and a frequency band of the first MT CC, relative positions of the one or more DU cells and the first MT CC, or a combination thereof.

5. The operation method according to claim 1, wherein the multiplexing mode corresponds to a simultaneous DU/MT operation mode in the IAB network, and when a transmission mode of an IAB-DU constituting the first device corresponds to the simultaneous DU/MT operation mode, the first beam preference information is determined based on at least one of a degree of interference between one or more DU cells formed by the IAB-DU and the first MT CC, a relation between a frequency band of each of the one or more DU cells and a frequency band of the first MT CC, relative positions of the one or more DU cells and the first MT CC, or a combination thereof.

6. The operation method according to claim 1, wherein the performing of the beam-based communications comprises:
    receiving, from the second device, first beam configuration information determined based on the first beam preference information; and
    identifying hard (H)/soft(S)/not available (NA) configuration information determined by the second device for beams of the first MT CC based on the first beam configuration information.

7. An operation method of a first device, comprising:
    receiving, from a second device which is a lower node of the first device, first beam preference information for a first mobile terminal (MT) component carrier (CC) among one or more MT CCs formed by an integrated access and backhaul (IAB)-MT constituting the second device; and
    performing beam-based communications with the second device based on the first beam preference information,
    wherein the first MT CC is an MT CC operating in a multiplexing mode, and
    wherein the first beam preference information includes information on one or more beams suitable for the first MT CC to use in the multiplexing mode among beams of the first MT CC and/or information on one or more beams not suitable for the first MT CC to use in the multiplexing mode among the beams of the first MT CC.

8. The operation method according to claim 7, wherein the first beam preference information further includes information on one or more beams suitable for communications with the first MT CC among beams of the first device, or further includes information on one or more beams not suitable for communications with the first MT CC among the beams of the first device.

9. The operation method according to claim 7, wherein the multiplexing mode corresponds to a simultaneous distributed unit (DU)/MT operation mode in the IAB network, and the first beam preference information is determined based on at least one of a degree of interference between one or more DU cells formed by an IAB-DU constituting the second device and the first MT CC, a relation between a frequency band of each of the one or more DU cells and a frequency band of the first MT CC, relative positions of the one or more DU cells and the first MT CC, or a combination thereof.

10. The operation method according to claim 7, wherein the multiplexing mode corresponds to a simultaneous DU/MT operation mode in the IAB network, and when a transmission mode of an IAB-DU constituting the first device corresponds to the simultaneous DU/MT operation mode, the first beam preference information is determined based on at least one of a degree of interference between one or more DU cells formed by the IAB-DU and the first MT CC, a relation between a frequency band of each of the one or more DU cells and a frequency band of the first MT CC, relative positions of the one or more DU cells and the first MT CC, or a combination thereof.

11. The operation method according to claim 7, wherein the performing of the beam-based communications comprises:
  determining hard (H)/soft(S)/not available (NA) configuration information for beams of the first MT CC based on the first beam preference information; and
  transmitting, to the second device, the H/S/NA configuration information determined for the beams of the first MT CC.

12. A first device comprising:
  a processor;
  a memory electronically communicating with the processor; and
  instructions stored in the memory,
  wherein when executed by the processor, the instructions cause the first device to:
    identify a first distributed unit (DU) cell operating in a multiplexing mode among one or more DU cells formed by an integrated access and backhaul (IAB)-DU constituting the first device;
    determine first beam preference information for the first DU cell;
    transmit, to a second device which is an upper node of the first device, the first beam preference information;
    receive, from the second device, first beam configuration information determined based on the first beam preference information; and
    perform communications through the first DU cell based on the first beam preference information and the first beam configuration information,
  wherein the first beam preference information includes information on one or more beams suitable for the first DU cell to use in the multiplexing mode among beams of the first DU cell and/or information on one or more beams not suitable for the first DU cell to use in the multiplexing mode among the beams of the first DU cell.

13. The first device according to claim 12, wherein the first beam preference information further includes information on one or more beams suitable for communications with the first MT CC among beams of the second device, or further includes information on one or more beams not suitable for communications with the first MT CC among the beams of the second device.

14. The first device according to claim 12, wherein the first beam preference information is indicated based on at least one of transmission configuration indication (TCI) state identifier(s) (ID(s)), spatial relation ID(s), quasi co-location (QCL) ID(s), reference signal (RS) ID(s), or a combination thereof corresponding to one or more beams suitable for the first DU cell to use in the multiplexing mode or one or more beams not suitable for the first DU cell to use in the multiplexing mode.

15. The first device according to claim 12, wherein the multiplexing mode corresponds to a simultaneous DU/mobile terminal (MT) operation mode in the IAB network, and the first beam preference information is determined based on at least one of a degree of interference between one or more MT component carriers (CCs) formed by an IAB-MT constituting the first device and the first DU cell, a relation between a frequency band of each of the one or more MT CCs and a frequency band of the first DU cell, relative positions of the one or more MT CCs and the first DU cell, or a combination thereof.

16. The first device according to claim 12, wherein the multiplexing mode corresponds to a simultaneous DU/MT operation mode in the IAB network, and when a transmission mode of an IAB-MT constituting the first device corresponds to the simultaneous DU/MT operation mode, the first beam preference information is determined based on at least one of a degree of interference between one or more MT CCs formed by the IAB-MT and the first DU cell, a relation between a frequency band of each of the one or more MT CCs and a frequency band of the first DU cell, relative positions of the one or more MT CCs and the first DU cell, or a combination thereof.

17. The first device according to claim 12, wherein in the performing of communications through the first DU cell, the instructions further cause the first device to identify hard (H)/soft(S)/not available (NA) configuration information configured by the second device for beams of the first DU cell.

* * * * *